(12) United States Patent
Clark et al.

(10) Patent No.: US 11,809,179 B2
(45) Date of Patent: Nov. 7, 2023

(54) CASTABLE SONAR DEVICES AND OPERATIONS IN A MARINE ENVIRONMENT

(71) Applicant: Navico, Inc., Tulsa, OK (US)

(72) Inventors: Jeremiah Clark, Tulsa, OK (US); Matthew Laster, Broken Arrow, OK (US); William B. Newberry, Jr., Tulsa, OK (US); Kristopher C. Snyder, Claremore, OK (US)

(73) Assignee: Navico, Inc., Tulsa, OK (US)

( * ) Notice: Subject to any disclaimer, the term of this patent is extended or adjusted under 35 U.S.C. 154(b) by 0 days.

(21) Appl. No.: 18/159,209

(22) Filed: Jan. 25, 2023

(65) Prior Publication Data

US 2023/0161340 A1 May 25, 2023

Related U.S. Application Data

(63) Continuation of application No. 16/926,914, filed on Jul. 13, 2020, now Pat. No. 11,573,566, which is a
(Continued)

(51) Int. Cl.
*G05D 1/00* (2006.01)
*B64D 1/02* (2006.01)
(Continued)

(52) U.S. Cl.
CPC ........... *G05D 1/0038* (2013.01); *B63B 34/00* (2020.02); *B63B 34/05* (2020.02); *B63G 8/001* (2013.01);
(Continued)

(58) Field of Classification Search
CPC .. G05D 1/0038; G05D 1/0016; G05D 1/0094; G05D 1/0206; B63B 34/00;
(Continued)

(56) References Cited

U.S. PATENT DOCUMENTS

| 3,341,697 A | 9/1967 | Norman et al. |
| 3,610,798 A | 10/1971 | Murphree |

(Continued)

FOREIGN PATENT DOCUMENTS

| AU | 2016227509 A1 | 4/2017 |
| CN | 203981880 U | 12/2014 |

(Continued)

OTHER PUBLICATIONS

Christophe Sintes, et al.; Interferometric Side Scan Sonar: A Tool for High Resolution Sea Floor Exploration; Technical Lessons Learnt from the Erika Incident and Other Oil Spills, Brest, Mar. 13-16, 2002; pp. 1-15.

(Continued)

*Primary Examiner* — Peter D Nolan
*Assistant Examiner* — Luke Huynh
(74) *Attorney, Agent, or Firm* — Nelson Mullins Riley & Scarborough LLP

(57) ABSTRACT

Many different types of systems are utilized and tasks are performed in a marine environment. The present invention provides various configurations of castable devices that can be operated and/or controlled for such systems or tasks. One or more castable devices can be integrated with a transducer assembly, such as a phased array, that emits sonar beams and receives sonar returns from the underwater environment. Processing circuitry may receive the sonar returns, process the sonar returns, generate an image, and transmit the image to a display.

20 Claims, 24 Drawing Sheets

Related U.S. Application Data continuation of application No. 16/185,770, filed on Nov. 9, 2018, now Pat. No. 10,719,077, which is a continuation-in-part of application No. 16/001,384, filed on Jun. 6, 2018, now Pat. No. 10,725,469, which is a continuation of application No. 15/292,704, filed on Oct. 13, 2016, now Pat. No. 10,019,002.

(51) Int. Cl.

| | | |
|---|---|---|
| *B64D 47/08* | (2006.01) | |
| *B64C 39/02* | (2023.01) | |
| *B63G 8/00* | (2006.01) | |
| *G01S 15/89* | (2006.01) | |
| *G01S 15/88* | (2006.01) | |
| *G01S 13/88* | (2006.01) | |
| *G01S 7/00* | (2006.01) | |
| *G01S 15/96* | (2006.01) | |
| *B64D 47/02* | (2006.01) | |
| *G01S 7/62* | (2006.01) | |
| *G05D 1/02* | (2020.01) | |
| *B63B 34/00* | (2020.01) | |
| *B63B 35/00* | (2020.01) | |
| *B63B 21/66* | (2006.01) | |
| *B64U 101/30* | (2023.01) | |
| *B64U 101/60* | (2023.01) | |

(52) U.S. Cl.
CPC .............. *B64C 39/024* (2013.01); *B64D 1/02* (2013.01); *B64D 47/02* (2013.01); *B64D 47/08* (2013.01); *G01S 7/003* (2013.01); *G01S 7/6272* (2013.01); *G01S 13/88* (2013.01); *G01S 15/88* (2013.01); *G01S 15/89* (2013.01); *G01S 15/8902* (2013.01); *G01S 15/96* (2013.01); *G05D 1/0016* (2013.01); *G05D 1/0094* (2013.01); *G05D 1/0206* (2013.01); *B63B 21/66* (2013.01); *B63B 2035/005* (2013.01); *B63B 2035/006* (2013.01); *B63G 2008/005* (2013.01); *B64U 2101/30* (2023.01); *B64U 2101/60* (2023.01); *B64U 2201/10* (2023.01); *B64U 2201/20* (2023.01)

(58) Field of Classification Search
CPC ....... B63B 34/05; B63G 8/001; B64C 39/024; B64D 1/02; B64D 47/02; B64D 47/08; G01S 7/003; G01S 7/6272; G01S 13/88; G01S 15/88; G01S 15/89; G01S 15/8902; G01S 15/96
USPC .......................................................... 701/2
See application file for complete search history.

(56) References Cited

U.S. PATENT DOCUMENTS

| | | |
|---|---|---|
| 3,713,081 A | 1/1973 | Murphree |
| 3,829,596 A | 8/1974 | Murphree |
| 3,835,234 A | 9/1974 | Murphree |
| 3,918,054 A | 11/1975 | Collins |
| 4,179,681 A | 12/1979 | Zehner et al. |
| 4,214,269 A | 7/1980 | Parker et al. |
| 4,216,537 A | 8/1980 | Delignieres |
| 4,271,707 A | 6/1981 | Lakin |
| 4,387,365 A | 6/1983 | Berry et al. |
| 4,425,635 A | 1/1984 | Yamamamoto et al. |
| 4,510,709 A | 4/1985 | Melcher |
| 4,597,069 A | 6/1986 | Milano |
| 4,644,512 A | 2/1987 | Grilk |
| 4,737,940 A | 4/1988 | Arringotn |
| 4,777,489 A | 10/1988 | Allan |
| 4,879,697 A | 11/1989 | Lowrance et al. |
| 4,908,800 A | 3/1990 | DiLemmo |
| 4,926,399 A | 5/1990 | Hickman |
| 4,939,700 A | 7/1990 | Breton |
| 4,943,951 A | 7/1990 | Leavell |
| 4,970,700 A | 11/1990 | Gilmour et al. |
| 4,986,755 A | 1/1991 | Johnson |
| 5,005,419 A | 4/1991 | O'Donnell et al. |
| 5,064,376 A | 11/1991 | DeCrescent |
| 5,068,665 A | 11/1991 | Piazza et al. |
| 5,077,699 A | 12/1991 | Passamante et al. |
| 5,107,841 A | 4/1992 | Sturgill |
| 5,122,989 A | 6/1992 | Pirie et al. |
| 5,142,497 A | 8/1992 | Warrow |
| 5,173,947 A | 12/1992 | Chande et al. |
| 5,181,026 A | 1/1993 | Granville |
| 5,184,330 A | 2/1993 | Adams et al. |
| 5,200,931 A | 4/1993 | Kosalos et al. |
| 5,260,912 A | 11/1993 | Latham |
| 5,463,597 A | 10/1995 | Harlev |
| 5,483,767 A | 1/1996 | Langer |
| 5,493,539 A | 2/1996 | Haley et al. |
| 5,495,689 A | 3/1996 | Cassem |
| 5,511,335 A | 4/1996 | Langer |
| 5,525,081 A | 6/1996 | Mardesich |
| 5,530,680 A | 6/1996 | Whitehurst |
| 5,537,380 A | 7/1996 | Sprankle et al. |
| 5,546,695 A | 8/1996 | Langer |
| 5,568,152 A | 10/1996 | Janky et al. |
| 5,598,206 A | 1/1997 | Bullis |
| 5,675,552 A | 10/1997 | Hicks et al. |
| 5,793,703 A | 8/1998 | Shippey |
| 5,805,528 A | 9/1998 | Hamada et al. |
| 5,808,967 A | 9/1998 | Yu et al. |
| 5,812,494 A | 9/1998 | Medeiros |
| 5,816,874 A | 10/1998 | Juran |
| 5,838,635 A | 11/1998 | Masreliez |
| 5,887,376 A | 3/1999 | Currier et al. |
| 5,923,617 A | 7/1999 | Thompson et al. |
| 6,122,852 A | 9/2000 | Mechling, IV |
| 6,160,764 A | 12/2000 | Powell |
| 6,222,449 B1 | 4/2001 | Twining |
| 6,255,800 B1 | 7/2001 | Bork |
| 6,273,771 B1 | 8/2001 | Buckley et al. |
| 6,345,179 B1 | 2/2002 | Wiegers et al. |
| 6,380,890 B1 | 4/2002 | Smith et al. |
| 6,404,204 B1 | 6/2002 | Farruggia |
| 6,449,215 B1 | 9/2002 | Shell |
| 6,508,192 B2 | 1/2003 | Lentine |
| 6,520,105 B2 | 2/2003 | Koda et al. |
| 6,581,025 B2 | 6/2003 | Lehman |
| 6,693,847 B2 | 2/2004 | Betts |
| 6,724,688 B2 | 4/2004 | Betts et al. |
| 6,735,450 B1 | 5/2004 | Remmert |
| 6,771,562 B2 | 8/2004 | Betts et al. |
| 6,909,946 B1 | 6/2005 | Kabel et al. |
| 6,995,527 B2 | 2/2006 | DePasqua |
| 7,113,449 B2 | 9/2006 | Fairbairn |
| 7,369,459 B2 | 5/2008 | Kawabata et al. |
| 7,380,453 B1 | 6/2008 | Van Every |
| 7,534,152 B1 | 5/2009 | Lloyd et al. |
| 7,538,511 B2 | 5/2009 | Samek |
| 7,542,376 B1 | 6/2009 | Thompson et al. |
| 7,554,884 B2 | 6/2009 | Park |
| 7,606,114 B2 | 10/2009 | Bachelor et al. |
| 7,652,952 B2 | 1/2010 | Betts et al. |
| 7,729,203 B2 | 6/2010 | Betts et al. |
| 7,755,974 B2 | 7/2010 | Betts et al. |
| 7,889,600 B2 | 2/2011 | Thompson et al. |
| 8,295,393 B2 | 10/2012 | Wantanabe et al. |
| 8,300,499 B2 | 10/2012 | Coleman et al. |
| 8,305,840 B2 | 11/2012 | Maguire |
| 8,305,844 B2 | 11/2012 | DePasqua |
| 8,486,968 B2 | 7/2013 | Priepke et al. |
| 8,514,658 B2 | 8/2013 | Maguire |
| 8,605,550 B2 | 12/2013 | Maguire |
| 8,645,012 B2 | 2/2014 | Salmon et al. |
| 8,711,140 B1 | 4/2014 | Mallet |
| 8,717,847 B2 | 5/2014 | Blake |

(56) References Cited

U.S. PATENT DOCUMENTS

| | | | |
|---|---|---|---|
| 8,759,813 B2 * | 6/2014 | Hirayama | H01L 33/04 257/14 |
| 8,761,976 B2 | 6/2014 | Salmon et al. | |
| 8,767,509 B2 | 7/2014 | Freking et al. | |
| 8,879,359 B2 | 11/2014 | DePasqua | |
| 8,934,318 B2 | 1/2015 | Lebedev et al. | |
| 8,953,647 B1 | 2/2015 | Mead et al. | |
| 9,132,900 B2 | 9/2015 | Salmon et al. | |
| 9,201,142 B2 | 12/2015 | Antao | |
| 9,335,412 B2 | 5/2016 | Proctor | |
| 9,360,553 B2 | 6/2016 | Lebedev et al. | |
| 9,383,444 B2 | 7/2016 | Lebedev et al. | |
| 9,405,028 B2 | 8/2016 | Bloor | |
| 9,408,378 B2 | 8/2016 | Senanko | |
| 9,488,728 B2 | 11/2016 | Baumann et al. | |
| 9,495,764 B1 | 11/2016 | Boardman et al. | |
| 9,628,592 B2 | 4/2017 | Wu | |
| 9,664,783 B2 | 5/2017 | Brown et al. | |
| 9,759,813 B2 | 9/2017 | Smith | |
| 9,766,328 B2 | 9/2017 | Black et al. | |
| 9,784,825 B2 | 10/2017 | Brown et al. | |
| 9,784,826 B2 | 10/2017 | Matson et al. | |
| 9,812,118 B2 | 11/2017 | Matson et al. | |
| 10,019,002 B2 * | 7/2018 | Harnett | G01S 15/88 |
| 10,719,077 B2 * | 7/2020 | Clark | B64D 47/08 |
| 2002/0071345 A1 | 6/2002 | Chiang et al. | |
| 2002/0126576 A1 | 9/2002 | Douma et al. | |
| 2002/0188200 A1 | 12/2002 | Mauchamp et al. | |
| 2003/0078706 A1 | 4/2003 | Larsen | |
| 2003/0081503 A1 | 5/2003 | Barnard et al. | |
| 2003/0126448 A1 | 7/2003 | Russo | |
| 2003/0235112 A1 | 12/2003 | Zimmerman et al. | |
| 2003/0236461 A1 | 12/2003 | Poland | |
| 2004/0179332 A1 | 9/2004 | Smith et al. | |
| 2004/0196180 A1 | 10/2004 | Hollis | |
| 2005/0007880 A1 | 1/2005 | Zimmerman et al. | |
| 2005/0036404 A1 | 2/2005 | Zhu et al. | |
| 2005/0084033 A1 | 4/2005 | Rosen et al. | |
| 2005/0088643 A1 | 4/2005 | Anderson | |
| 2005/0093859 A1 | 5/2005 | Sumanaweera et al. | |
| 2005/0099892 A1 | 5/2005 | Greelish | |
| 2005/0101867 A1 | 5/2005 | Johnson et al. | |
| 2005/0135192 A1 | 6/2005 | Fairbairn | |
| 2005/0232638 A1 | 10/2005 | Fucile | |
| 2005/0259515 A1 | 11/2005 | Maesawa | |
| 2005/0270901 A1 | 12/2005 | Swanson | |
| 2006/0023570 A1 | 2/2006 | Betts et al. | |
| 2006/0186889 A1 | 8/2006 | Andreis | |
| 2007/0025183 A1 | 2/2007 | Zimmerman et al. | |
| 2007/0058489 A1 | 3/2007 | Bratcher | |
| 2007/0147173 A1 | 6/2007 | Park | |
| 2007/0159922 A1 | 7/2007 | Zimmerman et al. | |
| 2007/0223306 A1 | 9/2007 | Toennessen | |
| 2007/0223307 A1 | 9/2007 | Storteig | |
| 2007/0291589 A1 | 12/2007 | Kawabata et al. | |
| 2008/0013404 A1 | 1/2008 | Acker | |
| 2008/0080308 A1 | 4/2008 | Hornby | |
| 2008/0112265 A1 | 5/2008 | Urbano et al. | |
| 2008/0192576 A1 | 8/2008 | Vosburgh | |
| 2008/0239870 A1 | 10/2008 | Dubuis et al. | |
| 2008/0279047 A1 | 11/2008 | An | |
| 2009/0037040 A1 | 2/2009 | Salmon | |
| 2009/0052277 A1 | 2/2009 | Swanson | |
| 2009/0073804 A1 | 3/2009 | Laws et al. | |
| 2009/0103595 A1 | 4/2009 | Watanabe et al. | |
| 2009/0122647 A1 | 5/2009 | Betts et al. | |
| 2009/0147623 A1 | 6/2009 | Betts et al. | |
| 2009/0240354 A1 | 9/2009 | Davidson | |
| 2010/0014386 A1 | 1/2010 | Thompson et al. | |
| 2010/0045448 A1 | 2/2010 | Hakinami | |
| 2010/0103775 A1 | 4/2010 | Betts et al. | |
| 2011/0004600 A1 | 1/2011 | Walker et al. | |
| 2011/0013484 A1 | 1/2011 | Coleman et al. | |
| 2011/0013485 A1 | 1/2011 | Maguire | |
| 2011/0038227 A1 | 2/2011 | Kostov | |
| 2011/0128162 A1 | 6/2011 | Klepsvik | |
| 2011/0214500 A1 | 9/2011 | Cabrera | |
| 2012/0014220 A1 | 1/2012 | DePasqua | |
| 2012/0020185 A1 | 1/2012 | Welker et al. | |
| 2012/0099395 A1 | 4/2012 | Debrunner et al. | |
| 2012/0106299 A1 | 5/2012 | Rowe et al. | |
| 2012/0144723 A1 | 6/2012 | Davidson | |
| 2012/0152027 A1 | 6/2012 | Wooten | |
| 2012/0195471 A1 | 8/2012 | Newcombe et al. | |
| 2012/0289103 A1 | 11/2012 | Hudson et al. | |
| 2012/0309755 A1 | 12/2012 | Priepke et al. | |
| 2013/0044569 A1 | 2/2013 | DePasqua | |
| 2013/0148471 A1 | 6/2013 | Brown et al. | |
| 2013/0173163 A1 | 7/2013 | Zhandov et al. | |
| 2013/0187787 A1 | 7/2013 | Damus | |
| 2013/0208568 A1 | 8/2013 | Coleman | |
| 2013/0215719 A1 | 8/2013 | Betts et al. | |
| 2013/0242700 A1 | 9/2013 | Blake | |
| 2013/0272093 A1 | 10/2013 | Chen et al. | |
| 2014/0010048 A1 | 1/2014 | Proctor | |
| 2014/0010049 A1 | 1/2014 | Proctor | |
| 2014/0022864 A1 | 1/2014 | Lebedev et al. | |
| 2014/0057677 A1 | 2/2014 | Liubinas | |
| 2014/0066125 A1 | 3/2014 | Wu | |
| 2014/0092709 A1 | 4/2014 | Miller | |
| 2014/0200815 A1 | 7/2014 | Hung et al. | |
| 2014/0224167 A1 | 8/2014 | Gasparoni | |
| 2014/0254324 A1 | 9/2014 | Dubberley et al. | |
| 2014/0259618 A1 | 9/2014 | Damus et al. | |
| 2014/0269163 A1 | 9/2014 | Proctor | |
| 2014/0269164 A1 | 9/2014 | Betts et al. | |
| 2014/0269192 A1 | 9/2014 | Proctor | |
| 2014/0336854 A1 | 11/2014 | Salmon et al. | |
| 2015/0003689 A1 | 1/2015 | Sheiman et al. | |
| 2015/0066450 A1 | 3/2015 | Charlesworth et al. | |
| 2015/0078123 A1 | 3/2015 | Batcheller | |
| 2015/0097838 A1 | 4/2015 | Steward et al. | |
| 2015/0130797 A1 | 5/2015 | Chen et al. | |
| 2015/0142211 A1 | 5/2015 | Shehata | |
| 2015/0325043 A1 | 11/2015 | Bromley et al. | |
| 2015/0346339 A1 | 12/2015 | Zenako | |
| 2015/0355373 A1 | 12/2015 | Zhuo et al. | |
| 2015/0369908 A1 | 12/2015 | Zimmerman et al. | |
| 2016/0003008 A1 | 1/2016 | Uribe et al. | |
| 2016/0011310 A1 | 1/2016 | Horner et al. | |
| 2016/0054733 A1 | 2/2016 | Hollida | |
| 2016/0104359 A1 | 4/2016 | AlMahmoud | |
| 2016/0119541 A1 | 4/2016 | Alvarado-Moya | |
| 2016/0123499 A1 | 5/2016 | Lewis | |
| 2016/0214715 A1 | 7/2016 | Meffert | |
| 2016/0232884 A1 | 8/2016 | Parks | |
| 2016/0245649 A1 | 8/2016 | Laster et al. | |
| 2016/0259053 A1 | 9/2016 | Proctor et al. | |
| 2016/0320474 A1 | 11/2016 | Proctor et al. | |
| 2016/0325814 A1 | 11/2016 | Antao et al. | |
| 2016/0341827 A1 | 11/2016 | Horner et al. | |
| 2016/0341828 A1 | 11/2016 | Laster | |
| 2016/0377716 A1 | 12/2016 | Proctor et al. | |
| 2017/0023676 A1 | 1/2017 | Laster | |
| 2017/0038460 A1 | 2/2017 | Clark et al. | |
| 2017/0082739 A1 | 3/2017 | Horner et al. | |
| 2017/0123062 A1 | 5/2017 | Coleman et al. | |
| 2017/0199275 A1 | 7/2017 | Wu | |
| 2017/0212230 A1 | 7/2017 | Wigh et al. | |
| 2017/0213459 A1 | 7/2017 | Ogaz | |
| 2017/0235308 A1 | 8/2017 | Gordon et al. | |
| 2018/0011189 A1 | 1/2018 | Smith et al. | |
| 2018/0100922 A1 | 4/2018 | Wigh et al. | |
| 2018/0107210 A1 | 4/2018 | Harnett et al. | |
| 2018/0228454 A1 | 8/2018 | Butani et al. | |
| 2018/0275649 A1 | 9/2018 | Harnett et al. | |
| 2018/0288990 A1 | 10/2018 | Laster et al. | |

FOREIGN PATENT DOCUMENTS

| | | |
|---|---|---|
| DE | 29617813 U1 | 11/1996 |
| EP | 2602639 A1 | 6/2013 |
| GB | 2294763 A | 5/1996 |
| JP | S 62215889 A | 9/1987 |

(56) References Cited

FOREIGN PATENT DOCUMENTS

| | | | |
|---|---|---|---|
| JP | 01-118791 A | 5/1989 |
| JP | 01-216288 A | 8/1989 |
| JP | H 11023708 A | 1/1999 |
| JP | 11-153667 A | 6/1999 |
| JP | 2008-508539 A | 3/2008 |
| JP | 2009-068881 A | 4/2009 |
| KR | 100923668 B1 | 10/2009 |
| KR | 100993227 B1 | 11/2010 |
| KR | 20160121915 A | 10/2016 |
| WO | WO 01/53148 A1 | 7/2001 |
| WO | WO 2003/001231 A2 | 1/2003 |
| WO | WO 2006/017511 A2 | 2/2006 |
| WO | WO 2010/017629 A | 2/2010 |
| WO | WO 2010/120896 A1 | 10/2010 |
| WO | WO 2011/008430 A1 | 1/2011 |
| WO | WO 2013/108088 A1 | 7/2013 |
| WO | WO 2013/126761 A1 | 8/2013 |
| WO | WO 2014/019019 A1 | 2/2014 |
| WO | WO 2014/144471 A1 | 9/2014 |
| WO | WO 2016/205938 A1 | 12/2016 |

OTHER PUBLICATIONS

DePasqua; Humminbird 360 Degree Sonar, <https://www.youtube.com/watch?v=VetZhhulQ0Y>, Feb. 26, 2012.
European Search Report for European Application No. EP 16158998 dated Jul. 20, 2016.
Simrad; ForwardScan® Transducer [online] [Retrieved Mar. 25, 2015]. Retrieved from <URL:http://www.simrad-yachting.com/en-GB/Products/Echosounders/Transducers/ForwardScan-Transducer-en-gb.aspx>. 3 pages.
Furuno; Full-Circle Scanning Sonar FSV-30, [online] [retrieved Apr. 18, 2013] Retrieved from the Internet: <URL: http://www.furuno.com/en/business-product/detail/marine/index.php?prdcd=FSV-30&category=sonar&business=fishing>.
Furuno CH-28 360° Scanning Sonar, 8 pages.
Furuno, Operator's Manual, Color Searchlight Sonar; Model CH-28; Furuno Electric Co., Ltd.; Nishinomiya, Japan; First Edition Jan. 1991; 44 pages.
Gerard Llort-Pujol et al., "A New Approach for Fast and High-Resolution Interfometric Bathymetry", IEEE Oceanic Engineering Society Newsletter, Summer 2006, pp. 12-19.
Giardina; Interferometric Synthetic Aperture Sonar Signal Processing for Autonomous Underwater Vehicles Operating Shallow Water; University of New Orleans Theses and Dissertations; Dec. 15, 2012; Retrieved from the Internet: URL:http://scholarworks.uno.edu/cgi/viewcontent.cgi?article=2587&context=td (retrieved on Jul. 7, 2016).
H. Koyama et al., "Bathymetry by new designed interferometry sonar mounted on AUV", Oceans 2004, MTS/IEEE Techno-Ocean Mar. 14, 2005; pp. 1169-1174.
H.D. Griffiths, et al.; Interferometric Synthetic Aperture Sonar for High-Resolution 3-D Mapping of the Seabed; IEE Proceedings—Radar, Sonar and Navigation; vol. 144, No. 2; Apr. 1997; pp. 96-103.
Humminbird, "Trolling Motor Mounted Transducer", © 2013 Johnson Outdoors Marine Electronics, Inc.; pp. 1-4.
International Search Report and Written Opinion from International Application No. PCT/US2014/023984, dated Sep. 1, 2014.
ITC Application Equations for Underwater Sound Transducers, International Transducer Corporation (1995) Rev. 8/00, 3 pages.
NOAA; Office of Coast Survey; Phase Differencing Bathymetric Sonar [online] [Retrieved May 5, 2015]. Retrieved from the Internet: . 2 pages.
Office Action for Japanese Application No. 2014-051465 dated Jul. 27, 2015.
Office Action for Japanese Application No. 2014-051465 dated Mar. 2, 2016.
Office Action from Japanese Patent Application No. 2014-051465 dated Feb. 23, 2015.

Roy Edgar Hansen, et al.; Signal Processing for AUV Based Interferometric Synthetic Aperture Sonar; Oceans 2003, MTS/IEEE Proceedings Celebrating the Past, Teaming Toward the Future; San Diego, CA; Sep. 22-26, 2003; Oceans MTS/IEEE Conference Proceedings, Columbia, MD; Marine Techn. Soc., Sep. 22, 2003; pp. 2438-2444.
Second Written Opinion of the International Preliminary Examining Authority from International Application No. PCT/US2014/023984, dated Mar. 5, 2015.
Simrad Introduces Forwardscan [online] [retrieved Nov. 25, 2014]. Retrieved from the Internet: <URL: http://www.simrad-yachting.com/en-US/Pressrelease/2014/Simrad-Introduces-Forwardscan/>. (dated Feb. 25, 2014) 2 pages.
Hiller, Tom; "Solving the Interferometric Processing Bottleneck" [online] [Retrieved May 5, 2015]. Retrieved from the Internet: <URL: http://www.oicinc.com/Hiller-Solving-Interferometric-Bottleneck.pdf>. 3 pages.
Woods Holde Coastal and Marine Science Center; "Swath Bathymetry System" [online] [Retrieved May 5, 2015]. Retrieved from the Internet: URL:http://woodshole.er.usgs.gov/operations/sfmapping/swath.htm. 2 pages.
WiseGeek, http://www.wisegeek.com/what-is-3d-imaging.htm (2009).
Deeper, UAB; "Deeper Smart Sonar PRO+"; https://buydeeper.com/en/deeper-pro-plus; retrieved Jun. 13, 2016.
International Search Report and Written Opinion of International Application No. PCT/CA2016/050729 dated Aug. 26, 2016.
Global FlyFisher; "Humminbird Smartcast 35" retrieved <http://globalflyfisher.com/humminbird-smartcast-35> Published Mar. 3, 2009.
Lucky; Dot Matrix Wireless Fishfinder FFW718; retrieved from https://www.amazon.co.uk/gp/product/B004HGJJ28/?tag=awp7-21, Feb. 15, 2018. Date Unknown.
Alibaba, Sonar Wireless Fish Finder, Retrieved from <https://www.alibaba.com/showroom/sonar-wireless-fish-finder.html> on Feb. 15, 2018. Date Unknown.
ReelSonar, The iBobber wireless sonar fish finder fishing tool. Retrieve Feb. 16, 2018 from <https://reelsonar.com/>. Date Unknown.
Smartcast RF15 Humminbird; http://smartcast-rf30.com/smartcast_rf10.htm ; retrieved Aug. 1, 2016; 2 pages.
AguaDrone—The World's First Drone with a fish Finder! website visited Oct. 25, 2016 (10 pgs.) https://www.aguadrone.com/.
AeroKontiki—Introducing the world's first autopilot fishing drone kontiki website visited Oct. 25, 2016 (4 pgs.) http://www.aerokontiki.com/.
DIY Drones—The Leading Community for Personal UAVs—Home website visited Oct. 25, 2016 (9 pgs.) www.diydrones.com.
DIY Drones—The Leading Community for Personal UAVs—My Blog Automated Precision Landing on a (stationary) Boat website visited (Oct. 25, 2016 (6 pgs.).
Visual Aerials—Flying Off a Boat—Mark and Romeo's Aerial Adventures website visited Oct. 25, 2016 (3 pgs.) http://www.visual.aerials.com/flying-off-a-boat.html.
Unmanned Marine Systems USV Website visited Oct. 26, 2016 (12 pgs.) http://www.unmannedsystemstechnology.com/company/autonomous-surface-vehicles-ltd/.
Humminbird 360 Imaging advertising literature excerpts; pp. 10-11 and 52-53.
Furuno Model CH-37BB Color Sector Scanning Sonar product literature; Jan. 2012.
Wesmar SS395 Seriers Sonar Product literatire; Feb. 2010; http://www.wesmar.com/productbrochures/wesmar_ss395_web.pdf.
D'Amico, et al.; A Brief History of Active Sonar; Aquatic Mammals; vol. 35, No. 4; pp. 426-434; 2009; http://csi.whoi.edu/sites/default/files/literature/Full%20Text.pdf.
Caputi; Power to the People (4 Look Ahead, Interphase iScan 180); Saltwater Sportsman; Sep. 21, 2007; http://www.saltwaterssportman.com/power-people.
Bottom Line Fishin' Buddy product literature; Feb. 2001.
Bottom Line Fishin' Buddy 2255 Manual.
Furuno Model CH-28 Installation Manual; Apr. 10, 1998.
Furuno Model CH-28 Operator's Manual; Dec. 28, 1996.
Furuno Model CH-28 Product Literature.
Botton Line Finshin' Buddy Product Literature; Jul. 14, 1999.

(56) References Cited

OTHER PUBLICATIONS

Interphase Sea Scout Product Literature; 1994.
Furuno Model CH-18 Color Searchlight Sonar Product Literatire; Feb. 18, 1989.
Wesmar SS90B High Frequency Scanning Sonar Product Literature and Wesmar Pricing Information; Mar. 1, 1980.
Multibeam Sonar Theory of Operation; L-3 Communications SeaBeam Instruments; 2000; website visited Jan. 31, 2019; https://www3.mbari.org/data/mbsystem/sonarfunction/SeaBeam-MultibeamTheoryOperation.pdf.
http://www.acousticsunpacked.org/EquipmentDeployment/BeamConfiguration.html; 2 pgs.; website visited Jan. 31, 2019.
Lowrance FishHunter 3D; https://www.lowrance.com/lowrance/type/catables/lowrance-fishhunter-3d/; 6 pgs.; website visited Jan. 31, 2019.
LED Programmable Message Pocket Fan & Rave Toy; https://www.amazon.com/LED-Programmable-Message-Pocket-Rave/dp/B002FWOYG2; website visited Jan. 31, 2019.
Water Wolf HD—How To Record Your First Video; https://www.waterwolfhd.com/; 1 pgs.; website visited Jan. 31, 2019.

\* cited by examiner

CASTABLE SONAR DEVICES AND
OPERATIONS IN A MARINE
ENVIRONMENT

CROSS-REFERENCE TO RELATED
APPLICATIONS

This application claims priority to and is a continuation of U.S. patent application Ser. No. 16/926,914, entitled "Castable Sonar Devices and Operations in a Marine Environment", filed Jul. 13, 2020, which is a continuation of U.S. patent application Ser. No. 16/185,770, entitled "Castable Sonar Devices and Operations in a Marine Environment", filed Nov. 9, 2018, now U.S. Pat. No. 10,719,077, which is a continuation-in-part of U.S. patent application Ser. No. 16/001,384, entitled "Unmanned Vehicle Control and Operation in a Marine Environment", filed Jun. 6, 2018, now U.S. Pat. No. 10,725,469, which is a continuation of U.S. patent application Ser. No. 15/292,704, entitled "Unmanned Vehicle Control and Operation in a Marine Environment", filed Oct. 13, 2016, issued as U.S. Pat. No. 10,019,002; the contents of each being incorporated by reference herein in their entireties.

FIELD OF THE INVENTION

Embodiments of the present invention relate generally to castable devices and, more particularly, to castable sonar devices used for various operations in a marine environment.

BACKGROUND OF THE INVENTION

Whether for recreation use, commercial use, or otherwise, persons in a marine environment utilize many different types of systems and perform many different types of tasks. There is always a need to improve such systems and offer more efficient ways for a user to enjoy the marine environment. Castable devices can improve the user's experience, but known devices presently lack various features that can further enhance the user's experience.

BRIEF SUMMARY OF THE INVENTION

The marine environment offers many unique circumstances and challenges when utilizing a castable device. Embodiments of the present invention provide many different configurations and uses for a castable device in a marine environment that account for these circumstances and challenges. For example, using a marine electronic device from a marine vessel to display sonar data from a castable sonar device can provide environmental knowledge to a user. In this regard, as detailed herein, embodiments of the present invention contemplate manual, autonomous, and remote control and operation of castable devices in a marine environment for many different types of tasks and systems, including, for example, sonar, tracking, alert functionality, and video streaming, among many others.

In some embodiments, a castable sonar device is provided. The castable sonar device includes a housing configured to float on a body of water above an underwater environment. The housing comprises a tether connection feature configured to connect to a tether or fishing line. A power source is positioned within the housing. A transducer assembly is positioned within the housing. Wherein the transducer assembly includes a transducer array positioned within the housing and aimed downwardly therefrom. The transducer array comprises a phased array. The phased array comprises a plurality of transducer elements. Each of the plurality of transducer elements is configured to receive phased array sonar returns from the underwater environment. A wireless communication element is configured to transmit one or more signals to and receive one or more signals from a remote computing device. A processing circuitry is provided within the housing. The processing circuitry is configured to receive one or more phased array sonar returns from the transducer array, process the one or more phased array sonar returns to generate phased array sonar return data corresponding to the underwater environment, generate, based on the phased array sonar return data, a sonar image corresponding to the underwater environment, and transmit, via the wireless communication element, the sonar image to the remote computing device for presentation on a display of the remote computing device.

In some embodiments, the castable sonar device further includes a wide beam sonar transmitter configured to transmit sonar beams into the underwater environment, and the phased array is configured to receive sonar returns corresponding to the sonar beams.

In some embodiments of the castable sonar device, the phased array is configured to transmit sonar beams into the underwater environment and receive sonar returns therefrom.

In some embodiments of the castable sonar device, the phased array transmits frequency steered sonar beams.

In some embodiments of the castable sonar device, an angle, with respect to a water line of the body of water, of a sonar return associated with an object in the underwater environment is determined based on a phase difference between sonar returns associated with the object that are received at two or more transducer elements of the phased array.

In some embodiments of the castable sonar device, an angle, with respect to a water line of the body of water, of a sonar return associated with an object in the underwater environment is determined based on relative positions and known distances between two or more transducer elements of the phased array. The two or more transducer elements each receive a sonar return associated with the object.

In some embodiments of the castable sonar device, the determined angle corresponding to the sonar return associated with the object is used to generate a three-dimensional position of the object in the underwater environment for the sonar image.

In some embodiments of the castable sonar device, the determined angle corresponding to the sonar return associated with the object is used to generate a two-dimensional position of the object in the underwater environment for the sonar image.

Some embodiments of the castable sonar device further include a location sensor configured to determine the position of the castable sonar device. The processing circuitry is configured to determine a current position of the castable sonar device and transmit the current position of the castable sonar device to the remote computing device.

Some embodiments of the castable sonar device further include a propulsion system configured to propel the castable sonar device along a surface of the body of water. The processing circuitry is configured to receive instructions from the remote computing device to move to a location and cause the propulsion system to operate to cause the castable sonar device to move to the location.

In some embodiments of the castable sonar device, the processing circuitry is configured to maintain the castable sonar device within a predetermined distance threshold from a second castable sonar device such that the castable sonar device and the second castable sonar device form an array to provide increased sonar coverage of the underwater environment.

Some embodiments of the castable sonar device further include an attachment for a lure, a motion sensor configured to detect motion corresponding to a bite, and a light indicator. The processing circuitry is configured to receive motion data from the motion sensor, determine, based on the motion data, occurrence of a bite, and cause the light indicator to illuminate to provide an indication of the occurrence of the bite.

Some embodiments of the castable sonar device further include a memory, wherein the processing circuitry is configured to determine a signal connection strength between the wireless communication element and the remote computing device and save in the memory, in an instance in which the signal connection strength is below a minimum signal connection strength threshold, the sonar image for later transmission to the remote computing device once the signal connection strength increases above the minimum signal connection strength threshold.

Some embodiments of the castable sonar device further include a dispense mechanism configured to dispense at least one of an aroma, chum, or a chemical attractant into the underwater environment. The processing circuitry is configured to cause the dispense mechanism to cause dispensing of the aroma, the chum, or the chemical attractant into the underwater environment.

In some embodiments of the castable sonar device, the transducer elements are affixed to a printed circuit board (PCB), wherein each of the plurality of transducer elements is electrically connected to traces on the PCB.

Some embodiments of the present disclosure provide a system including a castable sonar device. The castable sonar device includes a housing configured to float on a body of water above an underwater environment. The housing includes a tether connection feature configured to connect to a tether or fishing line. A power source is positioned within the housing. A transducer assembly is positioned within the housing. The transducer assembly includes a transducer array positioned within the housing and aimed downwardly therefrom. The transducer array includes a phased array. The phased array comprises a plurality of transducer elements. Each of the plurality of transducer elements is configured to receive phased array sonar returns from the underwater environment. A wireless communication element is configured to transmit one or more signals to and receive one or more signals from a remote computing device. Processing circuitry provided within the housing. The processing circuitry is configured to receive one or more phased array sonar returns from the transducer array, process the one or more phased array sonar returns to generate phased array sonar return data corresponding to the underwater environment, generate, based on the phased array sonar return data, a sonar image corresponding to the underwater environment, and transmit, via the wireless communication element, the sonar image to the remote computing device for presentation on a display of the remote computing device. The remote computing device comprises a wireless communication element configured to receive the sonar image from the castable sonar device, a user interface comprising the display, and processing circuitry. The processing circuitry is configured to receive the sonar image from the castable sonar device and cause presentation of the sonar image on the display of the remote computing device.

Some embodiments of the present disclosure provide a system including a castable sonar device. The castable sonar device includes a housing configured to float on a body of water above an underwater environment. The housing comprises a tether connection configured to connect to a tether or fishing line. A power source is positioned within the housing. A transducer assembly is positioned within the housing. The transducer assembly comprises a transducer array positioned within the housing and aimed downwardly therefrom. The transducer array comprises a phased array. Each of the plurality of transducer elements is configured to receive phased array sonar returns from the underwater environment. A wireless communication element configured to transmit one or more signals to and receive one or more signals from a remote computing device. Processing circuitry is provided within the housing. The processing circuitry is configured to receive one or more phased array sonar returns from the transducer array and transmit, via the wireless communication element, the one or more phased array sonar returns to the remote computing device. The remote computing device comprises a wireless communication element configured to receive one or more signals from the castable sonar device, a user interface comprising a display, and processing circuitry. The processing circuitry is configured to receive the one or more phased array sonar returns from the castable sonar device, process the one or more phased array sonar returns to generate phased array sonar return data corresponding to the underwater environment, generate, based on the phased array sonar return data, a sonar image corresponding to the underwater environment, and cause presentation of the sonar image on the display of the remote computing device.

BRIEF DESCRIPTION OF THE DRAWINGS

Figure 1:
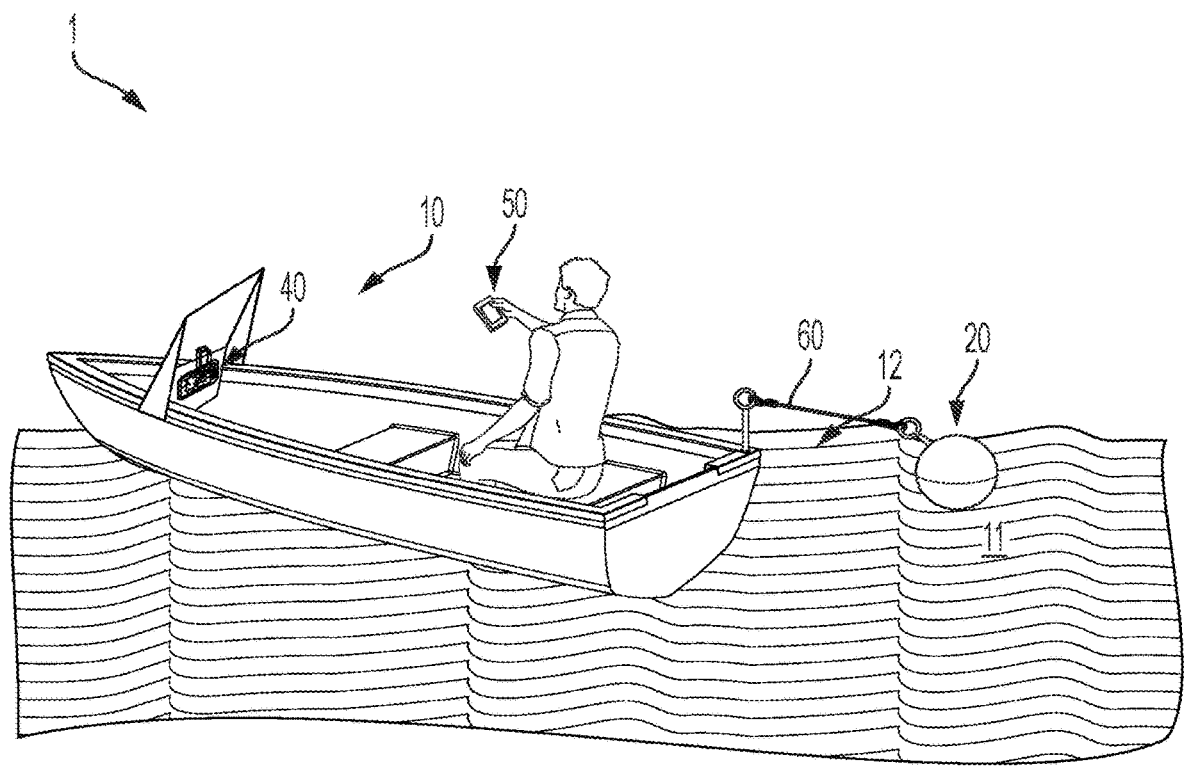
Figure 2B:
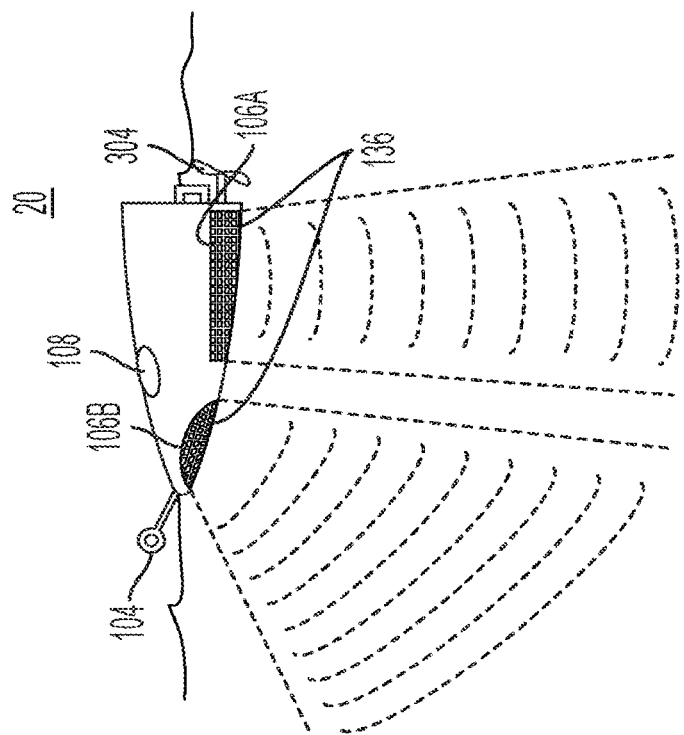
Figure 2A:
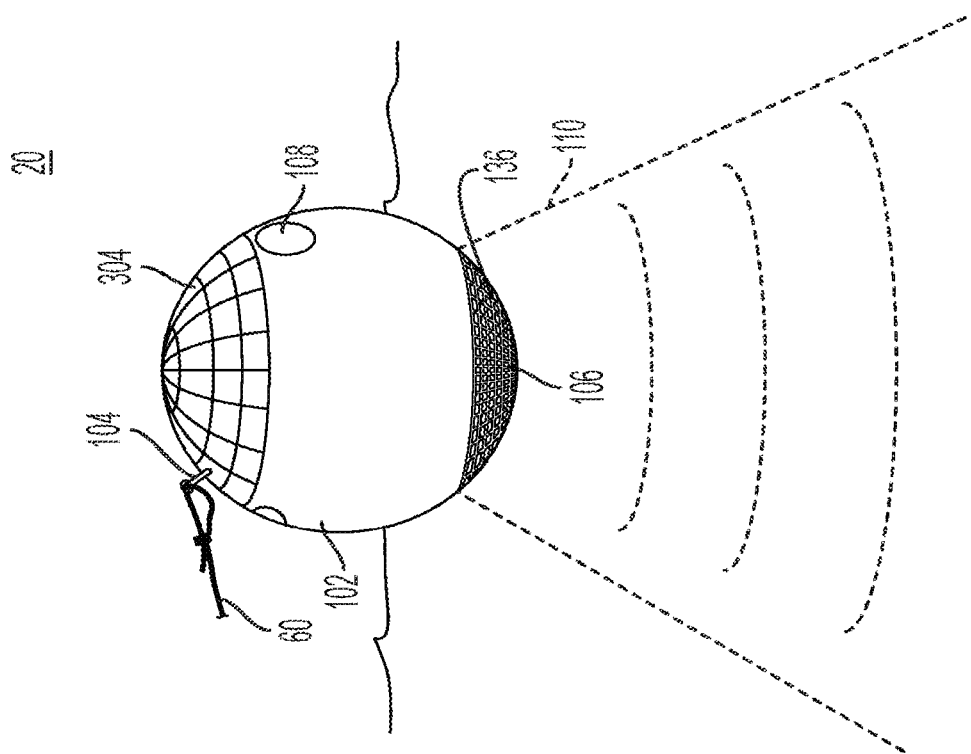
Figure 2C:
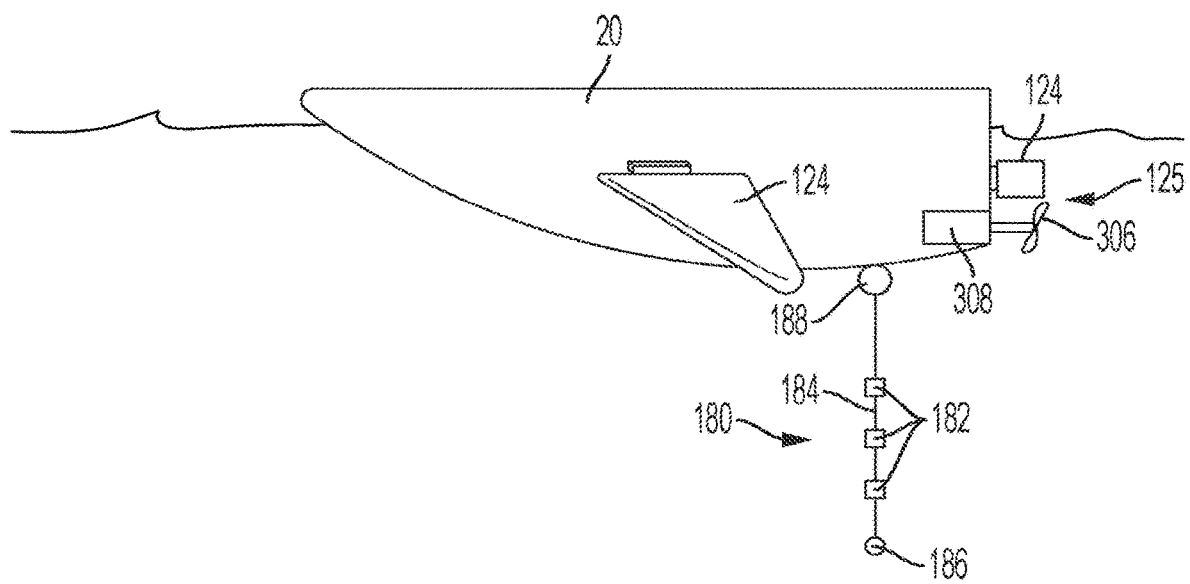
Figure 2D:
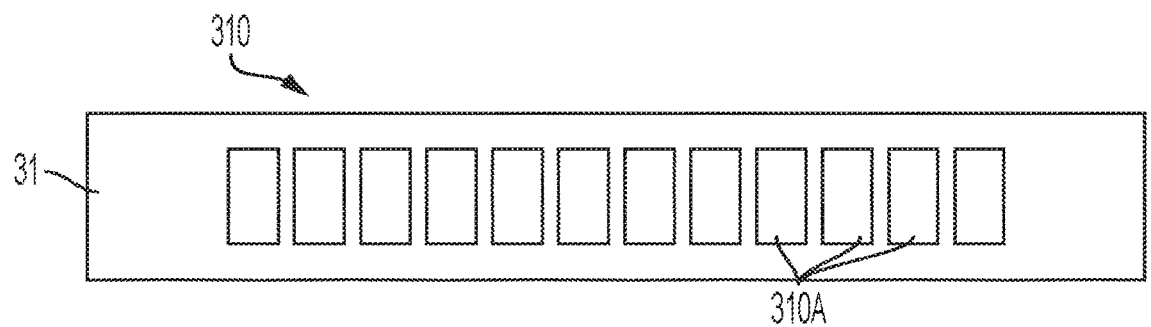
Figure 2E:
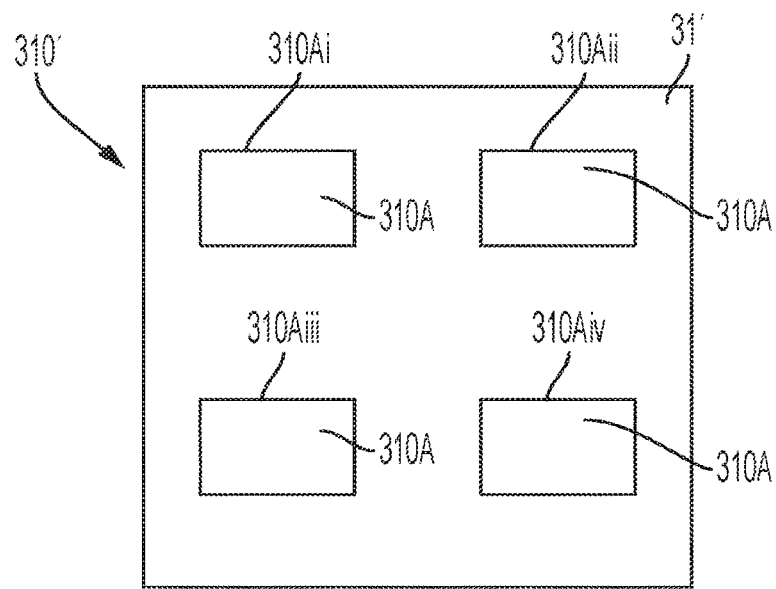
Figure 2F:
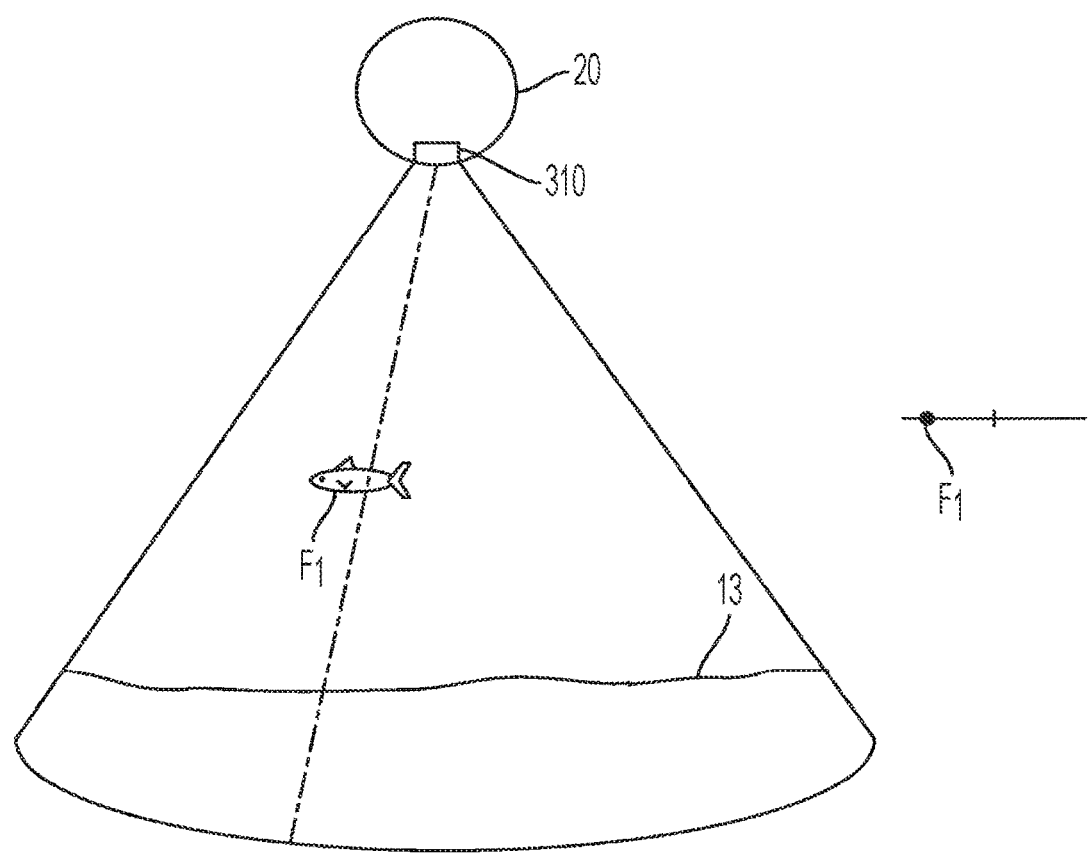
Figure 2G:
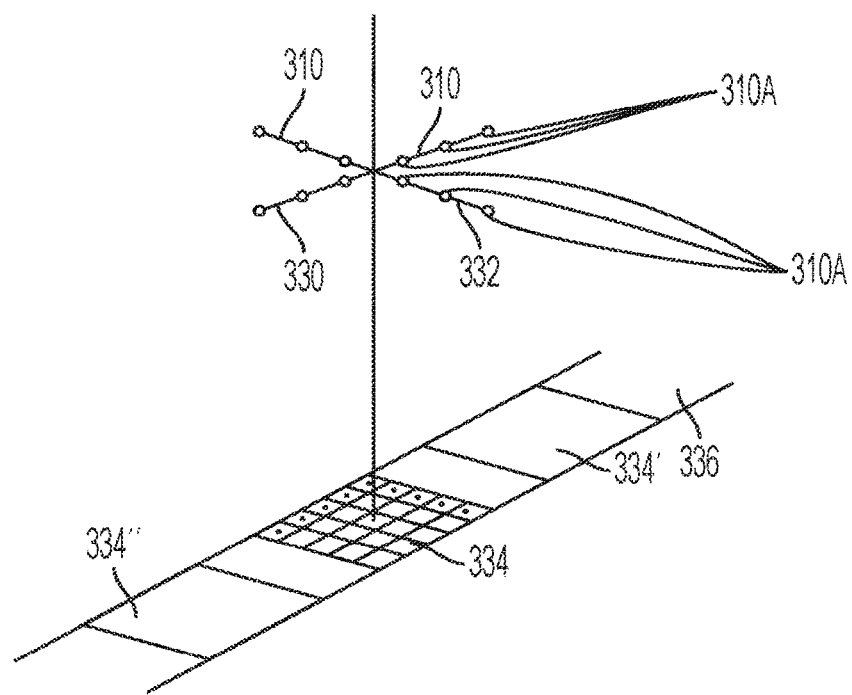
Figure 2H:
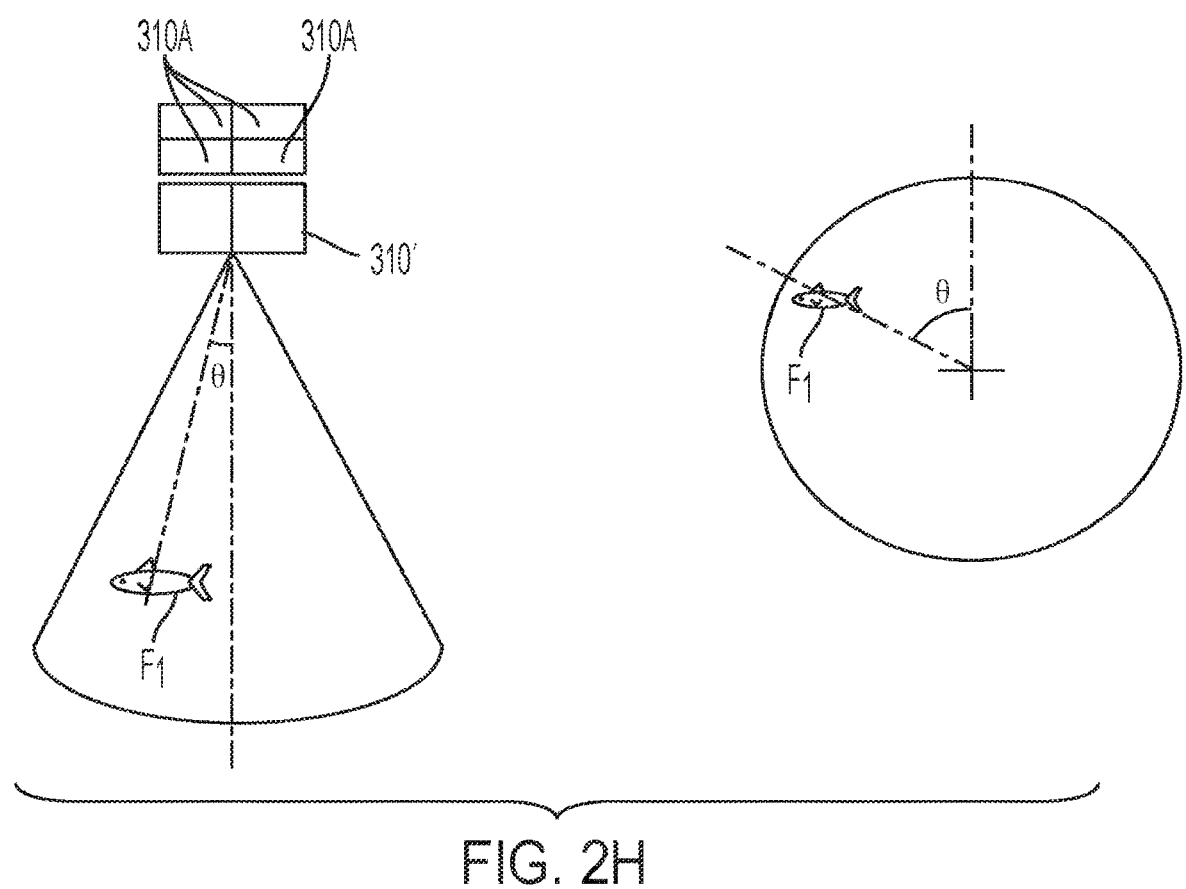
Figure 3:
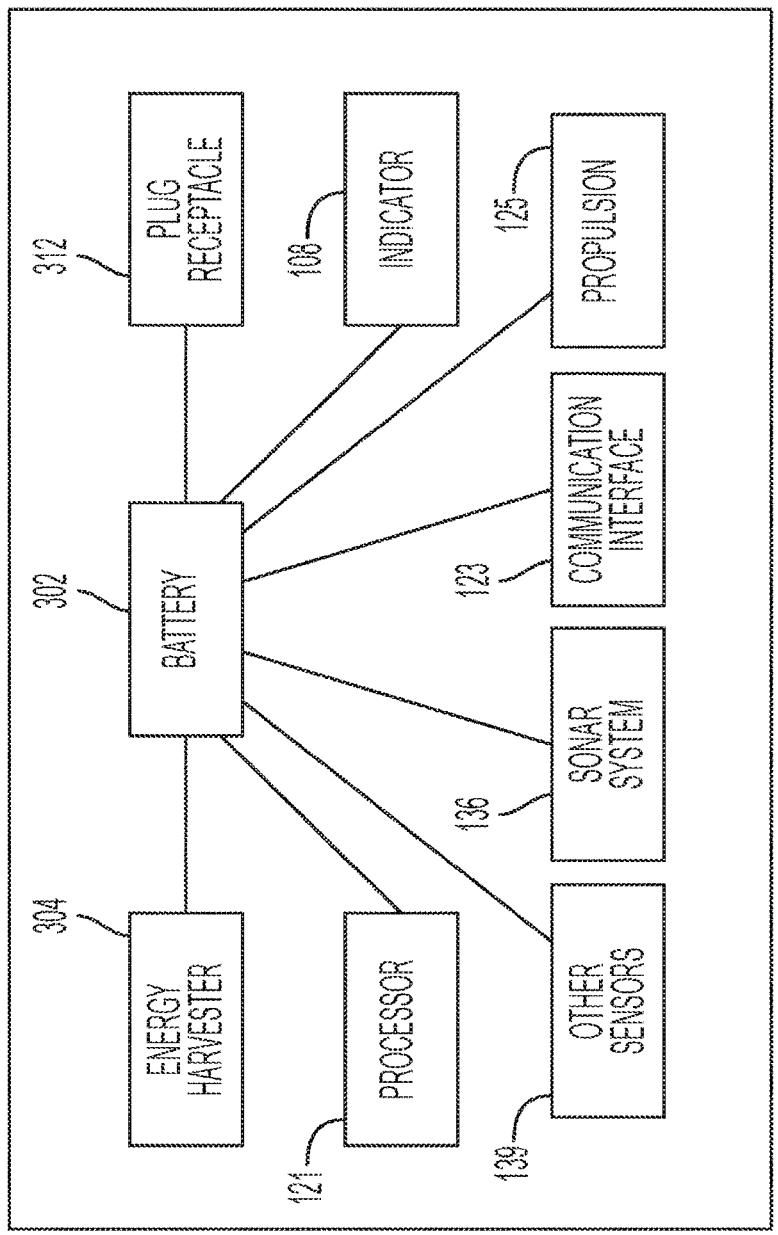
Figure 4A:
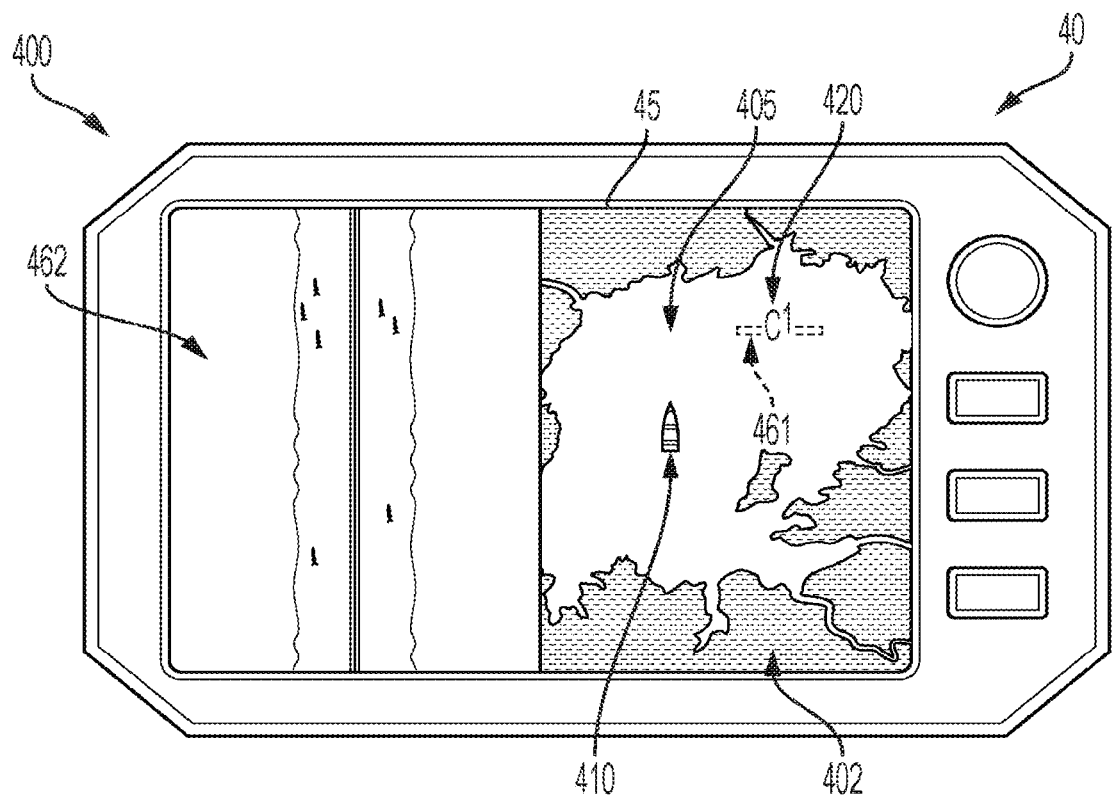
Figure 4B:
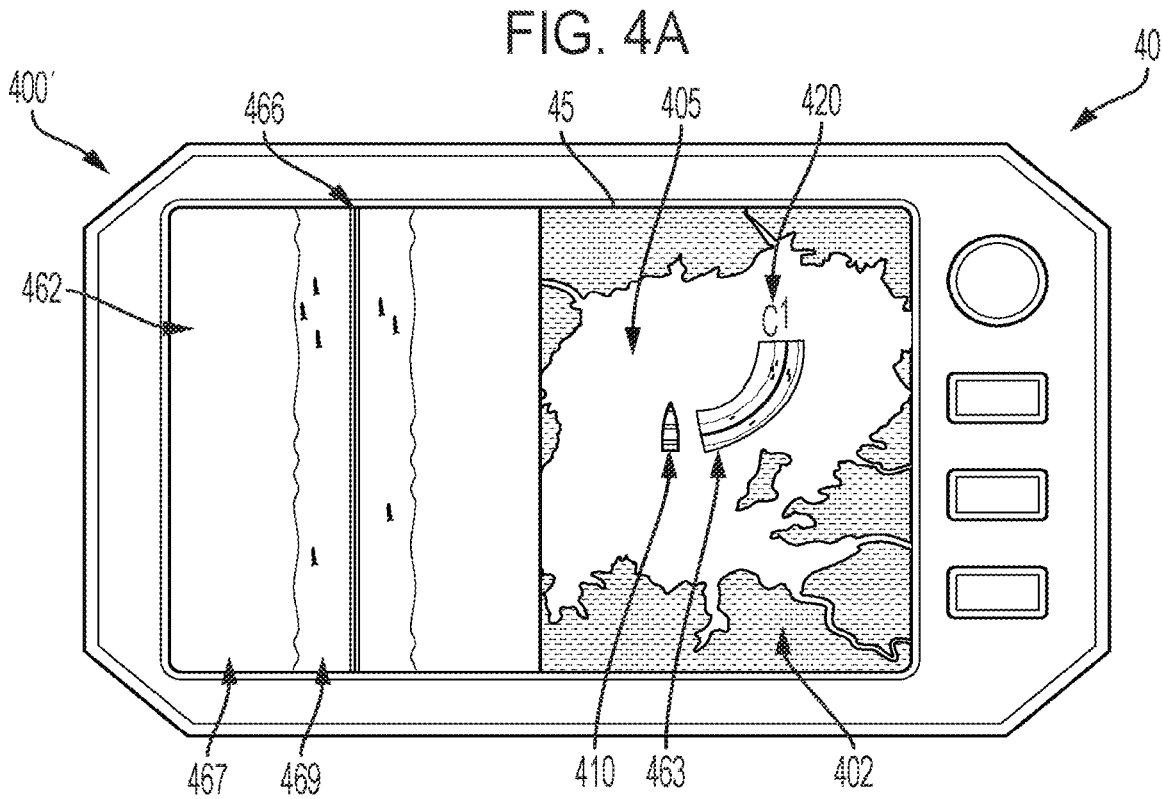
Figure 5:
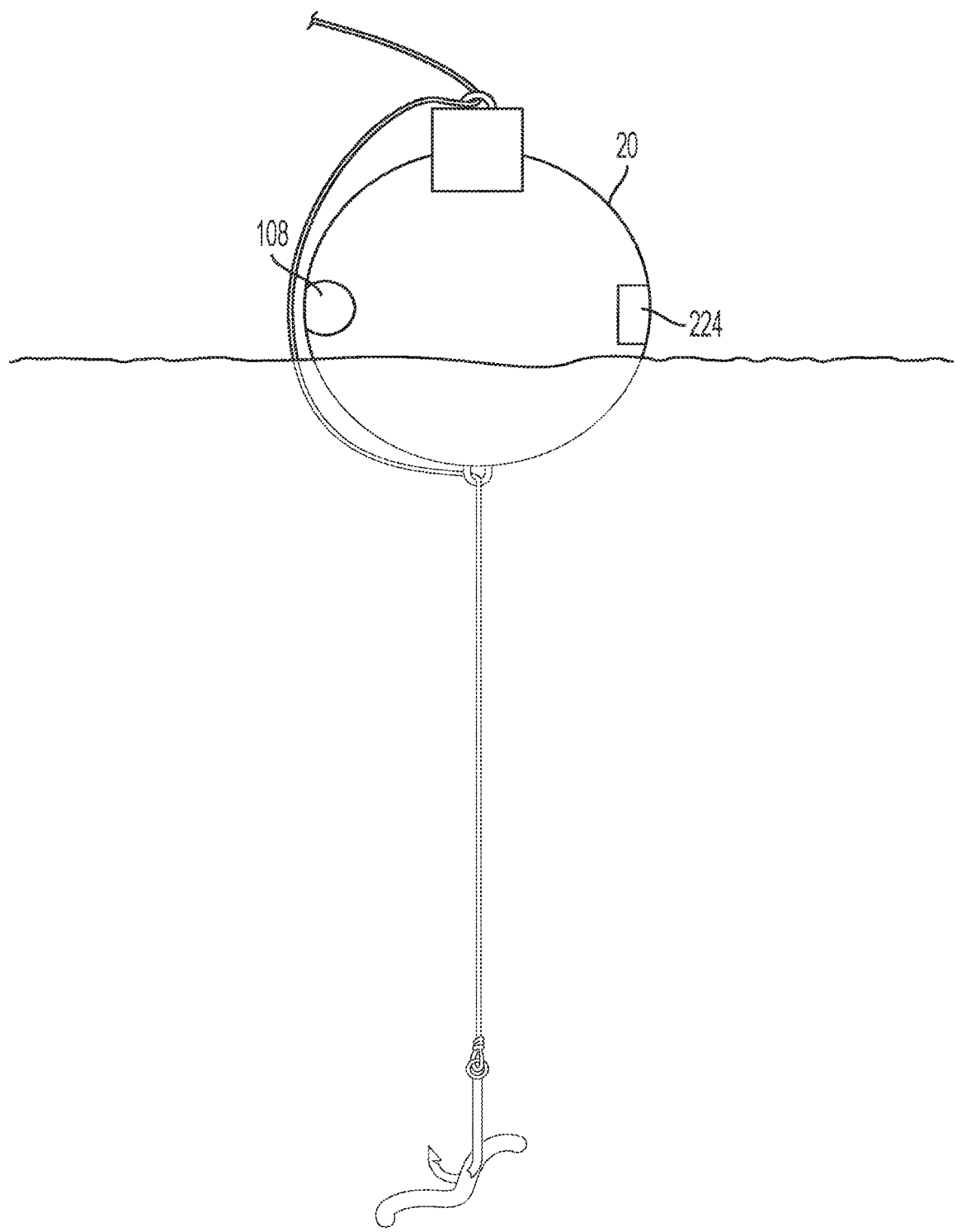
Figure 6:
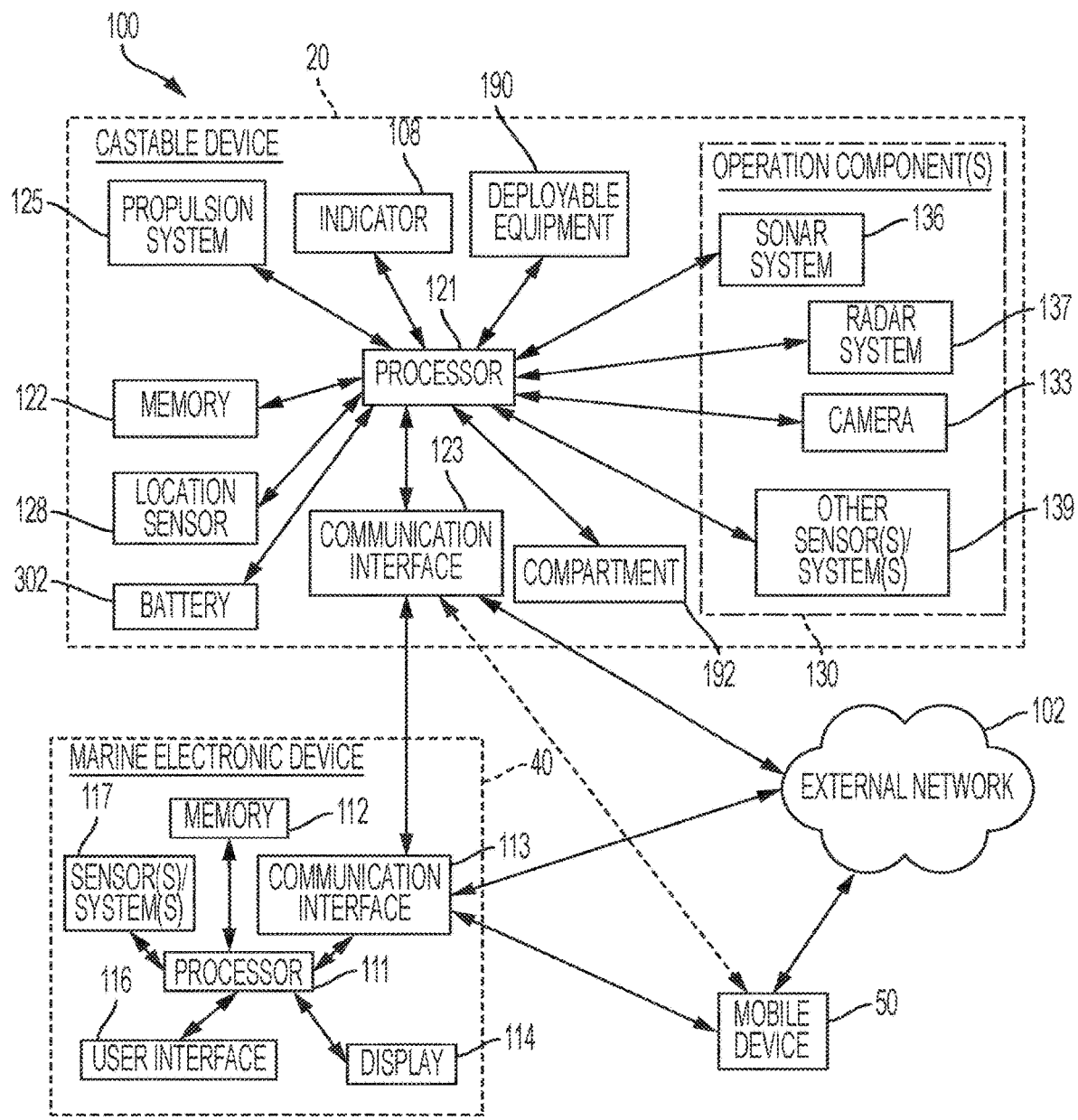
Figure 7:
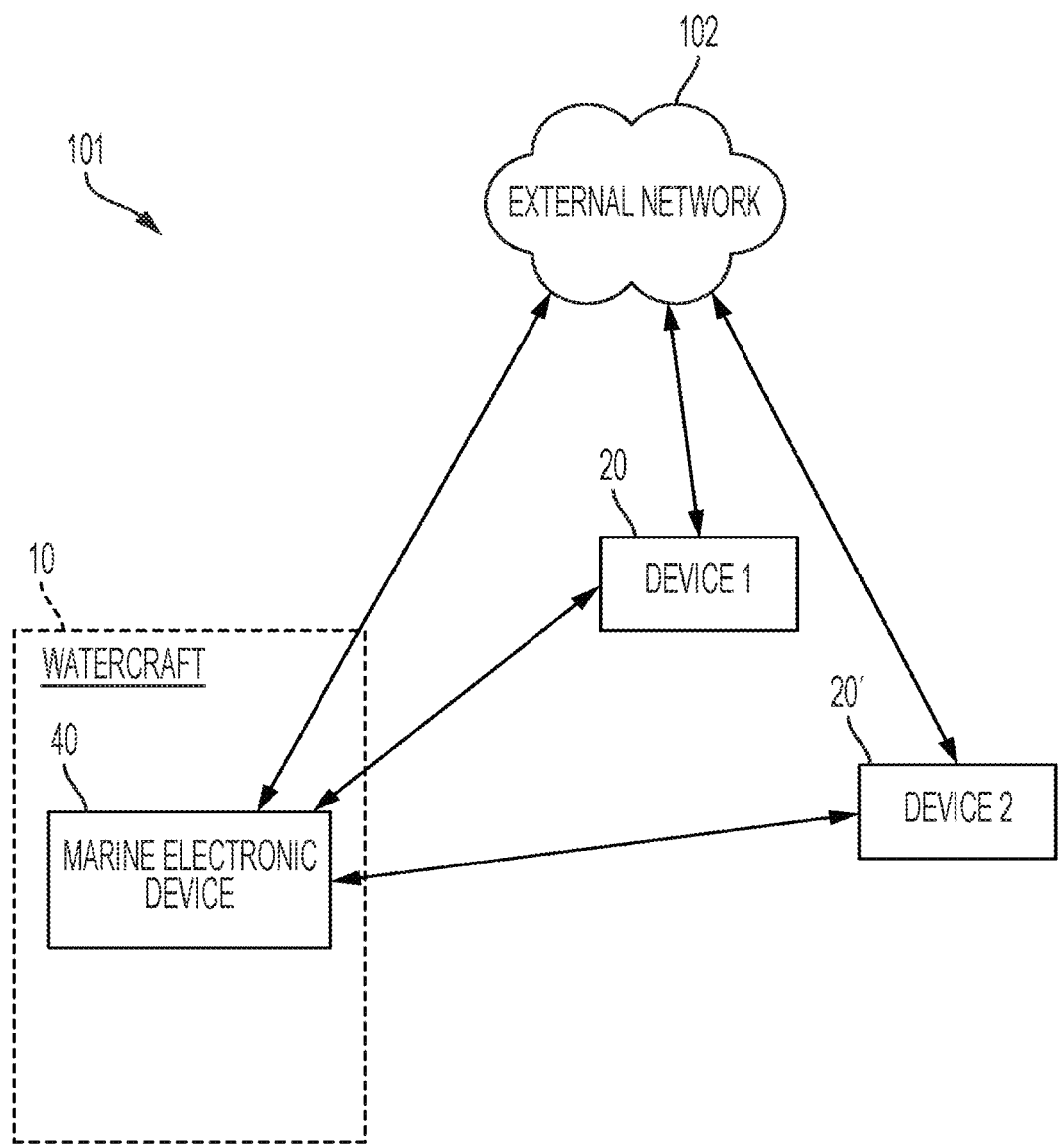
Figure 8:
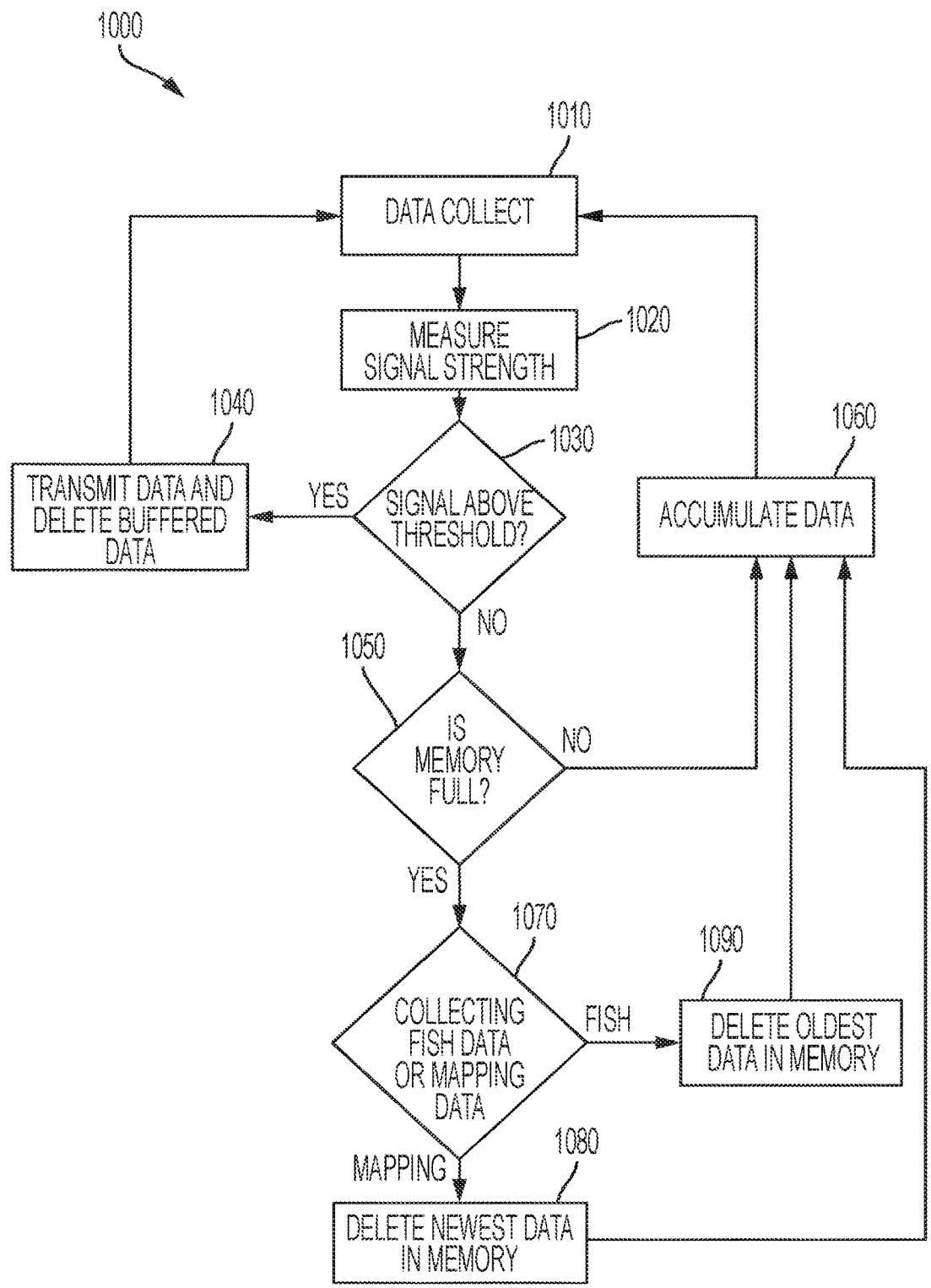
Figure 9:
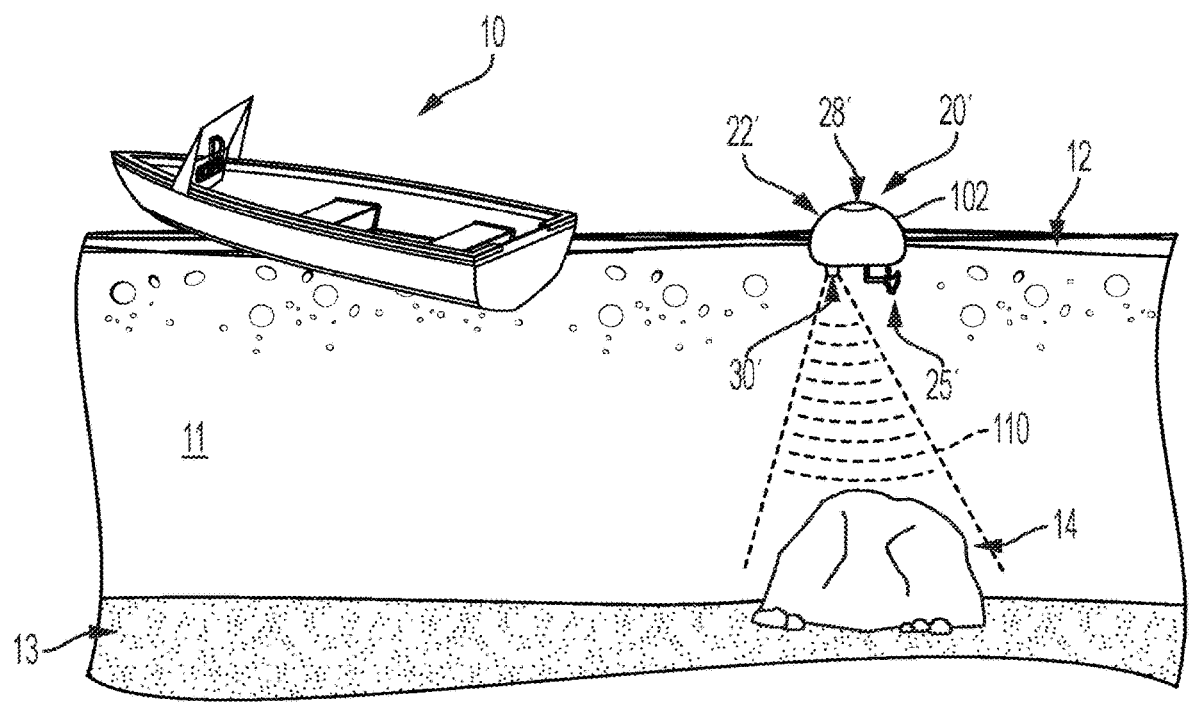
Figure 10A:
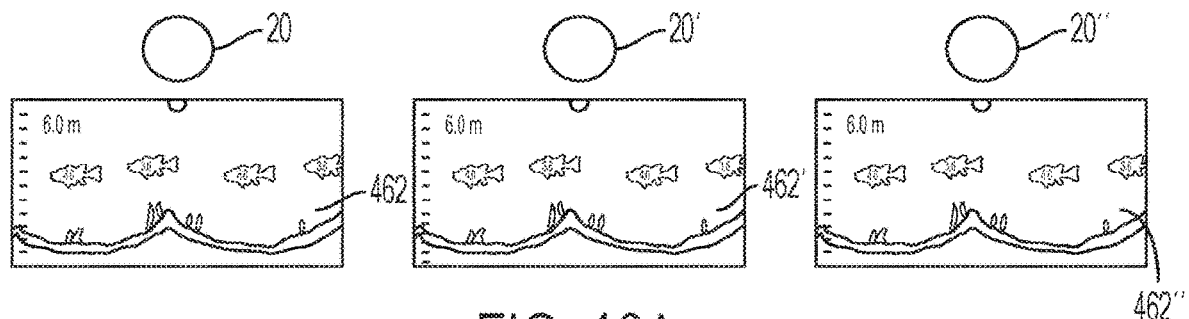
Figure 10B:
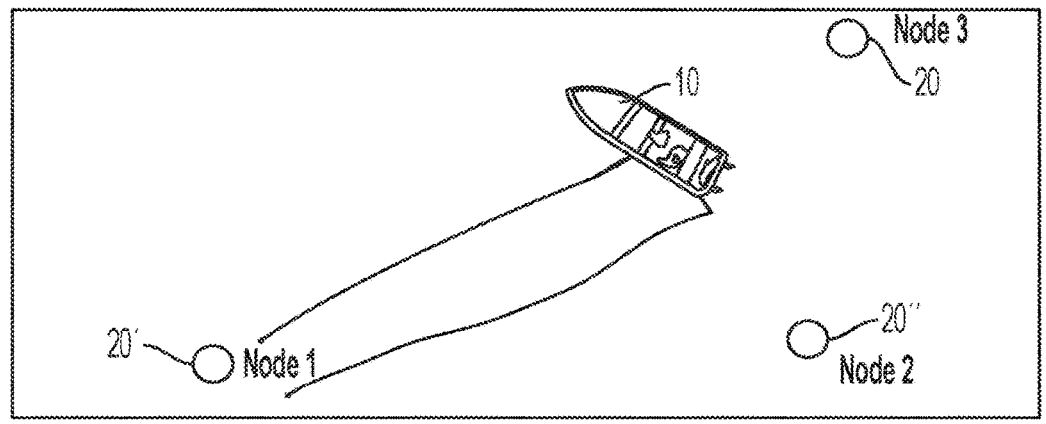
Figure 10C:
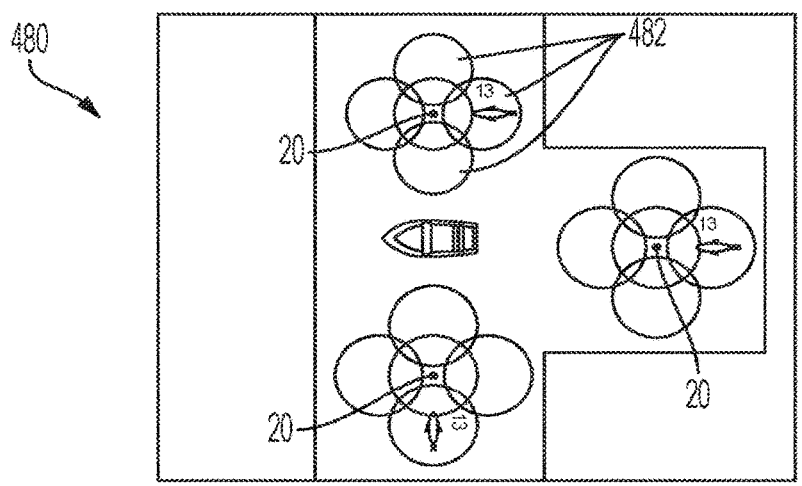
Figure 10D:
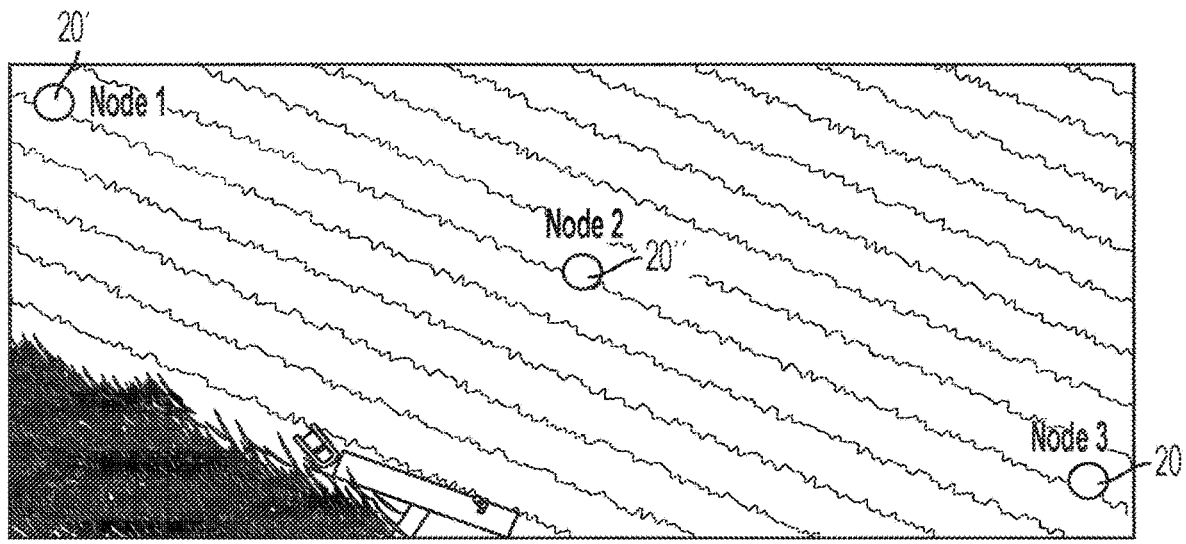
Figure 10E:
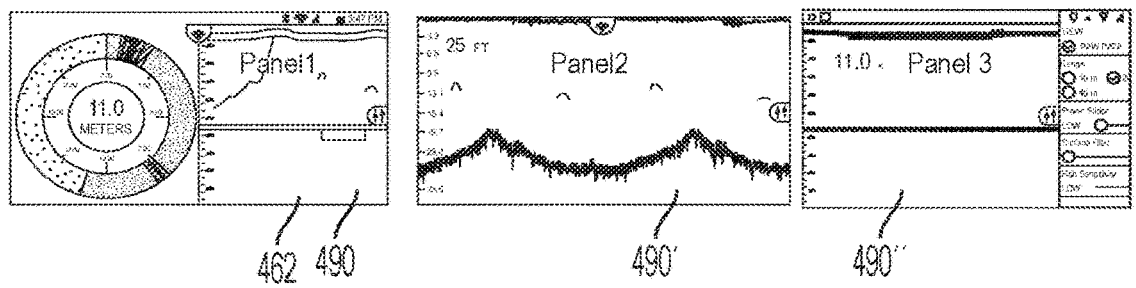
Figure 11:
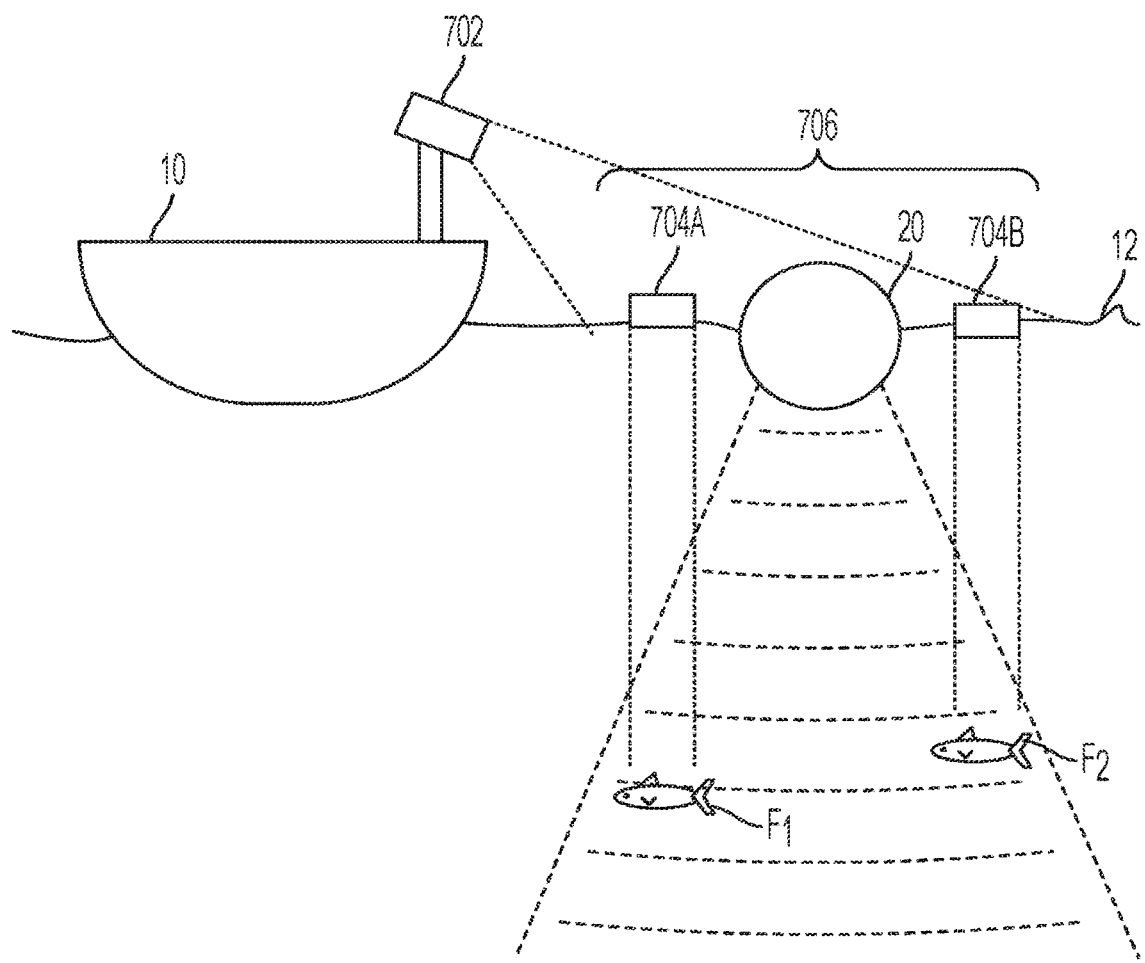
Figure 12:
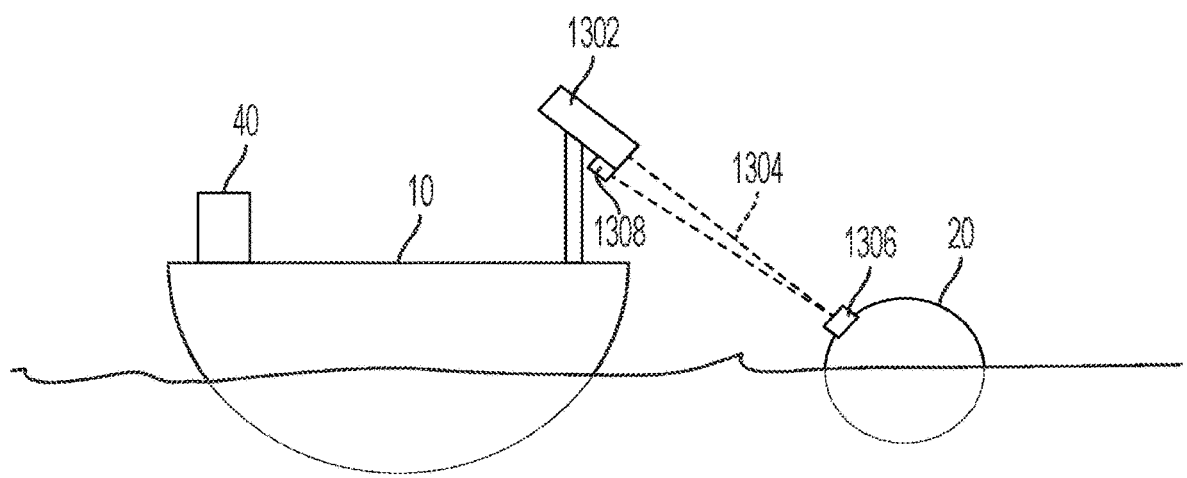
Figure 13:
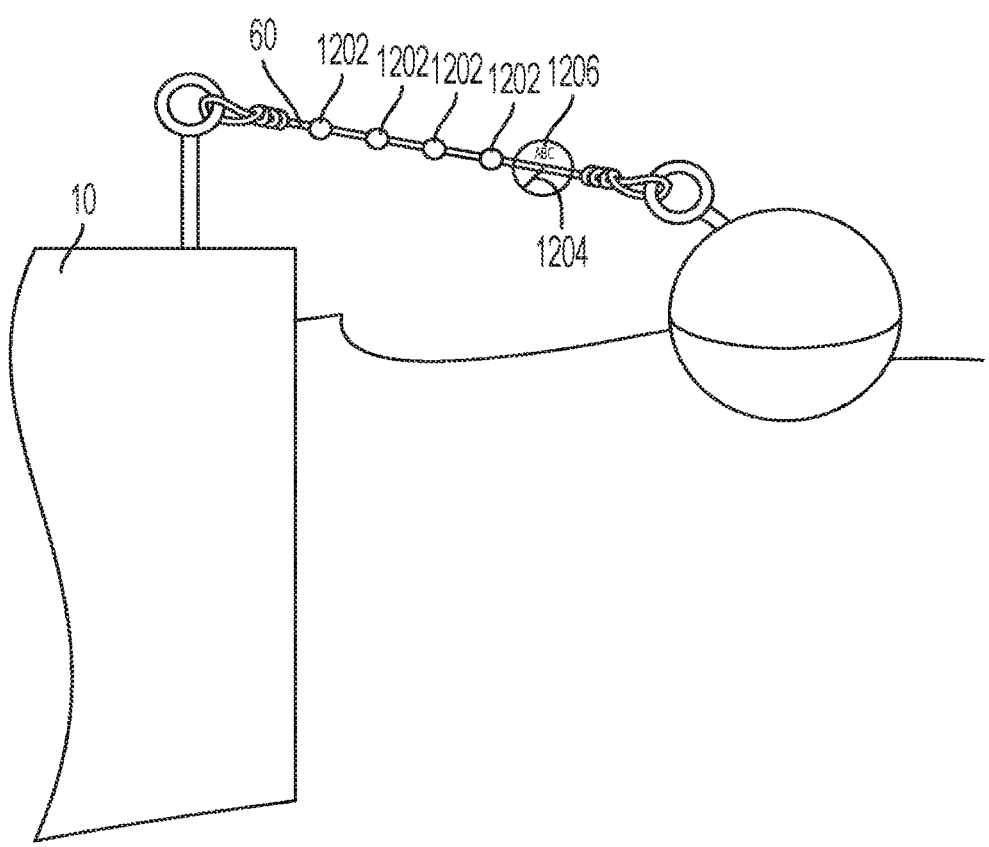
Figure 14A:
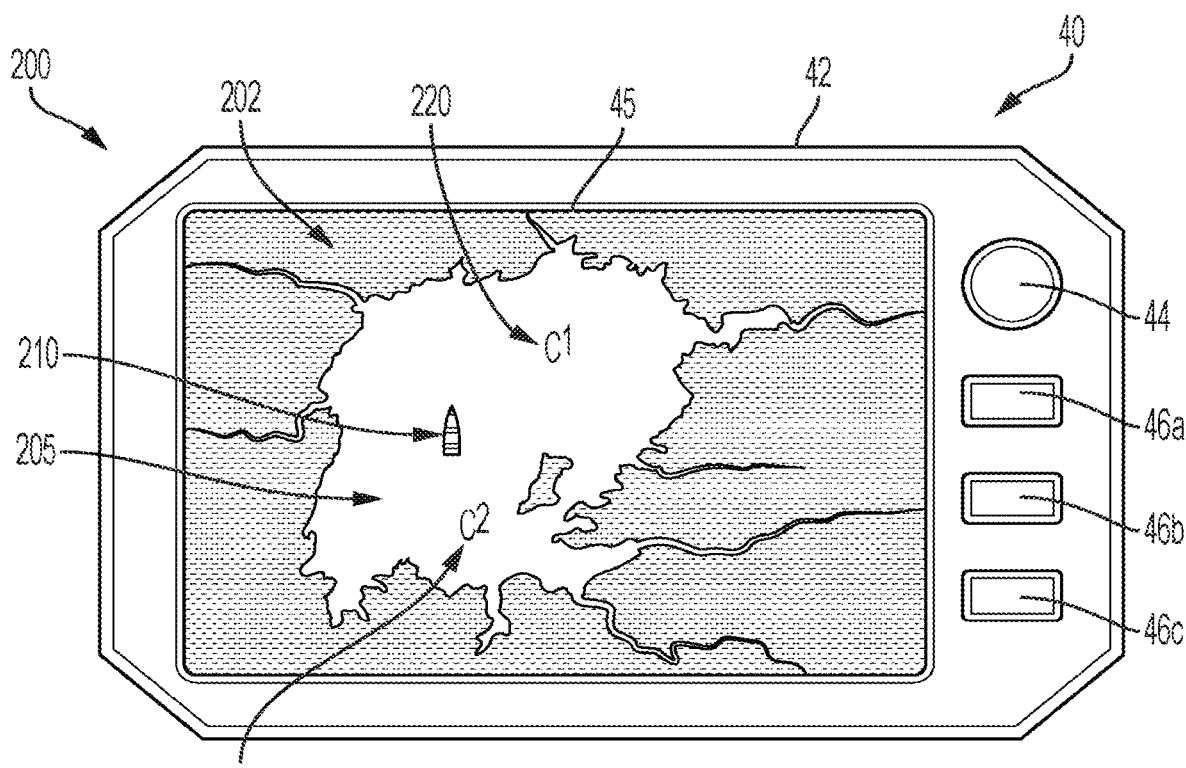
Figure 14B:
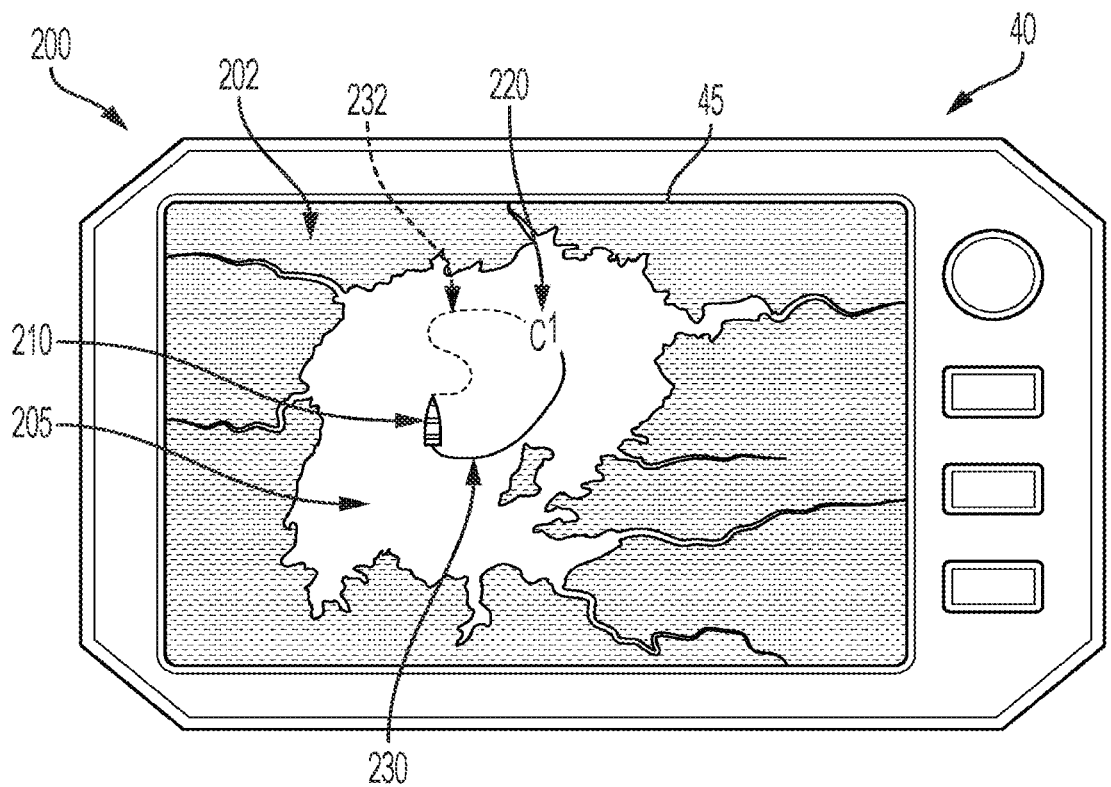
Figure 14C:
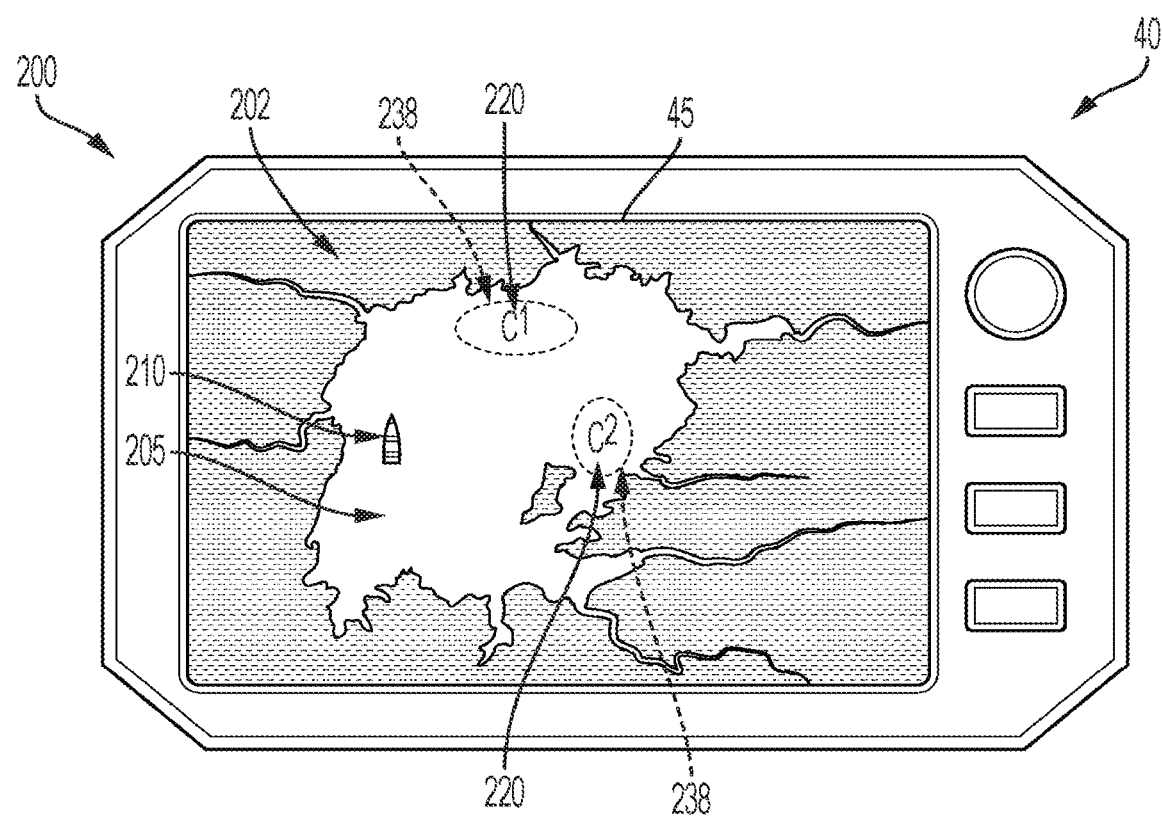
Figure 15A:
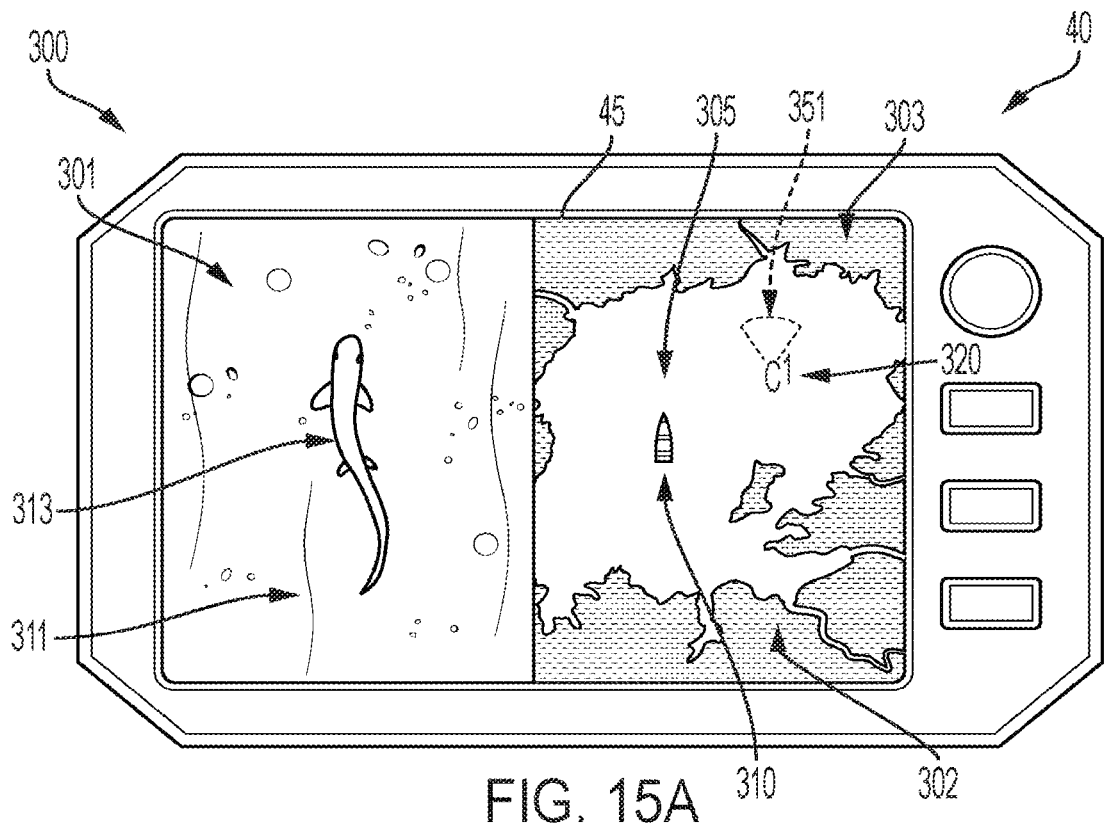
Figure 15B:
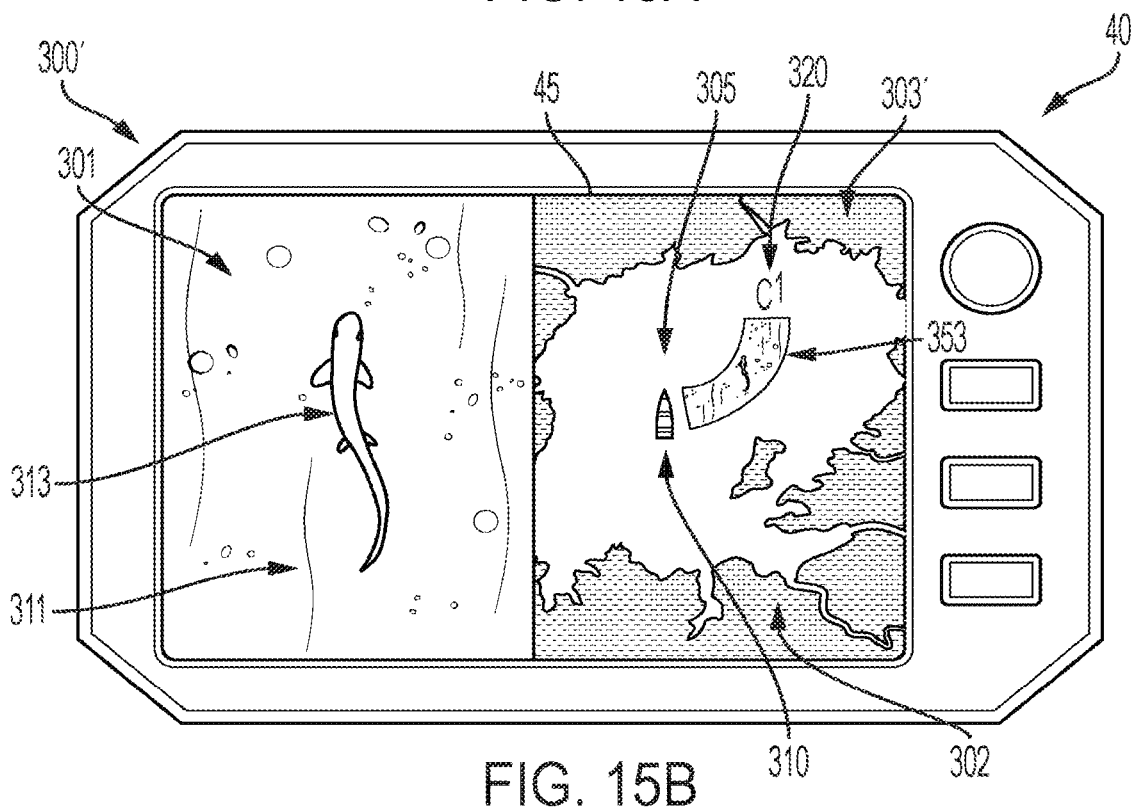
Figure 16:
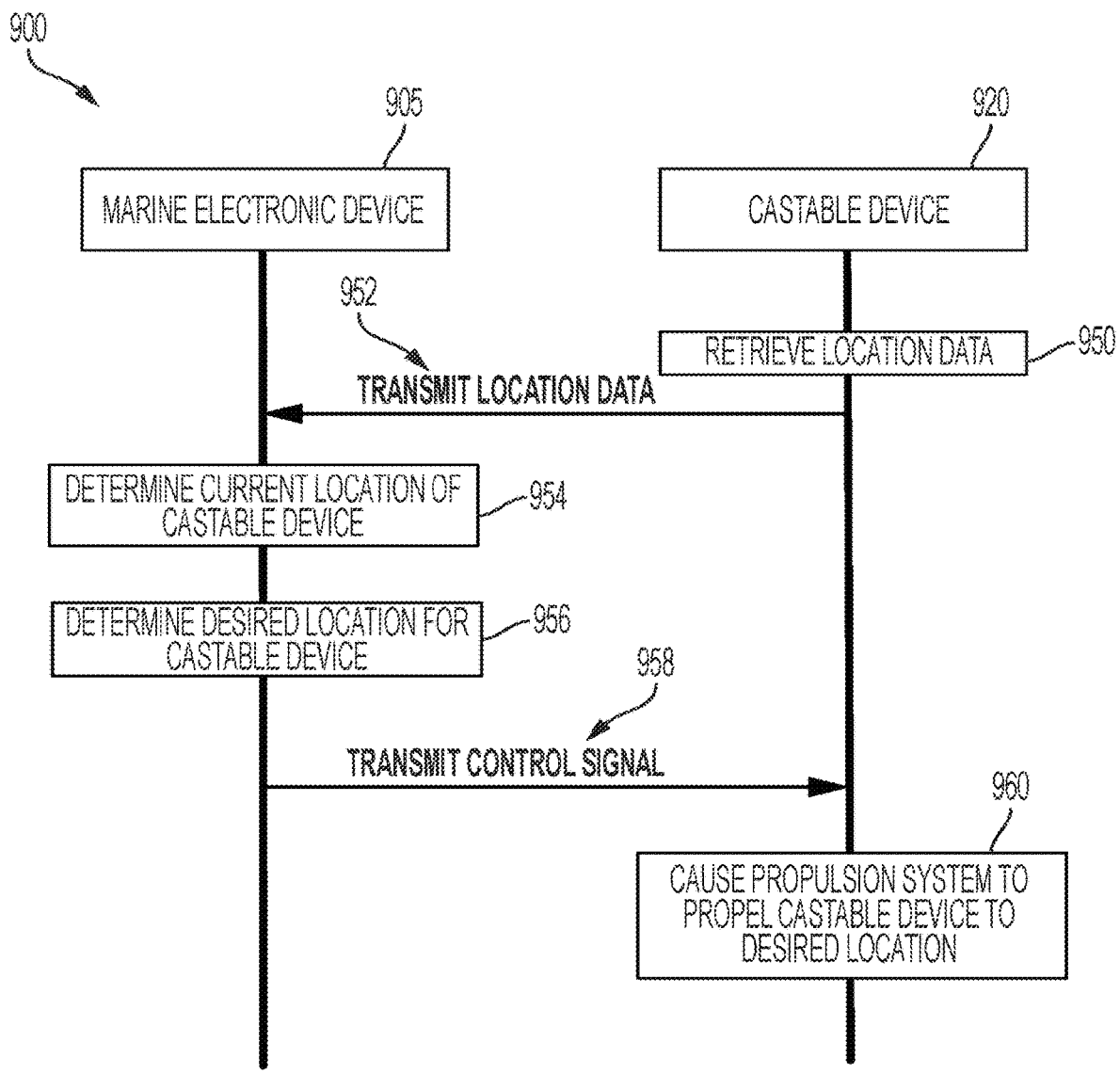
Figure 17:
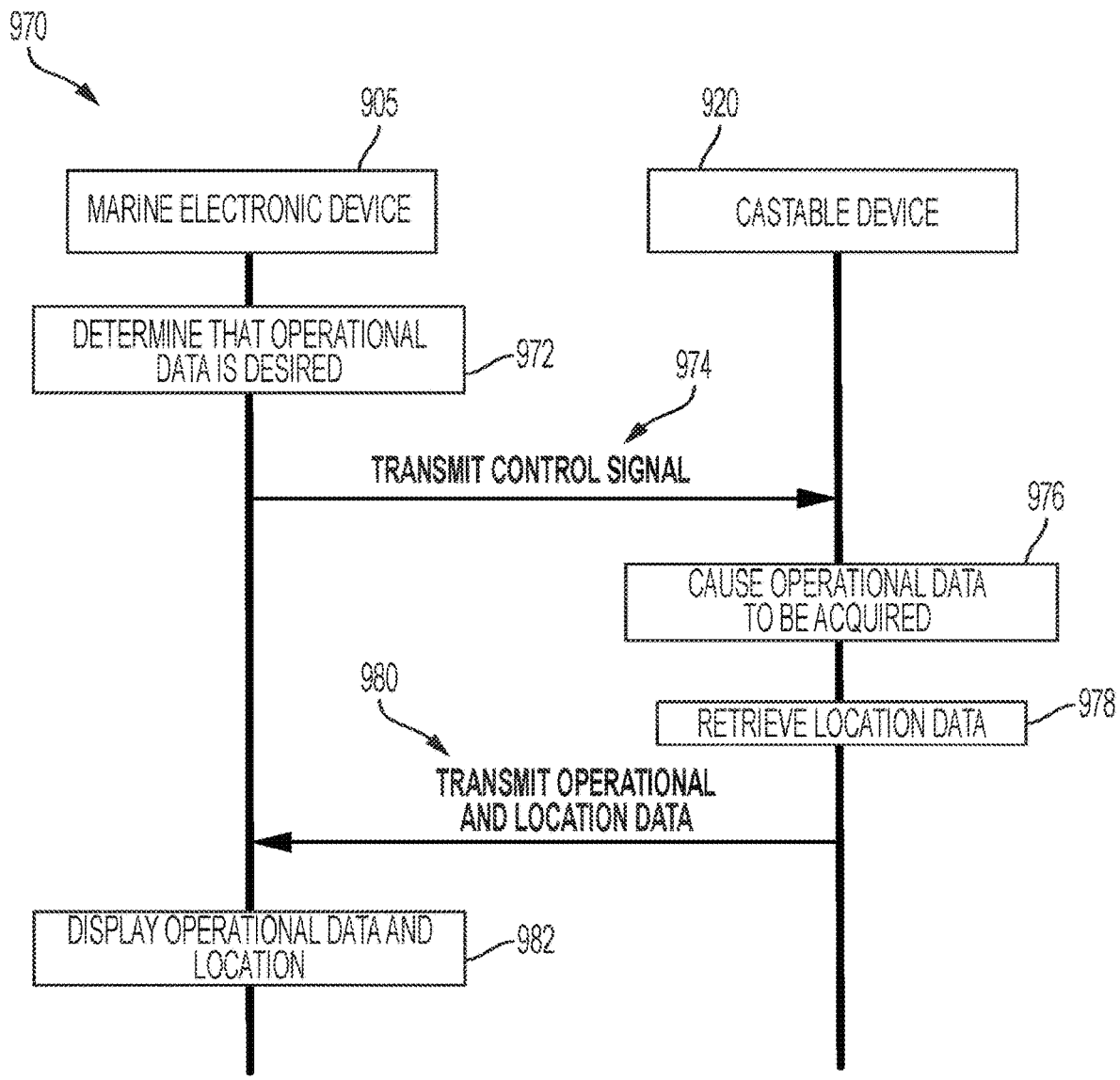

Having thus described the invention in general terms, reference will now be made to the accompanying drawings, which are not necessarily drawn to scale, and wherein:

FIG. 1 illustrates a marine environment that includes an example watercraft and an example castable device, in accordance with some embodiments discussed herein;

FIG. 2A shows an example castable device, in accordance with some embodiments discussed herein;

FIG. 2B shows another example castable device, in accordance with some embodiments discussed herein;

FIG. 2C shows a further example castable device, in accordance with some embodiments discussed herein;

FIG. 2D shows an example diagram of an arrangement of transducer elements on a printed circuit board (PCB) of a phased array, in accordance with various implementations described herein;

FIG. 2E shows another example diagram of an arrangement of transducer elements on a printed circuit board (PCB) of a phased array, in accordance with various implementations described herein;

FIG. 2F shows a 2-dimensional swath of data captured by a phased array, in accordance with various implementations described herein;

FIG. 2G shows an example diagram of a Mills Cross phased array configuration, in accordance with various implementations described herein;

FIG. 2H shows operation of a split-beam transducer, in accordance with various implementations described herein;

FIG. 3 shows a block diagram of an example castable sonar device that illustrates an example power system, in accordance with various implementations described herein;

FIG. 4A shows an example screen of a marine electronic device, wherein the screen shows sonar imagery taken from the castable device on a left portion of the screen and a chart illustrating locations of the watercraft and castable device on a body of water on the right portion of the screen, in accordance with some embodiments discussed herein;

FIG. 4B shows an example screen of a marine electronic device, wherein the screen shows sonar imagery taken from the castable device on a left portion of the screen and a chart illustrating locations of the watercraft and castable device on a body of water on the right portion of the screen, wherein the sonar imagery is overlaid on the chart, in accordance with some embodiments discussed herein;

FIG. 5 illustrates a castable sonar device having a motion sensor for detecting when a fish is hooked, in accordance with some embodiments discussed herein;

FIG. 6 shows a block diagram illustrating an example system for controlling and operating a castable device, in accordance with some embodiments discussed herein;

FIG. 7 shows a block diagram illustrating an example environment for example systems for controlling and operating multiple castable devices, in accordance with some embodiments discussed herein;

FIG. 8 illustrates a method for storing data when the castable device is outside of transmission range of its corresponding receiver, in accordance with some embodiments discussed herein;

FIG. 9 illustrates an example marine environment with a watercraft and a castable device, wherein the castable device acts as a buoy to visually indicate a location of a desired underwater feature, in accordance with some embodiments discussed herein;

FIG. 10A illustrates a plurality of networked castable sonar devices and displays of their respectively collected data, in accordance with some embodiments discussed herein;

FIG. 10B illustrates a plurality of networked castable sonar devices that are deployed at various locations around a marine vessel, in accordance with some embodiments discussed herein;

FIG. 10C shows a representation of sonar data displayed on a marine electronic device that illustrates collected sonar data including data collected from each castable device of FIG. 10B, in accordance with some embodiments discussed herein;

FIG. 10D illustrates a plurality of networked castable sonar devices that are deployed at various locations along a body of water, in accordance with some embodiments discussed herein;

FIG. 10E illustrates a representation of sonar data from the plurality of sonar devices of FIG. 10D, in accordance with some embodiments discussed herein;

FIG. 11 illustrates a projection system that projects on a body of water's surface information corresponding to sonar data from a castable device, in accordance with some embodiments discussed herein;

FIG. 12 illustrates a laser tracking system for a castable device, in accordance with some embodiments discussed herein;

FIG. 13 illustrates a castable device having a tether with indicators thereon, in accordance with some embodiments discussed herein;

FIG. 14A shows an example screen of a marine electronic device, wherein the screen shows an example chart of a body of water with representations of a watercraft and two castable devices, in accordance with some embodiments discussed herein;

FIG. 14B shows an example screen of a marine electronic device, wherein the screen shows an example chart of a body of water with representations of a watercraft, a castable device, and a path taken by the castable device, in accordance with some embodiments discussed herein;

FIG. 14C shows an example screen of a marine electronic device, wherein the screen shows an example chart of a body of water with representations of a watercraft, two castable devices, and corresponding survey areas for each castable device, in accordance with some embodiments discussed herein;

FIG. 15A shows an example screen of a marine electronic device, wherein the screen shows video taken from the castable device on a left portion of the screen and a chart illustrating locations of the watercraft and castable device on a body of water on the right portion of the screen, in accordance with some embodiments discussed herein;

FIG. 15B shows an example screen of a marine electronic device, wherein the screen shows video taken from the castable device on a left portion of the screen and a chart illustrating locations of the watercraft and castable device on a body of water on the right portion of the screen, wherein images from the video are overlaid on the chart, in accordance with some embodiments discussed herein;

FIG. 16 illustrates a flow control diagram of an example method of controlling and operating a castable device to cause the castable device to travel to a desired location, in accordance with some embodiments discussed herein; and FIG. 17 illustrates a flow control diagram of an example method of controlling and operating a castable device to cause the castable device to gather operational data, in accordance with some embodiments discussed herein.

DETAILED DESCRIPTION

Exemplary embodiments of the present invention now will be described more fully hereinafter with reference to the accompanying drawings, in which some, but not all embodiments of the invention, are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Overview

Embodiments of the present invention contemplate many different configurations and uses of castable devices in a marine environment. The term "castable device" generally refers to an assembly that is configured to be cast into a body of water. In some embodiments, the castable device is placed in the body of water adjacent a marine vessel. In other various embodiments, the castable device is attached to a fishing line of a fishing rod, and the castable device is cast via the rod into the body of water. FIG. 1 shows a marine vessel 10 and castable sonar device 20 in a marine environment 1. As depicted, the marine vessel 10 is floating on a surface 12 of a body of water 11 and a castable device 20 is floating nearby. The castable device 20 has a net density so that it floats on the surface 12 of the body of water 11. The castable device 20 attaches to the marine vessel 10 via a tether 60. In other embodiments, the castable device 20 attaches to a fishing rod via a fishing line and, in some embodiments, acts as a bobber (e.g., having a hook and bait/lure attached thereto). Although generally referenced throughout this disclosure as floating on the surface of the water, in further embodiments, the castable device 20 is submersible. That is, it may be neutrally buoyant and/or have ballast tanks to adjust its buoyancy so that it may sink or float, depending on a desired buoyancy. Embodiments of castable device that are configured as submersible unmanned vehicles and unmanned air vehicles are contemplated in U.S. Pat. No. 10,019,002, entitled "Unmanned Vehicle Control and Operation in a Marine Environment," which is assigned to the Assignee of the present application and is incorporated herein by reference in its entirety for all purposes.

In some embodiments, as will be described in greater detail herein, the castable device 20 may be controlled and/or operated by or through a marine electronic device 40 (e.g., a multi-function display (MFD)) of the marine vessel 10 or a mobile device 50.

Though the depicted embodiment of FIG. 1 shows an example marine vessel as a surface watercraft, other types of marine vessels are contemplated by embodiments of the present invention described herein (e.g., submersible marine vessels, hovercraft marine vessels, etc.).

The following description regarding FIGS. 2A, 2B, and 2C detail some example components of various castable devices that can be used in accordance with example embodiments described herein.

Example Housing

FIG. 2A illustrates a castable device 20 having a housing 102, a tether attachment 104 that enables attachment of the tether 60, and a sonar transducer assembly 106 attached at a bottom of the castable device 20. The castable device 20 has a net density so that it floats on the surface 12 (FIG. 1) of the body of water 11 (FIG. 1). That is, in some embodiments, the housing 102 is comprised of a buoyant material, such as, for example, expanded polystyrene foam. In some embodiments, the housing 102 includes a shell that encapsulates air so that the body's overall net density is less than that of water. The housing 102, in some embodiments, may be weight-balanced so that the castable device 20 floats in a specific orientation. For example, the housing 102 may be balanced so that certain components (e.g., communication antenna and LED indicators) are disposed above the surface 12 and other components (e.g., sonar sensors) are disposed below the surface 12 of the body of water 11.

In the illustrated embodiments, the tether attachment 104 is a pad eye to which the tether 60 (e.g., a string, rope, or fishing line) attaches by a knot, a hook, a carabiner, or any other suitable attachment method—although other tether connection features are also contemplated.

FIGS. 2B and 2C illustrate additional example castable device 20 configurations that are described in greater detail herein.

Example Power Systems

FIG. 3 illustrates a block diagram of an example castable device (e.g., the castable device 20), showing example power systems. The castable device 20 of FIG. 1 includes a battery 302 that powers various components further discussed herein. In an embodiment, the housing 102 includes a port 312 for receiving a plug that provides electricity for charging the battery from an outlet. In some embodiments, the battery couples with a power (e.g., energy) harvester 304 for charging the battery. In some such embodiments, the power harvester 304 is a panel of one or more photovoltaic cells (i.e., a solar panel). In further embodiments, the power harvester 304 is a wind turbine.

In another example embodiment, the power harvester 304 is water flow-powered harvester (e.g. a generator coupled with a water turbine that is disposed below the surface of the water or a paddle wheel that is partially disposed below the water's surface). The water flow-powered energy harvesters are driven as the castable device 20 moves across the surface of the water or as the castable device is held in place as water flows thereby. Accordingly, the water flow-powered energy harvesters may be particularly desirable for embodiments used when the castable device 20 is deployed and being pulled behind the marine vessel 10 during trolling, when pulling the castable device 20 to or from a fishing location, or when the castable device 20 is held in a fixed location of a moving body of water (e.g., a stream). In embodiments having water flow-powered energy harvesters, the tether attachment 104 is disposed with respect to the body and the energy harvester in order to properly orient the energy harvester with respect to the relative direction of water flow. For example, as shown in FIG. 2B, tether attachment 104 is on the castable device's front end, and the turbine energy harvester is disposed at a rear end so that water travels past the turbine perpendicular to its axis of rotation.

In yet another embodiment, the harvester 304 is a kinetic energy harvester that produces energy as the castable device moves over waves or as it bobs in the water. It is known that such kinetic energy harvesters may employ piezoelectric devices to produce electrical energy. In still yet further embodiments, the castable device 20 includes a plurality of energy harvesters 304. While the energy harvesting device is shown as integral to the castable device's body, in further embodiments, it may be a separate component that couples with the castable device (e.g., through plug receptacle 312). For example, energy harvester may be embodied as a solar panel that is aesthetically designed to resemble a lily pad.

In some embodiments, the castable device 20 may include an indicator 108. The indicator 108 may include, for example, a speaker for providing an audible alarm and/or a light emitting diode (LED) for providing a visual alarm. The castable device 20 includes a processor 121 (FIG. 6) that may detect/determine when the battery 302 has a low amount of stored energy. For example, the processor 121 detects when the voltage across the battery drops below a low battery threshold. When this condition occurs, the processor 121 may cause the indicator 108 to provide an alarm indicating that the battery is low. This may include a distinct alarm sequence that corresponds only to the low battery, such as, for example, a repeated sequence of three short LED flashes followed by a pause. Additionally or alternatively, the processor 121 may perform other alert functionality, such as sending a message to a remote computing device (e.g., the marine electronic device) indicating that there is a low battery. In such an example embodiment, the marine electronic device (or other remote device) may display, or otherwise indicate) an alert to a user.

In some embodiments, the castable device 20 may include a motor for propelling the device and/or generating electricity to power its systems.

Example Sonar Systems

Referring to FIGS. 2A and 2B, sonar (SOund Navigation And Ranging) refers to various techniques for propagating sound underwater to detect objects on or under a surface of a body of water, such as fish, plants, rocks, sea floor, etc. Sonar beams, from a transducer assembly of a sonar system 136, can be transmitted into the underwater environment. The sonar signals reflect off objects in the underwater environment (e.g., fish, structure, sea floor bottom, etc.) and return to the transducer assembly, which converts the sonar returns into sonar data that can be used to produce an image of the underwater environment.

During operation, the sonar system 136 incorporated within the housing 102 may be one or more sonar transducer assemblies 106 that are configured for imaging various environmental features (e.g., fish, plants, rocks, etc.) in the body of water 11. This imaging may include mapping an underwater environment below the surface 104 of the body of water 11 between the surface 12 and a bottom or floor 13 (FIG. 9) of the body of water 11.

Example transducer assemblies may include one or more transducers or transducer elements positioned within the housing. Each transducer may be configured as transmit/receive, transmit-only, or receive-only with respect to transmitting one or more sonar beams and receiving sonar returns. In some embodiments, each of the transducer elements may be positioned within the housing so as to point toward a predetermined area under, to the side, or the front of the castable device.

The shape of a transducer element may largely determine the type of beam that is formed when that transducer element transmits a sonar pulse (e.g., a circular transducer element emits a cone-shaped beam, a linear transducer emits a fan-shaped beam, etc.). Embodiments of the present invention are not limited to any particular shape transducer (or any configuration—as it may include arrays, phased arrays, etc.). Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Further, transducers may be configured to transmit and/or receive at different frequencies. In this regard, embodiments of the present invention are not meant to be limited to certain frequencies.

Additionally, in some embodiments, the transducer assembly (or sonar system 136) may have a sonar signal processor and/or other components positioned within the housing. For example, one or more sonar transceivers (e.g., sonar transmitter/receiver), sonar transmitters, and/or sonar receivers may be positioned within the housing and configured to cause the one or more transducers to transmit sonar beams and/or receive sonar returns from the one or more transducers. In some embodiments, the sonar signal processor, sonar transceiver, sonar transmitter, and/or sonar receiver may be positioned in a separate housing.

FIGS. 2A and 2B illustrate the sonar system 136 embodied as one or more transducer arrays 106. Referring to FIGS. 2A and 2B, one or more sonar beams 110 may be generated by multiple sonar transducer arrays of the transducer assembly that are incorporated within the housing 102 of the castable device 20 when deployed in the body of water 11. Each of the transducer arrays may include one or more transducer elements. One example transducer array may be a forward scanning sonar transducer array 106B that are built-in to the housing 102. In some instances, the transducer assembly may include one or more of a right forward scanning element, a left forward scanning element, a conical sonar element, and/or a bar downscan sonar element 106A, which may be housed inside the housing 102.

In some example embodiments the transducer assembly may include a phased transducer array, e.g. a "phased array," which may be housed inside housing 102. The phased array allows beamforming of the sonar signal such that the sonar beam may be steered in different directions in order to scan the underwater environment. The beamforming may be performed on the transmitted beam or the received beam or both. Adaptive beam-forming may be used to increase the effective resolution of the steered beams and to reduce sidelobes. The beamforming can also be carried out using frequency steered sonar techniques. The phased array may include a plurality of transducer elements arranged on a PCB. The PCB may mechanically support and electrically connect the electronic components, including the transducer elements using conductive tracks (e.g. traces), pads, and other features. In some embodiments, the conductive tracks may comprise traces etched onto the circuit board. The conductive tracks may comprise sets of traces, for example, each transducer element may be mounted to the PCB such that the transducer element is in electrical communication with a set of traces. For example, the terminals of a transducer element may be soldered or otherwise electrically connected and mechanically secured to one or more pads of a PCB wherein each pad is in electrical communication with a trace etched onto the circuit board. For example, each transducer element may comprise one or more silver-plated terminals or other conductive material-plated terminals. Thus, each transducer element may be in electrical communication with a set of traces comprising the PCB (e.g., via the transducer element terminals). Each transducer element, sub-array, and/or the array of transducer elements may be configured to transmit one or more sonar pulses and/or receive one or more sonar returns. Example arrangements of various phased array sonar transducer assemblies are discussed further with reference to FIGS. 2D and 2E.

The transducer arrays or individual transducer elements of the phased array may transmit one or more sonar beams into a body of water with a transmit transducer, a transmit/receive transducer, or similar device. When the sound waves strike anything of differing acoustic impedance (e.g., the sea floor or something suspended in the water above the bottom), the sound waves reflect off that object. These echoes or sonar returns may strike a sonar transducer or a separate sonar receiver element, which converts the echoes back into an electrical signal which is processed by a processor (e.g., sonar signal processor 121 as discussed with reference to FIG. 6) and sent to a display (e.g., an LCD) mounted in the cabin or other convenient location in the boat. This process is often called "sounding." Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment. In some embodiments, a more complex array may be used to generate a picture in a single sounding.

In an example embodiment, the transducer assembly may include multiple transducer arrays and/or transducer elements cooperating to receive sonar returns from the underwater environment. The transducer arrays and or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a three-dimensional position of the sonar returns (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return via a phase difference between the returns received at two or more transducer arrays and/or transducer elements. In some embodiments, the process of beamforming may be used in conjunction with the plurality of transducer arrays and/or transducer elements to generate one or more angle values associated with each sonar return. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging", published as U.S. Publication No. 2016/0341827, and U.S. patent application Ser. No. 14/683,573, entitled "Systems and Associated Methods for Producing a 3D Sonar Image", issued as U.S. Pat. No. 9,739,884, both of which are assigned to the Assignee of the present application and are hereby incorporated by reference herein in their entireties for all purposes.

In some implementations, the transducer arrays and/or transducer elements of the transducer assembly are each capable of generating a separate sonar beam 110. The sonar beams 110 may include, for example, one or more of a conical beam projection or a linear beam projection (though other beam shapes are contemplated). For instance, the sonar beams 110 may include a conical downscan beam projection having a coverage area of a beam produced by a circular downscan transducer. In another instance, the sonar beams 110 may include a linear downscan beam projection having a coverage area of a beam produced by a linear downscan transducer.

FIGS. 2D and 2E illustrate examples of transducer arrays, particularly, phased arrays 310, 310' comprising transducer elements 310A mounted to a PCB 31, 31'. In various embodiments, each of the transducer elements 310A may be substantially rectangular in shape and made from a piezoelectric material such as a piezoelectric ceramic material. While depicted and described embodiments generally detail a substantially rectangular-shaped element that is made of piezoelectric material, other shapes and types of material are equally applicable to example embodiments of the piezoelectric material 310A. In various embodiments, the processor 121 (FIG. 6) may be in communication with the PCB having the transducer elements 310A mounted thereto by means of connectors such as card edge connectors and/or the like.

In some example embodiments, the phased array 310 may include a plurality of sub-arrays. Each sub-array may include a portion of the transducer elements 310A of the phased array. The transducer elements 310A of the sub-array may be configured in a particular pattern, and the transducer element pattern may repeat two or more times across the transducer array 310.

In various embodiments, the PCB 31, 31' may have a fiberglass or other rigid substrate. In other embodiments, the PCB 31, 31' may be a flexible PCB. For example, the PCB substrate may be made of polyester (PET), polyimide (PI), polyethylene napthalate (PEN), Polyetherimide (PEI), or various fluoropolymers (FEP) and copolymers Polyimide films.

Each transducer element 310A, sub-array, and/or the array of transducer elements, e.g. the phased array 310, 310' may be configured to transmit one or more sonar pulses and/or receive one or more sonar returns. Both transmitting a sonar pulse and receiving a sonar return requires the transducer element 310A to be able to vibrate at least enough to convert one or more electrical pulses into a sonar pulse or to convert a sonar return into an electrical signal. In various embodiments, the vibrations of one or more transducer elements 310A may cause the PCB 31 to which the one or more transducer elements 310A are mounted to vibrate. The vibration of the PCB 31, and possible subsequent vibration of other transducer elements 310A mounted to the PCB 31 may need to be taken into account in the determining of a pulse transmitted by the phased array 310, 310' or in the processing of a sonar return received by the phased array 310, 310'. For example, the transducer elements 310A mounted to the PCB 31, 31' may be configured such that a signal may be received from each transducer element 310A or sub-array individually. In addition to differentiating the sonar returns and/or transmission, individual wiring may enable use of processing techniques that are helpful in determining the location (e.g., polar angle coordinate) of an object/surface causing the sonar return, as discussed in U.S. patent application Ser. No. 14/702,121, entitled "Transducer Having Surface Mounted Elements and Associated Methods", published as U.S. Publication No. 2016/0320474, which is assigned to the Assignee of the present invention and hereby incorporated by reference herein in its entirety for all purposes.

In various embodiments, each transducer element 310A may be approximately one mm by one mm. In various embodiments, each transducer element 310A may be approximately 0.4 by 0.2 mm to 100 mm by 150 mm. In some embodiments, each transducer element 310A is approximately 0.5 mm in height. In various embodiments, each transducer element 310A is approximately 0.2 mm to 1 mm. In various embodiments the spacing between transducer elements 310A may be 0.25 mm or less. In other embodiments, the spacing between the transducer elements 310A may be greater than 0.25 mm. In various embodiments, smaller or larger transducer elements 310A may be used, as appropriate for the application. In some embodiments, the width of each transducer element 310A is ¼ the transmitted sonar wave's wavelength.

In various embodiments, the phased array 310, 310' may have any shape. In some embodiments, the phased array 310, 310' may have a shape that would be difficult to fabricate using a single transducer element 310A. For example, the phased array 310, 310' may comprise a diamond-shaped array or two or more diamond-shaped sub-arrays, an oblong array having tapered ends, and/or the like. The phased array 310, 310' may comprise variously shaped arrays and/or sub-arrays of transducer elements 310A, as applicable for the application.

In one embodiment, the phased array 310, 310' may comprise a line of two or more parallel lines of transducer elements 310A. The beam shape and/or beam characteristics of the phased array 310, 310' may be configured to approximate the beam shape and/or beam characteristics of a single ceramic element. For example, the transducer array may be configured to approximate the beam shape and/or characteristics of a single linear downscan transducer element, as described in U.S. patent application Ser. No. 13/370,633, entitled "Sonar System for Reduced Interference", issued as U.S. Pat. No. 9,268,020, which is assigned to the Assignee of the present application and hereby incorporated by reference herein in its entirety for all purposes. Though the above description provides an example of replacing a linear or rectangular transducer elements, other element shapes are contemplated (e.g., a conical transducer element, a square transducer element, etc.). U.S. patent application Ser. No. 15/214,968, entitled "Trolling Motor with a Transducer Array", published as U.S. Publication No. 2016/0325814, which is assigned to the Assignee of the present application and is hereby incorporated by reference in its entirety for all purposes, teaches various embodiments of phased transducer arrays and associated aspects that are applicable to the castable devices as disclosed herein.

In some embodiments, the castable device 20 employs a phased array transducer configured as in FIG. 2D, in which all transducer elements are arranged in a line. Using a single phased array having such a configuration produces a 2-dimensional swath, such as shown in FIG. 2F. That is, the array detects sonar data in a swept area in a plane extending vertically downward from the transducer (if the elements 310A are oriented downwardly) and including the line in which the transducer elements lie. In some embodiments, the swept angle of the sonar data is +/−55° from a vertical axis. Although the array receives sonar data across a small thickness perpendicular to said plane, the array does not receive data that corresponds to where along the thickness objects reflecting sonar signals are located. Accordingly, although the phased array is detecting objects within a volume, its data is said to be 2-dimensional.

In some embodiments, since such configurations collect data in a 2-dimensional swath, in order to capture data for rendering 3-dimensional images, the transducer array may move (e.g., rotate in the water about a vertical axis) to collect a third dimension. By rotating 180 degrees while collecting a plurality of 2-dimensional swaths, the collected 2-dimensional swaths can be stitched together to create a collection of sonar data that corresponds with objects in a conical volume. Accordingly, in some embodiments, the castable device 20 (FIG. 1) may include a motor that rotates the transducer array with respect to the body. Alternatively, the castable device's propulsion system 125 (FIG. 2C) may cause the castable device and, therefore, the transducer array to rotate in the water about a vertical axis. In further embodiments, the castable device 20 may move across the water and collect 2-dimensional swaths that are stitched together to create 3-dimensional sonar data corresponding with a non-conical volume.

In some embodiments, the transducers may form one or more frequency-steered sonar arrays. A frequency steered array generates a beam for which its direction is dependent on the frequency of the beam. One advantage is that, in some embodiments, only one transducer may act as both a transmitter and a receiver in order to generate beams in many different directions. In a conventional phased array, the transducer and receivers must be different elements. The scanned beam swath is proportional to the frequency bandwidth. Accordingly, a relatively large beam swath requires a correspondingly large frequency bandwidth. A plurality (e.g., 2) of arrays may be adjacent and angularly offset to provide a field of view (e.g., swath angle) that is greater than that of a single array. Embodiments of phased array transducers implemented for 2D and 3D imaging are described in U.S. patent application Ser. No. 12/030,043, entitled "Systems and Methods Implementing Frequency-Steered Acoustic Arrays for 2D and 3D Imaging", issued as U.S. Pat. No. 7,606,114, which is hereby incorporated by reference herein in its entirety for all purposes.

Referring also to FIG. 2G, in some embodiments, the castable device 20 may include a first phased array transducer 330 arranged perpendicularly to a second phased array transducer 332. Both first and second transducers 330, 332 may be configured like the phased array transducer 310 of FIG. 2D. The first transducer 330 acts as a transmitter to project sonar signals, and the second transducer acts as a hydrophone to receive sonar signals. Such a configuration is called a "Mills Cross" and can be used to collect small areas 334 of data along an ensonified strip 336. By steering projections from the first transducer array 330, multiple areas along the ensonified strip (e.g., areas 334' and 334") may be scanned.

In some embodiments, the castable device 20 may employ a split beam transducer. Referring to FIGS. 2E and 2H, the split beam transducer may enable the castable to determine a fish's location without moving the transducer array. In the illustrated embodiment, the transducer includes four transducer elements 310Ai-310Aiv arranged in a 2×2 grid. For example, the collected data from the four-element split beam transducer may be used to determine the fish's distance from the transducer (r), azimuth (θ), and angle from vertical axis (φ). Such a four-element split-beam transducer allows the transducers to collect enough data to detect an exact location of a fish F1 with respect to the castable device. A single four-element split-beam transducer having four transducer elements is capable of detecting the location of a single fish. A castable device having a plurality (e.g., 4) of four-element split-beam transducers pointing in various directions may be able to collect data to determine locations of fish in their respective scan areas. Each transducer may further be capable of estimating each fish's size based on the amplitude of the echo returning from the fish.

In some embodiments, all four transducer elements 310Ai-310Aiv transmit signals at the same time to produce a cone of sound. In various other embodiments, only one of the four element transmits, which allows for creating a wider beam than when all four elements transmit. In yet further embodiments, all four elements 310Ai-310Aiv do not transmit; another separate transducer (e.g., a wide beam sonar transmitter) or plurality of transducers on the castable device transmits sonar signals, and all four elements 310Ai-310Aiv are configured only to receive sonar signals. In other embodiments, a split beam transducer comprises only three elements that may be used to triangulate the fish location. In such a regard, various embodiments may utilize any number of elements for the split beam transducer.

In some embodiments, the castable device 20 may be configured to communicate with and/or be controlled/operated by the marine electronic device 40. In such embodiments, the castable device 20 may be configured to operate the sonar system 136 according to instructions provided by the marine electronic device 40 (such as through a control signal). Likewise, in some embodiments, the castable device 20 may be configured to provide the gathered sonar data to the marine electronic device 40. In some embodiments, the gathered sonar data could be provided through a direct transmission to the marine electronic device 40, through an external network, or via upload after return of the castable device 20. In some embodiments, the castable device 20 may be configured to connect to an external network directly. In such embodiments, the sonar data may be sent to an external device or server for storage and/or use (such as in sonar mapping of the body of water). In some embodiments, the sonar data may be stored in a buffer until internet connectivity is reached for transmission (such as to the marine electronic device 40 and/or external network).

Depending on the configuration of the sonar system 136 of the castable device 20 and/or the marine electronic device 40, processing of the sonar returns may occur at either or both of the castable device 20 or the marine electronic device 40. In this regard, in some embodiments, the castable device 20 may be configured to merely collect sonar returns and provide sonar return data to the marine electronic device 40 for processing. Additionally or alternatively, the castable device 20 may be configured to process the sonar return data and generate sonar image data that can be provided to the marine electronic device 40. Along these lines, in some embodiments, the castable device 20 may be configured to detect the presence of a fish or other object from the sonar returns and remotely provide a signal to the marine electronic device 40. Such a signal may indicate that the captured sonar data may include something of interest. In some embodiments, the castable device 20 may also be configured to return to the marine electronic device 40 and/or marine vessel so that the sonar data containing the possible object of interest can be uploaded and/or viewed.

In some embodiments, the marine electronic device 40 may be configured to display the sonar data to a user, such as on a screen. Notably, display on the screen of the marine electronic device 40 may be desirable to provide a large screen and/or convenient viewing area (e.g., the command center of the boat, where the user is fishing, etc.). Further, use of such screens may be desirable as they are often high-bright screens that are designed for easy viewing in sunlight (since the screens are often exposed on the marine vessel).

Additionally, in some embodiments, the castable device 20 may be configured to determine location data associated with the gathered sonar data. Further, in some embodiments, the castable device 20 may be configured to transmit the location data to the marine electronic device 40, such as for determination of the location of the castable device at the time of gathering the sonar data (though the location may also or in the alternative be determined at the marine electronic device).

In some embodiments, the location of the castable device 20 may be associated with the gathered sonar data for correlation and/or storage. Such association may occur at the castable device 20 and/or at the marine electronic device 40. In this regard, in some embodiments, the marine electronic device 40 may cause display of an image of the sonar data in association with the location of the castable device to give context to the sonar data to the user.

FIG. 4A shows an example marine electronic device 40 that depicts a split-screen view 400 of a sonar image 462 on the left portion of the screen and a chart 402 on the right portion of the screen. The sonar image 462 is produced from sonar data from the castable device 20 and shows sonar imagery taken from a transducer assembly with sidescan transducers. In particular, the sidescan sonar image view shows the sonar view from the left and right of the transducer assembly of the sonar system as time passes (building up from top down like a waterfall). The chart 402 shows the location of castable device 420 (indicated as a "C", such as for Castable Device 1) on the body of water 405. The chart 402 also shows the location of the marine vessel 410 associated with the marine electronic device 40, thereby giving the viewer an indication of the relative position of the castable device 20.

Additionally, in some embodiments, such as the depicted embodiment, the marine electronic device 40 may display an indication of the area of coverage 461 of the sonar system (e.g., the extent to which the sonar beams from the sonar system provide coverage of the underwater environment). Such an indication would provide the user with an idea of the orientation and/or coverage area of the sonar system and the captured sonar data. In such embodiments, the castable device 20 may be configured to determine orientation data corresponding to the orientation of the castable device 20 and/or the sonar system 136 (as the sonar system 136 may be configured to be directed with respect to the castable device 20). Such orientation data may be provided to the marine electronic device 40 for use (such as for display, association with the sonar data, etc.). In this regard, a user can easily determine the relative location and orientation of the sonar data with respect to the marine vessel and/or body of water (even in the circumstance when the castable device is otherwise not visible to the user directly).

In some embodiments, the castable device 20 (such as by utilizing the sonar system 136 and displaying the resulting image on the marine electronic device 40) may be used to scout the underwater environment, such as for depth determinations, possible fishing locations, among many other reasons. In some embodiments, the castable device 20 may be instructed to perform search or survey patterns or travel in relation to the marine vessel—such as to aid a fisherman in finding good fishing locations, etc. For example, in some embodiments, the castable device 20 may be configured to scout ahead of the marine vessel to confirm or check terrain (e.g., depth) in front of the marine vessel. In this regard, travel and operation of the sonar system 136 of the castable device 20 may be autonomous, such as through control by the marine electronic device 40 (which can be based on a marine vessel, on shore, at a station, etc.—thereby enabling control of the castable device 20 in the marine environment from anywhere).

In some embodiments, the marine electronic device 40 may be configured to scout or survey an area using multiple castable devices 20. In such an embodiment, the marine electronic device 40 may track each castable device 20 and/or pre-map the survey patterns to control the castable devices 20 for efficient surveying. In this regard, the marine electronic device 40 may act as a "hive mind" to control and/or manage the "swarm" of castable devices 20 to efficiently perform tasks (such as tasks described herein, including capturing sonar data for a body of water, among any other tasks or operations described herein).

In some embodiments, the marine electronic device 40 may be configured to overlay the sonar data on the chart at the corresponding location and in the corresponding orientation as the sonar data was received. For example, the marine electronic device 40 may receive the sonar data, the orientation data of the sonar data, and the location data associated with the sonar data. Based on this information, the marine electronic device 40 may be configured to orient the sonar data and overlay it on a chart at the proper associated location for which it was gathered.

In some embodiments, only a portion of the sonar data may be overlaid on the chart. In this regard, depending on the configuration and/or desires of the user, the marine electronic device 40 may be configured to remove a portion of the sonar data prior to overlaying it on the chart. For example, the marine electronic device 40 may remove the water column of the sonar image data prior to overlaying on the chart such that the overlaid image on the chart includes bottom features (which gives the user an impression of the bottom). Such embodiments that utilize overlaying sonar data on a chart may be useful for surveying a body of water. Even more, multiple castable devices could be used to efficiently survey the body of water, and could be operated in conjunction via the marine electronic device 40.

FIG. 4B shows an example screen 45 of a marine electronic device 40 showing the sonar image 462 on the left portion and a chart 402 on the right portion. Prior sonar data has been overlaid 463 on the chart 402 at the appropriate location and in the appropriate orientation. In the depicted embodiment, the sonar data is overlaid as the castable device 420 travels along the body of water 405.

With reference to FIG. 4B, the sonar image 462 is an image from a transducer assembly with sidescan (left and right) transducers. In this regard, the image includes a centerline 466 that indicates the center of the transducer assembly and image data extending out to the left and right of the centerline 466. The sonar data extending outwardly from the centerline 466 correlates to the distance from which the sonar return is received by the transducer assembly (e.g., the distance from the centerline). As such, there is a water column 469 that includes fish and other objects. Additionally, there is a portion 467 of the screen indicating sonar returns that have returned from the floor of the body of water. Notably, the image 462 shows a possible relatively distinct floor. In some embodiments, the marine electronic device 40 and/or castable device 20 may be configured to remove the water column 469 up to that floor. The resulting image could be used for the overlay image on the chart such that only the topography of the floor is shown overlaid onto the chart.

As noted herein, the castable device 20 may be in many different configurations, such that embodiments of the present invention contemplate many different ways to operate a sonar system 136 of a castable device 20. In some embodiments, the castable device 20 may be configured for surface travel or submersible travel such that the sonar system 136 may be positioned and/or oriented on the castable device 20 in a manner in which it is at least partially submerged for operation.

As noted herein, the castable device 20 may be in many different configurations, such that embodiments of the present invention contemplate many different ways to operate a sonar system 136 of a castable device 20. In some embodiments, the castable device 20 may be configured for surface travel or submersible travel such that the sonar system 136 may be positioned and/or oriented on the castable device 20 in a manner in which it is at least partially submerged for operation.

U.S. patent application Ser. No. 14/718,678, entitled "Wireless Sonar Device", published as U.S. Publication No. 2016/0341828, and U.S. patent application Ser. No. 14/806,635, entitled "Wireless Sonar Device", published as U.S. Publication No. 2017/0023676, which are assigned to the Assignee of the present application and are herein incorporated by reference in its entirety for all purposes, disclose embodiments of castable sonar devices, elements of which may be incorporated into the castable device of the present disclosure.

Example Other Sensor Systems

In various embodiments, the castable device comprises various other sensors/systems 139 (FIG. 6), which may include one or more motion sensors, one or more thermocouples, a laser detector, or various other sensors described herein.

Referring to FIG. 5, the castable device may include one or more motion sensors 224 (e.g., accelerometers) that detect when a fish has been hooked. The motion sensors may, in some embodiments, be accelerometers. In an embodiment, a fishing line attaches to castable device 20 at a first end and attaches at a second end to a hook having bait thereon. Once a fish gets hooked and tries to swim away, the fish pulls on the line, thereby causing the castable device 20 to move in the water (e.g., pivotally, laterally, or vertically). The one or more motion sensor devices detect the motion of the castable device. For example, an accelerometer coupled with processor 121 detects when the acceleration surpasses a threshold. When the acceleration surpasses the threshold, the processor 121 may be configured to activate indicator 108. Indicator 108 may provide a distinct signal to indicate that a fish is hooked. In another embodiment, the castable device transmits a signal indicating that a fish is hooked to the marine electronic device 40 so that the marine electronic device can display the status to a user. The motion sensors may similarly detect when the hook is caught on an undesirable object (e.g., snagged on a piece of wood below the water's surface) by detecting a change in the castable device's movement, such as, for example, a change in periodic bobbing over waves.

In some example embodiments, the castable device computes its distance from the marine vessel in order to determine a length of cast. In some cases, the distance may be determined via dead reckoning. For example, the castable device 20 transmits a signal from its communication interface 123, described below with reference to FIG. 6. The signal's strength decreases at a known rate that is inversely proportional with respect to the distance from the source. Therefore, by determining the signal's strength received at the marine vessel, the castable device's distance from the marine vessel can be determined. That is, processor 121 computes the distance between the respective objects based on the known transmission strength and the received signal strength. In another embodiment, the distance may be determined using a similar technique, wherein the transmitting and receiving components are switched. That is, the marine device transmits the signal, and the castable device receives the signal.

In some embodiments, the signal propagation is non-uniform in all directions. Rather, the signal transmission strength varies based on the castable device's orientation with respect to the receiving device. In some of such embodiments, the system (e.g., system 100 of FIG. 6) takes account of a directional component of the signal's transmission amplitude. For example, the processor 121 uses respective approximate positional data using GPS coordinates of the marine vessel and the castable device, orientation of the castable device from a magnetic compass, accelerometers that detect castable device's orientation with respect to a vertical axis, and a known orientation of the castable device's communication interface on the castable device's body. Relative strength of transmission in various directions from the castable device's antenna may be determined experimentally.

In some embodiments, the motion sensor detects vertical motion in order to perform heave compensation. For example, using accelerometers and a known original vertical position (e.g. using an initial vertical position of the castable device when it is first deployed), the castable device can calculate its change in vertical position as it floats over waves. This allows the castable device to automatically perform heave compensation as waves cause the respective vertical positions of the marine vessel and the castable device to vary. The castable device may, therefore, transmit to the marine electronic device both data from a sonar reading and a relative height change with respect to a baseline. In this way, for example, as multiple sonar scans are performed and transmitted to the marine electronic device 40, the multiple sonar scans may be stitched together to provide accurate topography of the seafloor.

In some embodiments, the castable device 20 may be used to search underwater for lost tackle and lures. The castable device may further mark where the lost tackle and lures are located in order to indicate a likely snag area. For example, the castable device transmits location data corresponding to the likely snag area along with an indication that there is a likely snag area to the marine electronic device. In some embodiments, the marine electronic device can communicate that information to the user, such as displaying the likely snag area on a chart. The castable sonar device may further include means for retrieving the lost tackle and lures, such as, for example, a robotic arm, a scoop, a hook, or claw and may further include a cutting device (e.g., scissors or knife) for cutting through fishing line and debris. In some embodiments, the castable device may be able to inspect a trot line to determine if fish are hooked thereon as well as report the location and depth. The castable device may, for example, have a camera and transmit the camera footage to the marine electronic device 40 so that a user can view the footage and determine if fish are hooked on the trot line.

Referring to FIG. 2C, the castable device 20 may include one or more thermocouples 182 to measure water temperature. In one embodiment, the thermocouple is integral to the body 102 of the castable device. The thermocouple data may be used to generate a temperature map of the water surface as the castable device travels along the surface of the water, either as the marine vessel tows it or as it propels itself around using a propulsion mechanism as further described herein. In another embodiment, the castable device 20 deploys a temperature probe 180 that measures water temperature below the water surface. The deployable temperature probe may be, for example, attached to a cable 184 having a weight 186 at a first end and a second end that attaches to the castable device. In some embodiments, the temperature probe is lowerable via an electronic winch 188. The deployable temperature probe may be lowered to a known depth. In some embodiments, the depth may be determined as the length of the cable when the cable is fully deployed, although said depth determination may be an approximation due to movement (e.g., pitching and rolling) of the castable device causing error in this approximation. In some embodiments, one or more accelerometers may be used to compensate for said movement in order to more accurately determine the depth of the temperature probe. In other embodiments, the cable is lowered from a spool of a known diameter so that each revolution lowers the probe by a known distance. In this way, the temperature probe's thermocouple depth may be determined. The temperature at various depths and in various locations may be used to generate a map of the water temperature. In some embodiments, utilizing depth and position, a 3D temperature map can be formed.

Referring to FIG. 6, in some embodiments, castable device 20 can use a camera or sonar data to determine a type of fish. The castable device may use an algorithm that incorporates camera and/or sonar data, for example, fish size (e.g., as represented by clustered sonar returns), appearance, color, and swimming style/speed to determine the type of fish. The type of fish may then be displayed on the marine electronic device 40 (e.g., as a FISH ID Icon). For example, different types of fish (e.g., bass, trout, baitfish, and catfish) may be represented on the marine electronic device in different colors or with different fish icons. In some embodiments, the castable device 20 may also read an electronic tag attached to a previously caught fish and transmit the tag's information to a marine electronic device. The castable device may further use camera and/or sonar data to identify other species, such as nuisance animals (e.g., snakes, turtles, sharks, alligators, and dangerous fish). Additionally, the castable device may identify other marine features, such as swimming areas, for example by capturing images of signs indicating that swimming is allowed, or by determining an absence of dangerous fish and/or an absence of debris that could injure a swimmer.

U.S. patent application Ser. No. 16/007,058, entitled "Wireless Sensor Device", which are assigned to the Assignee of the present application and is herein incorporated by reference in its entirety for all purposes, discloses embodiments of castable sensor devices, elements of which may be incorporated into the castable device of the present disclosure.

Example Transceiver Operations

In some embodiment, the castable device 20 communicates via a high gain Wi-Fi antenna. For example, in some embodiments, the communication interface 113 (FIG. 6) of the marine electronic device 40 includes the high gain Wi-Fi antenna. By using a high gain Wi-Fi antenna, the marine electronic device may transmit a greater distance than other, lower gain antennas.

As described herein with respect to measuring cast distance, some embodiments of the castable device 20 measure signal strength to determine distance from a transmitting device. For example, the system may be able to determine the distance between the marine vessel 10 and the castable device 20 by using a known signal transmission strength from the marine vessel, a measured signal at the castable device, and a known function of signal strength with respect to distance to calculate the distance from the respective objects. In a further embodiment, a first castable device 20 transmits a signal at a known transmission signal strength, and the marine vessel or a second castable device 20 receiving the signal measures the received signal strength. A computing device (e.g., the multi functioning device 50) uses the known signal strength function and difference between the transmitted signal strength and the received signal strength to calculate the distance between the transmitting castable device and the receiving marine vessel or castable device.

Example Indicator/Light Systems

Referring to FIG. 2A, and as further described herein, in some embodiments, the castable device 20 includes one or more indicators 108, such as, for example, one or more LEDs and a speaker. The speakers and LEDs may communicate various information. For example, the LEDs may be configured to emit a certain color depending on the type of information it is communicating (e.g., shallow water, one or more fish are present, low battery, etc.). Additionally, the LEDs may blink at various frequencies or intermittent spacing (e.g., Morse code) to communicate information to a viewer. Similarly, the speaker may emit various tones, make intermittent tones (i.e. "beep") at certain frequencies, or play sound recordings. In further embodiments, indicator 108 is an LCD screen.

In some embodiments, the castable device 20 uses sonar to detect the presence of one or more fish. The indicator 108 may provide an indication that one or more fish are detected. For example, in some embodiments, indicator 108 is an LED that blinks when a fish is detected. The indicator may employ indicator 108 to communicate various information. For example, in some embodiments, the castable device 20 detects a plurality of fish and provides an indication that more than one fish is present, (e.g., the indicator LED blinks faster when more fish are present). In yet another embodiment, the indicator 108 varies depending on the proximity of the fish. For example, the indicator LED blinks faster when the fish get closer to the castable device.

As disclosed herein, the castable device 20 may employ one or more sensors (e.g., accelerometers) to detect when a fish gets hooked on a fishing line that is attached to the castable device. In some embodiments, the indicator 108 provides a notification that the sensors detect that a fish is on the line.

In some embodiments, the indicators 108 can assist a user in finding the castable device, such as may occur if a user utilizes a castable device in an anchor mode or if a tether breaks. For example, a user on the marine vessel may press a button on the marine electronic device 40 that causes an antenna on the marine vessel 10 to transmit a signal to the castable device 20. Upon receiving said signal, the castable device 20 causes the indicator 108 to emit light and/or make a sound. In another embodiment, the castable device 20 activates indicator 108 if the castable device moves more than a predetermined distance (e.g., 5 feet) from its original location, which may act similarly to a virtual anchoring concept, or from the vessel, for example, if the castable device is being towed.

Example System Architecture

FIG. 6 shows a block diagram of an example system 100 capable for use with several embodiments of the present invention. As shown, the system 100 may include a number of different modules or components, each of which may comprise any device or means embodied in either hardware, software, or a combination of hardware and software configured to perform one or more corresponding functions. For example, the system 100 may include one or more castable devices 20, one or more marine electronic devices 40, an external network 102, and one or more mobile devices 50.

The system 100 may also include one or more communications modules configured to communicate with one another in any of a number of different manners including, for example, via a network. In this regard, the communication interfaces (e.g., 113, 123) may include any of a number of different communication backbones or frameworks including, for example, Ethernet, the NMEA 2000 framework, GPS, cellular, WiFi, or other suitable networks. The network may also support other data sources, including GPS, engine data, compass, radar, etc. Numerous other peripheral devices such as one or more wired or wireless multi-function displays (e.g., a marine electronic device 40 or mobile device 50) may be included in the system 100.

The marine electronic device 40 may include a processor 111, a memory 112, a user interface 116, a display 114, one or more sensors 117 (e.g., a location sensor, position sensor, heading sensor, orientation sensor (not shown), etc.), and a communication interface 113.

The processor 111 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 111 as described herein. In this regard, the processor 111 may be configured to analyze electrical signals communicated thereto to provide processing to utilize any operational and/or location data detected by the system 100 (e.g., operational data and/or location data provided by one or more castable device 20).

In some embodiments, the processor 111 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 112 may be configured to store instructions, computer program code, marine data, such as sonar data, chart data, location/position data, radar data, camera data, and other data associated with the sonar system (e.g., such as from the castable device 20 or a navigation system operated by the marine electronic device) in a non-transitory computer readable medium for use, such as by the processor.

The communication interface 113 may be configured to enable connection to external systems (e.g., an external network 102, one or more marine electronic devices 40, one or more castable devices, and/or one or more mobile devices 50). In this regard, the marine electronic device 40 may include at least one transmitter configured to transmit, for example, one or more signals according to example embodiments described herein. Likewise, the marine electronic device 40 may include at least one receiver configured to, for example, receive data from one or more castable devices according to example embodiments described herein. In some embodiments, the transmitter and receiver may be combined as a transceiver. Though the depicted embodiment shows specific examples of external networks that the marine electronic device is configured to communicate with, there are many other contemplated systems (such as the operation and/or control systems of the watercraft carrying the marine electronic device).

The marine electronic device may also include one or more sensor(s), system(s), or other information/data collecting devices 117 (such as any example sensors or data collecting devices described in any embodiments herein). For example, the marine electronic device 40 may include a location sensor configured to determine the current location of the marine electronic device. Further, the marine electronic device may include speed and/or direction detecting sensors that are configured to determine the speed and/or heading of the marine electronic device (or that of the watercraft/marine vessel associated with the marine electronic device). Even further, the marine electronic device may include a navigation system that is configured to enable navigation capabilities (such as described herein in greater detail with respect to some example embodiments). As will be apparent to one of ordinary skill in the art based on the disclosure herein, there are many different types of sensors or data collection devices that can be utilized and/or integrated within the marine electronic device.

The display 114 may be configured to display images and may include or otherwise be in communication with a user interface 116 configured to receive input from a user. The display 114 may be, for example, a conventional LCD (liquid crystal display), a touch screen display, mobile device, or any other suitable display known in the art upon which images may be displayed.

In any of the embodiments, the display 114 may present one or more sets of marine data, such as operational data and/or location data of the castable device, (or images generated from the one or more sets of data). Such marine data includes chart data, weather data, location data, position data, orientation data, sonar data, or any other type of information relevant to the watercraft and/or castable device 20. In some embodiments, the display may be configured to present such marine data simultaneously as in split-screen mode. In some embodiments, a user may select any of the possible combinations of the marine data for display.

The user interface 116 may include, for example, a keyboard, keypad, function keys, mouse, scrolling device, input/output ports, touch screen, or any other mechanism by which a user may interface with the system.

Although the display 114 of FIG. 6 is shown as being directly connected to the processor 111 and within the marine electronic device 40, the display 114 could alternatively be remote from the processor 111 and/or marine electronic device 40. Likewise, in some embodiments, other components of the marine electronic device 40 could be remotely located.

The castable device 20 may include components (hardware or software) that are configured according to any of the example embodiments detailed herein in the same manner as similar components to those of the marine electronic device 40. For example, the castable device 20 may include a processor 121, a memory 122, and a communication interface 123. However, the corresponding processor 121, memory 122, and communication interface 123 may be configured according to example embodiments described herein with respect to example castable devices and their corresponding tasks.

For example, the communication interface 123 may be configured to enable connection to external systems (e.g., an external network 102, one or more marine electronic devices 40, one or more castable devices 20, and/or one or more mobile devices 50). In this regard, the castable device 20 may include at least one transmitter configured to transmit, for example, location and/or operational data according to example embodiments described herein. Likewise, the castable device 20 may include at least one receiver configured to, for example, receive one or more control signals from one or more marine electronic devices 40 according to example embodiments described herein. In some embodiments, the transmitter and receiver may be combined as a transceiver.

In addition to similar components described above with respect to a marine electronic device, the castable device 20 may include one or more additional components. For example, FIG. 6 depicts the additional components of a location sensor 128, a propulsion system 125, one or more indicators 108), deployable equipment 190, and other operational components 130 (including, for example, a sonar system 136, a radar system 137, a camera 133, and other sensor(s) 139).

The location sensor 128 may be configured to retrieve and/or detect location/position data corresponding to the current location of the castable device. For example, the location sensor 128 may be a GPS enabled device.

The propulsion system 125 may include one or more motors configured to propel the castable device 20 along the surface of the body of water.

The one or more indicators 108 may include, for example, any type of light. The one or more indicators 108 may be alert lights and/or indicators, such as for indicating information (e.g., a location, a desired direction for the watercraft to travel (e.g., red/green buoy indicators), a message, etc.). In this regard, different color lights and/or different frequency of operation of the lights can be used (e.g., Morse code, etc.).

The deployable equipment 190 may include any equipment that can be held and deployed by the castable device. Such equipment can be deployed and released (e.g., fish attractant, or a buoy). In some embodiments, the deployable equipment may be placed into a housing or attached to the castable device 20.

The castable device 20 may include one or more other operational components 130 (e.g., components that gather operational data). For example, the castable device 20 may include a sonar system 136, a radar system 137, a camera 133, or other sensor(s)/system(s) 139.

The sonar system 136 may include a transducer assembly that is provided in one or more housings that provide for flexible mounting options with respect to the castable device. In this regard, for example, the housing may be mounted onto a portion of the castable device 20 or onto a device or component that may be attached to the castable device 20 (e.g., a rope, a cable, a shaft, or other component that is mountable relative to the castable device), including a bracket that is adjustable on multiple axes, permitting omnidirectional movement of the housing.

The castable device 20 may also include one or more sensor(s) or other information/data collecting devices 139 (such as any example sensors or data collecting devices described in any embodiments herein). For example, the castable device 20 may include speed and/or direction detecting sensors that are configured to determine the speed and/or heading of the castable device. Additionally or alternatively, other sensors or data collection devices may be used (e.g., a position sensor, a heading sensor, an orientation sensor, an IR camera, a microphone, a temperature sensor, a wind sensor, a heave/roll sensor, an automatic identification system (AIS), navigation system, among others). As will be apparent to one of ordinary skill in the art based on the disclosure herein, there are many different types of sensors or data collection devices that can be utilized and/or integrated within the castable device.

The system 100 may also include one or more mobile devices 50. The mobile devices 50 may include components known in the art for mobile phone or smartphones. In this regard, in some embodiments, the one or more mobile devices 50 can be linked to and/or wirelessly control operation of (or receive information from) one or more of the marine electronic device 40 or the castable device 20 according to any embodiments described herein. For example, the mobile device 50 can display what is being displayed on the display 114 of the marine electronic device 40—thereby enabling that information to be provided to the user no matter their location with respect to the marine electronic device.

In some embodiments, the marine electronic device 40 may be in the form of a mobile device (e.g., a user's phone).

As such, various embodiments of the present invention are contemplated to use the functionality described with respect to a marine electronic device using a mobile device. Indeed, Applicant has written the disclosure herein and claims (unless otherwise specifically stated) to include a mobile device when referring a "marine electronic device".

FIG. 7 shows a block diagram of an example environment 101 where system 100 (or a similar system in accordance with embodiments described herein) is capable for use. As shown, the environment 101 includes a marine electronic device 40 for a watercraft 103 (e.g., marine vessel). The marine electronic device 40 can be configured, such as according to embodiments described herein, to control operation of multiple castable devices (e.g., device 1 (20) and device 2 (20')). Such control can occur directly to the castable devices (e.g., through Bluetooth or other wireless control) or through the external network 102.

In some embodiments, castable device 20 has memory 122 for storing various collected data (e.g., sonar data). Castable device 20 may buffer sonar data so that if the castable device moves out of wireless transmission range of its receiver (e.g. communication interface 113 of marine electronic device 40), the castable device can store collected sonar data. The castable device may detect when it is in and out of transmission range. For example, the castable device may periodically ping the receiver and wait for a response. When it pings the receiver and does not get a response, the castable device may begin storing collected data beginning with that which has been stored in the buffer. When the castable device 20 moves back within transmission range and detect that it is within transmission range by pinging the receiver and getting a response. Upon detecting that it has returned to transmission range, the automatically transmit the accumulated sonar data to the marine vessel 10. In another embodiment, the castable device determines a signal strength between the castable device and the marine electronic device. When the signal strength drops below a minimum threshold, the castable device begins storing sonar data in memory. When the signal strength rises above the threshold, the castable sonar device transmits the stored sonar data to the marine electronic device.

In some embodiments, the castable device may determine whether memory is full before storing additional accumulated data. For example, the castable device may make a determination as to whether sufficient memory is available to store an amount of sonar data. If sufficient memory is available, the castable device may store the data in the available memory. If insufficient memory is available, the castable device may make a determination to delete some of the accumulated data. The castable device may determine what data to delete based on what is the most relevant data. For example, if the castable device is collecting fish data, the most recent fish data may be the most relevant for the user. Accordingly, the castable device may delete the oldest fish location data in order to free up memory for the most recent collected data. If, on the other hand, the castable device is collecting mapping data, the most important data may be the oldest data. Accordingly, the castable device may delete the newest collected data in order to free up memory for the most recent collected data.

The storing of sonar data may be described in further detail with reference to method 1000 of FIG. 8. In method 1000, castable device begins at step 1010, where the castable sonar device collects an amount of sonar data. Method 1000 then proceeds to step 1020, where the castable sonar device measures the signal strength between the castable sonar device and the marine electronic device. Method 1000 then proceeds to step 1030, where the castable sonar device compares the signal strength to the threshold. If the signal strength is above a minimum threshold, the marine electronic device sends the sonar data to the castable device. The castable device then deletes the stored data at step 1040 and returns to step 1010, where it continues to collect data. If the signal strength is below the minimum threshold, method 1000 proceeds step 1050, where the castable device determines if sufficient memory is available to store the collected data. If sufficient memory is available, method 1000 may proceed to step 1060, where castable device accumulates the sonar data in memory. That is, castable device will continue to store sonar data in its memory for transmission at a later time. If insufficient memory is available to store the collected data, method 1000 may proceed to step 1070, where the castable device determines what type of data is being collected in order to determine what data to erase in order to store the most recent collected data. If the castable device is detecting mapping data, method 1000 may proceed to step 1080, where the most recent stored data is deleted in memory. If, on the other hand, the castable device determines, at step 1070, that the castable device is collecting fish location data, method 1000 may proceed to step 1090, where the castable device may delete the oldest data in memory. From both steps 1080 and 1090, once the data has been deleted, method 1000 may proceed to step 1060, where the castable sonar device stores the most recent collected data. From step 1060, the castable device may then return to step 1010, where it continues to collect sonar data until the signal strength increases above the threshold.

Example Propulsion System

Referring to FIG. 2C, in various embodiments, the castable device 20 may include a propulsion system 125. The propulsion system 125 may include an air or a water propeller 306 coupled with a motor 308. The propulsion system 20 may include one or more fins 124 that articulate with respect to the body to deflect water flow passing thereacross in order to control the direction of the castable device's movement. In other embodiments, the propeller articulates with respect to the castable device in order to control the castable device's movement direction. In some embodiments, the castable device is a self-propelled bobber that uses an air or a water propeller to move the bobber through the water.

Referring to FIG. 6, the propulsion system may enable the castable device 20 to patrol the water, particularly in a mode with no tether present. For example, the castable device may float downstream to collect data and then propel itself back upstream after traveling a certain distance or after a certain amount of time has passed. In another application, the castable device 20 scans an area. The castable device may use logic and location information to patrol a designated area. For example, a user may designate a location in a lake and a radius. The castable device may propel itself throughout the area within the radius of the designated location while gathering data (e.g., scanning with sonar) and return the data to the marine electronic device. The propulsion system may return the castable device 20 to the marine vessel upon a condition, such as, for example, the castable device completing a task or upon receiving a request to return from the user (e.g., a user selects a "Return Home" button on the marine electric device). Also, the castable device may return automatically to the vessel when the battery voltage is low. In an embodiment, the castable may automatically engage a receptacle near the vessel that allows the battery to recharge. A group of two or more castable devices may alternate between patrolling or monitoring an area away from the vessel, and docking at the receptacle to recharge their batteries. Additional tasks, such as data transfer, may take place during the docking process.

In an embodiment, the castable device 20 may, via sonar system 136, as described further herein, detect a fish, or a desired type/size fish and use the propulsion system 125 to follow the fish. The castable device may have a light on it (e.g., indicator 108) so that the user can follow the castable device, and, therefore, the fish's present location.

The propulsion system 125 may be used to lure fish to a specific location (e.g., near the marine vessel). In an embodiment, the castable device 20 has a lure or bait attached to a fishing line suspended therebelow. The castable device may propel itself to a first location. The castable device may then return to the marine vessel in order to draw fish that are attracted to its bait/lure toward the marine vessel. In some embodiments, the castable device uses camera 133 to determine when fish have become attracted to its bait/lure. A user may use the camera to determine when a fish (or a desired fish) is attracted to the bait/lure attached to the castable device. The user on the marine vessel may cast the castable device in a first location, wait for a fish to be attracted to the bait/lure, and then, when the user sees a desirable fish near the bait/lure, cause the castable device to return to the fishing vessel in order to draw the fish toward the marine vessel.

FIG. 9 illustrates an example marine environment with an example castable device 20' acting as a "buoy". In the depicted embodiment, the castable device 20' is floating on the surface 12 of the body of water 11 near a marine vessel 10. In particular, the castable device 20' has been positioned so that it marks the location of a rock 14 on the floor 13 of the body of water 11. As shown, the castable device 20' includes a housing 22' that enables it to float on the water surface 12. A propulsion system 25' enables the castable device 20' to correct its position so that it is virtually anchored (as described above). The castable device 20' also includes a light beacon 28' for additional visual distinction to a user. Further, the castable device 20' includes a sonar system 30' that can be used to gather sonar data from the underwater environment, such as to determine if fish are present around the rock 14.

The above example embodiments of using a castable device 20 as a "buoy" provide many different advantages over regular buoys. For example, a regular buoy is unable to correct its location to account for drift due to waves or wind. Often, such fishing buoys are anchored to the bottom to avoid draft. However, in order to ensure the buoy still remains near the location, the correct length of rope for the anchor must be determined. The present invention avoids the need to make that determination. Further, there is no disturbing of fish by dropping an anchor into the water—as the present invention does not require an anchor to be dropped.

Example Systems of Networked/Arrayed Castable Devices

Referring to FIGS. 6, 7, and 10A-E, in some embodiments, many castable devices 20 can be connected to a single network and/or operate in an array.

The plurality of networked castable devices 20 provides the user with data from a plurality of locations. In one embodiment, the user may select, on the marine electronic device, between multiple screens in order to see the sonar information from each of the castable devices 20. In a further embodiment, a processor, described further herein, can stitch together data of overlapping sonar scans from each of the castable devices to form a single image. In this way, a plurality of castable sonar devices can create a map of sonar data that has greater coverage than a single castable sonar device. U.S. patent application Ser. No. 14/718,678, entitled "Wireless Sonar Device", published as U.S. Publication No. 2016/0341828, which is assigned to the Assignee of the present application and is herein incorporated by reference in its entirety for all purposes, discloses embodiments for networking a plurality of castable sonar devices.

FIG. 10A illustrates a plurality of networked castable sonar devices 20, 20', and 20" that are deployed at various ice fishing holes. Sonar images 462, 462', and 462" illustrate the respective sonar data collected at each fishing hole from each castable device. FIG. 10B illustrates a plurality of networked castable sonar devices 20, 20', and 20" that are deployed at various locations around the marine vessel 10. FIG. 10C shows a representation of sonar data 480 displayed on a marine electric device that illustrates collected sonar data including data collected 482 from each sonar transducer assembly. In the depicted embodiment, the marine electronic device displays a bird's eye view representation of data collected at each castable device, showing the number of fish detected at each castable device. In this way, the environment 101 provides a user with real time data at various locations around the marine vessel. FIG. 10D illustrates a plurality of networked castable sonar devices 20, 20', and 20" that are deployed at various locations along a body of water. FIG. 10E illustrates a representation of sonar data 462 from each of the plurality of sonar devices of FIG. 10D, where each image 490, 490', and 490" corresponds to a respective sonar device.

Castable sonar devices may be added to the network sequentially. The castable sonar devices may be added to the network until an area has sufficient coverage. For example, a user may determine based on what sonar data is displayed on the marine electronic device if a sufficient area is covered. In some embodiments, the marine electronic device highlights areas on the displayed map between sonar scan areas in a particular color to inform the user of the gap in the network. The marine electronic device may provide an on-screen button that allows a user to add one or more castable sonar device to the network. When a user presses the button, the marine electronic device scans, via Bluetooth, Wi-Fi, or a similar wireless protocol, for available castable devices. When an available device is found, it prompts the user to connect to the castable device. It may identify the castable device to the user via a serial number or other unique identifier. If the user chooses to connect to the device, the castable device indicates to the user that it is connected and opens a channel to transmit data (e.g., sonar data) to the marine electronic device via the wireless network.

The castable sonar devices may further use respective geolocation sensing devices such as those described herein (e.g., GPS, dead reckoning, etc.) to automatically maintain spacing with respect to each other. If the spacing is too large, sonar data has gaps for which no sonar data is available. If spacing is too small, the overlapping sonar data has an unnecessarily small scan area that may provide insufficient (or confusing) coverage. Accordingly, a threshold may be predetermined, received from a user via a user interface (e.g., from the marine electronic device), or calculated based on known sonar system parameters (e.g., maximum scan angle) and water depth. In some embodiments, a plurality of castable devices provide position data to the marine electronic device. The marine electronic device calculates the spacing between each castable device and each of the other castable devices. If the spacing is outside of a threshold, such as, for example, if two devices are too close to each other, the marine electronic device determines a location for one of the castable devices that is within the spacing threshold. The marine electronic device then sends the determined location as a waypoint to one of the castable devices so that said castable device will engage its propulsion system to move to the waypoint.

In some embodiments, the network of castable sonar devices may be arranged in a desired shape, such as a square grid or in a polar array (e.g., extending in lines radially outward from a central point, such as, for example, the marine vessel or a central castable sonar device). The castable sonar devices may use a virtual anchor, wherein the castable sonar device uses its collected position information and its propulsion system in order to maintain its position on the water's surface. For example, the castable device 20 may include a location sensor (e.g., GPS system) that can determine the location of the castable device 20. Additionally, the castable device 20 may include a propulsion system that can be used to keep the castable device 20 "anchored" at the desired location. In this regard, as the castable device 20 drifts (e.g., by wind or waves), the location sensor may determine that the castable device 20 is no longer at the desired location and, in response, the propulsion system can be engaged to return the castable device 20 to the desired location.

In some embodiments, the array of castable sonar devices may move in formation, while maintaining proper spacing, to patrol an area. In some embodiments, this may be accomplished by the castable sonar devices communicating directly with each other and/or with a master device (such as a marine electronic device).

In some embodiments, the castable devices 20 are configured to act as repeaters. That is, one castable device receives a transmission from a source (e.g., another castable device or a marine electronic device 40 on the marine vessel) and repeats the signal to thereby extend the range of the original transmission. In this way, devices that are not directly in communication with each other may communicate to the network via an intermediate castable device. The castable devices 20 may be networked in a master-slave configuration. In some embodiments, the castable devices 20 may act as a repeater between multiple marine vessels so that marine vessels may communicate with each other even when they are out of direct communication range. In some embodiments, a drone may be used to repeat a signal between a castable device and the marine vessel. In further embodiments, the castable devices and/or marine vessels may be arranged in a mesh network.

In some embodiments, data captured from the castable device 20 may be uploaded to a social network. For example, data may be uploaded to a server for sharing. In some embodiments, raw data may be shared. In further embodiments, screenshots may be shared. For example, the sonar data may be shared for other users to live stream.

Example Other Features

In some embodiments, the data from the castable device may be used in conjunction with a remote computing device to create a virtual or augmented reality. For example, the data from the castable device may be used to create a 3D depiction on a virtual reality (VR) headset (e.g., which may be attached to a mobile computing device/phone). For example, various information/data, such as the position data of the castable device, a user's fishing lure, the fish, the sea floor, fish type, etc., may be provided to a computing device and rendered and displayed as simulated reality to the user wearing the VR headset. In some embodiments, the simulated reality display may exclude the marine vessel from view so that the user sees below (and, therefore, effectively through) the vessel.

Referring to FIG. 11, in some embodiments, a projector 702 may be utilized by various example systems, such as in conjunction with various data (e.g., sonar data) from the castable device 20. The data from the castable device may include, for example, fish locations and a direction in which each fish is swimming. In some such embodiments, the projector 702 may receive spatial information including its position and angle with respect to the castable device and/or the marine vessel, and the projector's angle with respect to the water. The projector 702 may be configured to process the sonar data to determine where the fish are with respect to the projector's projection area 706. The projector 702 may then project onto the water's surface locations of the fish 704A, 704B so that a viewer can "see" where the fish are. The projector 702 may, in processing the image for display, further take into account the location of the marine vessel. For example, the projector 702 may further project fish that are swimming toward the marine vessel (e.g., projection 704A) in red and fish that are swimming away from the marine vessel (e.g., projection 704B) in green. In this regard, the projected image of a first fish 704A may correspond to an actual detected fish $F_1$, such as form the sonar data. Likewise, the projected image of a second fish 704B may correspond to an actual detected fish $F_2$, such as form the sonar data. Although the depicted projector 702 is shown attached to the marine vessel, the projector may be positioned anywhere with respect to the castable device 20. Further, in some embodiments, the projector 702 may be a part of or attached to the castable device 20 (e.g., the projector 702 may extend vertically upward from the castable device 20). The collection and projection of sonar data onto the surface of the water may also include traditional, non-castable sonar devices, such as hull and transom-mounted sonar transducers. Projected images may include holograms or other technologies that are more suitable for viewing in direct sunlight.

Referring to FIG. 12, in some embodiments, example systems may include a laser 1302 that is attached either the marine vessel or the shore. The laser may be configured to track or "spot" the castable device 20. In some embodiments, the laser 1302 may transmit a beam 1304 and receive a reflection from a reflector 1306 attached to the castable sonar device, which reflects the light back into a detector 1308. In some such embodiments, as the castable device 20 moves, the angle at which the light returns to the detector 1308 moves, and the laser adjusts its direction of propagation to track the castable device. Alternatively, the laser 1302 may utilize a known position of the castable device 20 to then "spot" (e.g., transmit the laser beam toward) the castable device. Such an example embodiment may help in "finding" a lost castable device. Alternatively, in some embodiments, the laser may scan the surface of the water to find a lost castable device 20. When a laser detector on the castable sonar device detects the beam 1304, the castable device transmits a signal to the marine electronic device indicating that the laser detected it. The marine electronic device then uses the laser's beam path to determine where the castable sonar device is located.

In some embodiments, the castable device 20 may take the form of various natural objects to camouflage it from fish and other wildlife and/or to make the castable device aesthetically pleasing to a user. For example, the castable device 20 may be formed to resemble, for example, a bird, a turtle, a snake, foam, a rock, driftwood, a buoy, a lily pad, a float, a tree branch, a submerged tree, a tire, seaweed, algae, or a piece of metal.

Referring to FIG. 6, in some embodiments, the castable device 20 may include a compartment 192 that may receive an attractant such as, for example, an aromatherapy compound, chum, or chemical attractant. The compartment 192 has a door that is disposed with respect to the water so that when the door opens, the attractant releases into the water. In some embodiments, the door may be configured to open with spring assistance or other mechanical opening mechanism. In some embodiments, the compartment 192 may be configured to open in response to satisfaction of a condition. For example, the compartment 192 may open when a user presses a dispense button on the marine electronic device/mobile device. Upon receiving a signal from the marine electronic device/mobile device that the dispense button has been pressed, the door opens to release the attractant. For example, a latch could be released to allow the door to pivot, and the spring assist could force the door into an open position. In some embodiments, certain events could trigger dispensing from the compartment 192, such as detection of a fish, a certain type of fish, structure, a time of day, etc.

In some embodiments, the tether 60 may include various features/functionality. For example, referring to FIG. 13, the tether 60 may comprise wires and a plug that is receivable into plug receptacle 312 (FIG. 3) that provide electrical power to the castable device 20 to directly power the castable device, charge the battery, or both. In some embodiments, the tether 60 may include its own battery for providing power to certain features. In some embodiments, the tether may have a user interface, such as a plurality of lights 1202 (e.g., LEDs) that light up under various circumstances. For example, the lights may change color based on what direction the castable device 20 is moving or what direction fish detected by the castable device 20 are moving. In some embodiments, the lights 1204 may move with respect to the tether (e.g., vibrate or spin about the tether perpendicular to its direction of extension) in order to display information. For example, the lights spin at a known periodic rate and light up at certain positions along the light's path (e.g., in order to spell out a message 1204 when perceived by the human eye. The tether may display messages to a user, such as, for example, if a fish is detected. In similar fashion, the lights 1204 may light up in certain patterns to provide a pre-determined message to a user (e.g., the battery is low, a fish is detected, etc.). Additionally or alternatively, the tether 60 may include other types of user interfaces, such as a screen or speaker, to enable providing information to a user.

Example Integration with Marine Electronic Device/Remote Device

In some embodiments, the castable device 20 (described further with respect to FIG. 6) may be integrated with (e.g., controlled wirelessly by) a marine electronic device 40 (described further with respect to FIG. 6) that may, for example, be dedicated to a marine vessel. Such control can be accomplished by a user by operating the marine electronic device 40 and/or autonomously by the marine electronic device 40 such as in accordance with the functionality of the marine electronic device 40. By integrating the castable device 20 with the marine electronic device 40, many advantages can be realized. The functionally of the marine electronic device 40, such as the navigation system (stored waypoints, routes, etc.), alert systems, control systems, processing, etc., can be utilized with or by the castable device (and components thereof). Additionally, operations can be performed automatically by the castable device (i.e., without a user having to manually remote operate the castable device). This can be useful to extend the range of the castable device (which normally would be limited based on the user's sight), thereby saving time and travel by the marine vessel. Automation also allows the user to perform other tasks.

Further, integration with the marine electronic device 40 allows for display of information regarding the castable device on one or more displays controlled by the marine electronic device. Thus, information can be displayed where most useful for a user, such as on a display that also offers other pertinent information about operating the marine vessel or using various features thereof. For example, as will be described in greater detail herein, the position of the castable device may be displayed with respect to the marine vessel on a chart on the screen of the marine electronic device 40. In another example, sonar data from the castable device may be displayed on the same screen as a chart showing the position of the castable device relative to the marine vessel. In a further example, the user is able to toggle between a video streaming in from the castable device and motor/operation details for the marine vessel itself (such as may be used for driving the marine vessel safely).

In some embodiments, such operation (e.g., manual remote control or setting up future autonomous control) of the castable device 20 can take place by the user directly interacting with the marine electronic device 40 or indirectly interacting with the marine electronic device 40 through a remote device (such as a mobile device/smartphone 50) or directly through a remote device (such as indicated herein).

Example Navigation Systems

In some embodiments, the castable device 20 may include a location sensor 128 and/or navigation system. For example, the castable device may be configured to utilize the location sensor 128 to determine location data indicative of a current location of the castable device 20. Additionally, in some embodiments, the castable device may be configured to determine a location corresponding to a desired location such that it knows how to travel to the desired location (e.g., the castable device may determine a relative position of a desired location versus its current location to determine the direction (including height, depth, etc.) to travel to reach the desired location).

In some embodiments, the castable device 20 may be configured to communicate with and/or be controlled/operated by a marine electronic device 40. In such a configuration, the marine electronic device 40 may be configured to utilize one or more features (such as its navigation system and stored data therein) to control and/or operate the castable device.

In some embodiments, the castable device 20 may be configured to transmit the location data indicative of its current location to a marine electronic device 40. With the location data, the marine electronic device 40 may be configured to determine the current location of objects in the environment (e.g., objects detected by the castable device, the relative position of the castable device, etc.). Further, the marine electronic device 40 may be able to determine the castable device's position with respect to various other elements, such as, for example, other castable devices, detected fish, prior-collected sonar data, etc. In this way, the marine electronic device may be able to display the information comprising the castable device's (or other objects) position on a map.

Additionally, in some embodiments, the marine electronic device 40 may be configured to determine other information regarding the location data provided by the castable device, such as the distance to the location data, direction to the location data, weather or other information regarding the current location of the castable device, etc. Notably, depending on the desired information/data, constant updating may need to occur as the marine vessel travels (since the base of operation of the castable device moves on the body of water). Further, in some embodiments, marine environment information may be taken into account. For example, when measuring a distance to the castable device, the distance may be measured according to travel time of the marine vessel to that location (which may include traveling around rocks or other hazards).

Further, along these lines, and in conjunction with additional functionality of the marine electronic device 40 (such as described in greater detail herein), some embodiments contemplate providing additional information to the user. For example, the marine electronic device 40 may interact with components of the marine vessel to determine data pertinent for a user to decide whether to travel to the location of the castable device 20 and/or how to operate/control the castable device. Such pertinent data may include, for example, fuel level, expected fuel used to travel to the location, battery life and/or fuel of the castable device (which may indicate the need to travel to the castable device to pick it up), time associated with traveling to the location of the castable device, time associated with the castable device returning to the marine vessel, intercept time with both the marine vessel and the castable device traveling, among others. Such pertinent data may be displayed to the user to enable the user to decide how to operate the marine vessel and/or the castable device.

For example, in some embodiments, the marine electronic device 40 may track the castable device in relation to the marine vessel (e.g., its base) and provide an indication to a user if the castable device has (or will soon) exceed its range of operation (which can be determined based on communication range, fuel gauge, battery life, wind conditions, etc.). Further, information regarding corrective measures (e.g., where to send the castable device and/or marine vessel) may be provided to the user and/or propulsion systems of the marine vessel and/or castable device. Such corrective measures may include sending the castable device to another location such as for a safe landing (e.g., on a dock, in shallow water, near another marine vessel, etc.).

In some embodiments, the marine electronic device 40 may be configured to cause display of navigation or other related data on a screen (e.g., display 114). In this regard, in some embodiments, the marine electronic device 40 may be configured to display the current location of the marine vessel with respect to one or more castable devices (e.g., from location data gathered from the castable device(s)).

For example, FIG. 14A shows an example marine electronic device 40 that includes a user interface 42 with a screen 45 and one or more buttons/knobs (e.g., knob 44, buttons 46*a*, 46*b*, and 46*c*). The buttons/knobs may, in some configurations, be utilized by a user to control operation of the marine electronic device 40 (and/or castable device(s) by extension including direct control of the propulsion system of the castable device). Additionally or alternatively, the user interface 42 may be configured to receive user input directly to the screen 45 such that it is touch screen.

FIG. 14A depicts a chart 200 that shows a body of water 205 and relative land 202 around the body of water (including the island in the middle of the body of water). The chart 200 also shows a representation of the marine vessel 210 at a current location on the body of water 205. Additionally, such as based on received location data, the chart 200 shows representations of one or more castable devices 220. In some embodiments, such as in the situation where there are more than one castable device, the chart 200 may be configured to provide a distinction between the castable devices such as with numbers 1, 2, etc. (though other distinguishing display characteristics are contemplated—including, for example, colors, patterns, symbols, names, etc.). In this regard, a user can easily determine the relative location of the castable device with respect to the marine vessel and/or body of water (even in the circumstance when the castable device is otherwise not visible to the user directly).

In some embodiments, the marine electronic device 40 may be configured to include or act as a navigation system. In this regard, the marine electronic device 40 may utilize different components (e.g., one or more processors, one or more various sensors, memory, user interface, etc.) to store, create, and/or determine various navigation related features, such as routes, waypoints, survey/scan areas, among others. In some embodiments, navigation data that is stored and/or utilized by the marine electronic device 40 for use by the marine vessel may also be utilized for operation and control of the castable device. In this regard, the castable device 20 can be controlled autonomously and/or remotely operated using the pre-stored navigation data—increasing functionality and ease of use by a user.

In such a regard, in some embodiments, the marine electronic device 40 may be configured to determine one or more desired location(s) for the castable device 20 based on a planned route or waypoint stored in the memory of the marine electronic device 40. In some embodiments, the marine electronic device 40 may be configured to use the determined current location of the castable device 20 in that determination of the desired location(s)—such as to check the current location of the castable device 20 along a planned route and/or track the castable device 20 with respect to the navigation related data.

In some embodiments, the marine electronic device 40 may be configured to determine one or more routes for travel by the castable device. Such routes (and/or a single desired location) may be determined based on pre-stored routes or waypoints, current gathered information (e.g., weather data, sonar data, current operations of the castable device (e.g., tracking an object, returning to the marine vessel, intercepting another marine vessel or castable device), among others). For example, the marine electronic device 40 may utilize information gathered from an automatic identification system (AIS) to form a route for the castable device such as to intercept another marine vessel and/or castable device whose location was determined from the AIS data. In another example, the marine electronic device 40 may utilize the current location (and/or speed, heading, etc.) of the marine vessel (which has the marine electronic device 40 attached) to form a route for the castable device 20 such that it may return to the marine vessel. In some embodiments, such as when the marine vessel is stationary, the marine electronic device 40 may simply provide the current location of the marine vessel to the castable device to cause it to return to the marine vessel. In some embodiments, the marine electronic device 40 may be configured to cause the castable device 40 to return to the marine vessel based on user input indicating such a desire—such as by a user selecting a "Get Castable Device Back" option (or the like).

In some embodiments, the marine electronic device 40 may be configured to determine one or more routes for the castable device 20 based on user input provided to the marine electronic device 40 defining the one or more routes. In this regard, a user can interact with the marine electronic device 40 to create a route for the castable device 20.

In some embodiments, the marine electronic device 40 may be configured to generate one or more waypoints based on location data and/or other data provided by the castable device 20. In some embodiments, the waypoint may be inputted or caused to be generated through user input to the marine electronic device 40.

In some embodiments, the marine electronic device 40 may be configured to form and/or transmit one or more control signals with instructions for the castable device. In some embodiments, the control signal may include navigation related instructions such as providing instructions to the castable device 20 to travel to a determined desired location. Depending on the configuration and/or the desired outcome, the control signal may include any type of instructions for traveling to a desired location, such as any type of desired location data (e.g., coordinates, latitude and longitude, direction and speed data for the castable device, etc.). Further, in some embodiments, multiple locations may be sent as a single set of instructions to the castable device 20 to cause the castable device 20 to travel along a route or as part of a survey/scan (described in greater detail below). In such an embodiment, the castable device 20 may include a navigation system onboard such that it can travel without further instruction from the marine electronic device 40. In some embodiments, the castable device 20 may use sonar data to avoid shallow water, vegetation, debris, etc. that may obstruct its path. Alternatively, in some embodiments, a series of control signals may be transmitted to the castable device 20 to cause the castable device 20 to travel along a route. In some such cases, each consecutive control signal may be sent as the marine electronic device 40 determines that the castable device 20 has reached a certain point (e.g., a waypoint) along the route.

In some embodiments, the marine electronic device 40 may be configured to transmit the one or more control signals to the one or more castable device 20. Such control signal(s) may be transmitted automatically or in response to user input. For example, a user may interact with a waypoint of a chart. A drop down menu could display that includes a selection for sending a castable device to the waypoint. Upon selection by the user, the castable device 20 may travel to the location of the waypoint based on instructions sent by the marine electronic device 40. Similar methodology could be applied for any type of navigation related instruction (e.g., routes, survey patterns, etc.).

In some embodiments, the marine electronic device 40 may provide navigation instructions to the user for remote control of the castable device 20. Such instructions may be displayed on the display of the marine electronic device 40 and/or on any other display (such as the display of a mobile device) for use by the operator of the castable device 20 to travel according to the instructions.

In some embodiments, the castable device 20 may be configured to receive the one or more control signals with instructions for travelling to one or more desired locations. In response, the castable device 20 may cause the propulsion system to propel the castable device according to the instructions, such as toward the desired location.

In some embodiments, the control signal may include additional navigation-related instructions regarding how to travel to the desired location (e.g., speed, operate component(s) while traveling, operate component(s) upon arrival, etc.). In response to receiving the control signal with the additional instructions, the castable device 20 may cause it(s) various systems (e.g., the propulsion system, operational components, etc.) to operate accordingly to cause the castable device 20 to travel to the desired location (and/or operate) according to those instructions. In some embodiments, the marine electronic device 40 may be configured to track the castable device 20 such as it travels according to the instructions from the one or more control signals.

In some embodiments, the marine electronic device 40 may be configured to display the route and/or waypoints with respect to the castable device 20 (and/or the marine vessel) for use by the operator. Such display may occur on a screen of the marine electronic device 40 or any other screen (e.g., a screen of a mobile device of the user). FIG. 14B shows one such example. In particular, FIG. 14B depicts a chart 200 that shows a body of water 205 and relative land 202 around the body of water. The chart 200 also shows a representation of the marine vessel 210 at a current location on the body of water 205. Additionally, such as based on received location data, the chart 200 shows a representation of a castable device 220. Further, the chart 200 shows a portion of a route 230 that the castable device 220 has traveled (shown in solid line) and a planned/proposed portion of the route 232 that the castable device 220 is scheduled to travel (shown in dotted line). In this regard, a user of the marine electronic device 40 may easily track the current and planned travel of the castable device 20. Though the depicted embodiment uses separate patterns for portions of the route, other display types are contemplated for showing the various navigation-related features.

In some embodiments, the marine electronic device 40 may be configured to display other data regarding the castable device 20 (or its travel) to the user. For example, the marine electronic device 40 may determine (e.g., through its own sensors/systems or from the castable device 20) information (e.g., navigation related, operation related, etc.) about the castable device. For example, the marine electronic device 40 may determine and display information such the speed of the castable device, current status of any operational components of the castable device, current direction of travel of the castable device, fuel gauge or other propulsion system information of the castable device, among others.

In some embodiments, the marine electronic device 40 may be configured to determine one or more survey or scan patterns for one or more castable devices 20. Such determination may be based on navigation data stored on the memory of the marine electronic device. In some embodiments, the user may interact with the marine electronic device 40 to create the survey/scan patterns. For example, the user may draw the survey/scan pattern on the user interface for each castable device 20 (such as with respect to the chart). In some embodiments, the survey/scan pattern may simply be selected based on pre-set patterns. As described in greater detail herein, the castable device 20 may operate one or more of its operational (or other) components while traveling the survey/scan patterns.

In some embodiments, the marine electronic device 40 may be configured to display the various survey/scan patterns along with the current location(s) of the one or more castable devices 20. FIG. 14C shows an example chart 200 with representations for the marine vessel 210 and two castable devices 220. Additionally, the chart 200 shows survey patterns 238 for each castable device 220. As shown in the depicted embodiment, the survey patterns 238 can vary (for example, the survey pattern on the right has been determined such the castable device travels near an island of the body of water). As will be described in more detail herein, the castable device(s) 20 may be configured to gather operational data and provide the operational data to the marine electronic device 40 as they travel along the survey pattern.

In some embodiments, the marine electronic device 40 may be configured to cause the marine vessel to track, follow, or go to the castable device 20. In such an embodiment, the marine electronic device 40 may determine the current location of the castable device 20 and provide instructions to one or more autopilots (or an operator via a display) to enable/cause the marine vessel to travel toward/after the castable device 20. As will be described in greater detail herein, such an embodiment may be even more robust by utilizing the various functionality of the castable device. For example the castable device 20 may be tracking an object, detecting fish, checking depths ahead of the marine vessel, checking wind conditions, scouting, etc.

Example Operational Control

As noted above, in some embodiments, the castable device 20 may be configured to communicate with and/or be controlled/operated by the marine electronic device 40. In such embodiments, the castable device 20 may be configured to receive instructions from the marine electronic device 40 to gather operational data and/or perform various operations with systems, sensors, or other components of the castable device 20. In response, the castable device 20 may act accordingly and provide operational data and/or data indicating completion of various operations to the marine electronic device 40. As used herein, operational data may encompass any type of data that the castable device can gather (e.g., sonar data, camera data, location data, etc.). Additionally, some embodiments of the present invention utilize further categorization of data types, such as sensor data, which may refer to any type of data capable of being gathered by a sensor of the castable device, which may include sonar and location sensors, among others. Also, as used herein, operations that can be performed by the castable device 20 may refer to any type of operation described or contemplated herein (e.g., tasks, travel, transmission, receipt, gather data, etc.).

Example Video/Camera Operation

In some embodiments, the castable device 20 may include a camera 133 configured to gather camera data, including, for example, video and/or image data. In some embodiments, the camera 133 may be positioned and oriented to capture video underwater. Additionally or alternatively, the camera 133 may be positioned and oriented to capture video above the water surface.

In some embodiments, the castable device 20 may be configured to communicate with and/or be controlled/operated by the marine electronic device 40. In such embodiments, the castable device 20 may be configured to operate the camera 133 according to instructions provided by the marine electronic device 40 (such as through a control signal). Likewise, in some embodiments, the castable device 20 may be configured to provide the gathered camera data to the marine electronic device 40. This may include streaming video and/or still images. In some embodiments, the gathered camera data could be provided through a direct transmission to the marine electronic device 40, through an external network, or via upload after return of the castable device 20.

In some embodiments, the marine electronic device 40 may be configured to display the camera data (e.g., the streaming video) to a user, such as on a screen. Notably, display on the screen of the marine electronic device 40 may be desirable to provide a large screen and/or convenient viewing area (e.g., the command center of the boat, where the user is fishing, etc.). Further, use of such screens may be desirable as they are often high-bright screens that are designed for easy viewing in sunlight (since the screens are often exposed on the marine vessel). This allows for easy viewing of objects, such as fish, sand bars, rocks, bridges, etc.

Indeed, in some embodiments, the castable device 20 (such as by utilizing the camera and displaying the resulting image on the marine electronic device 40) may be used to scout the marine environment, such as for depth, possible fishing locations, among many other reasons. For example, in some embodiments, object recognition technology (such as at the marine electronic device 40 or the castable device 20) could be used to further aid in fish spotting.

Additionally, in some embodiments, the castable device 20 may be configured to determine location data associated with the gathered camera data. Further, in some embodiments, the castable device 20 may be configured to transmit the location data to the marine electronic device 40, such as for determination of the location of the castable device at the time of gathering the camera data (though the location may also or in the alternative be determined at the castable device).

In some embodiments, the location of the castable device 20 may be associated with the gathered camera data for correlation and/or storage. Such association may occur at the castable device 20 and/or at the marine electronic device 40. In this regard, in some embodiments, the marine electronic device 40 may cause display of the streaming video in association with the location of the castable device to give context to the streaming video to the user.

FIG. 15A shows an example marine electronic device 40 that depicts a split-screen view 300 of streaming video 301 on the left portion of the screen and a chart 303 on the right portion of the screen. The streaming video 301 is taken from camera data from the castable device 20 and shows a fish 313 swimming in water 311. The chart 303 shows the location of castable device 320 (indicated as a "C", such as for Castable Device 1) on the body of water 305. The chart 303 also shows the location of the marine vessel 390 associated with the marine electronic device 40, thereby giving the viewer an indication of the relative position of the castable device 20.

Additionally, in some embodiments, such as the depicted embodiment, the marine electronic device 40 may display an indication of the camera view 351 that provides the user with an idea of the orientation and/or coverage area of the camera and the captured streaming video. In such embodiments, the castable device 20 may be configured to determine orientation data corresponding to the orientation of the castable device 20 and/or the camera 133 (as the camera 133 may be configured to be directed with respect to the castable device 20). Such orientation data may be provided to the marine electronic device 40 for use (such as for display, association with the camera data, etc.). In this regard, a user can easily determine the relative location and orientation of the streaming video with respect to the marine vessel and/or body of water (even in the circumstance when the castable device is otherwise not visible to the user directly).

In some embodiments, the marine electronic device 40 may be configured to overlay the camera data on the chart at the corresponding location and in the corresponding orientation as the camera data was received. For example, the marine electronic device 40 may receive the camera data, the orientation data of the camera data, and the location data associated with the camera data. Based on this information, the marine electronic device 40 may be configured to orient the camera data and overlay it on a chart at the proper associated location for which it was gathered. In some embodiments, only a portion of the camera data may be overlaid on the chart. In this regard, depending on the configuration and/or desires of the user, the marine electronic device 40 may be configured to crop the camera data prior to overlaying it on the chart. Such embodiments that utilize overlaying camera data on a chart may be useful for surveying a body of water. Even more, multiple castable devices could be used to efficiently survey the body of water, and could be operated in conjunction via the marine electronic device.

FIG. 15B shows an example screen 45 of a marine electronic device 40 showing the streaming video 301 on the left portion and a chart 303' on the right portion. Prior camera data has been overlaid 353 on the chart 303' at the appropriate location and in the appropriate orientation. In the depicted embodiment, the camera data is overlaid as the castable device 320 travels along the body of water 305.

In some embodiments, the castable device 20 and/or marine electronic device 40 may include object recognition technology that can be used in conjunction with the camera data to recognize objects (e.g., fish, dolphins, whales, sharks, other marine vessels, structure, shallow water, rocks, etc.) and act accordingly. In some embodiments, certain objects may cause triggers to occur, such as begin capturing camera data when a fish or other object is recognized, begin transmission of the camera data to the marine electronic device for display when a fish or other object is recognized, mark a location on the marine electronic device when a fish or other object is recognized, among many others.

Example Flowchart(s) and Operations

Embodiments of the present invention provide methods, apparatuses and computer program products for controlling and operating one or more castable devices in a marine environment. Various examples of the operations performed in accordance with embodiments of the present invention will now be provided with reference to FIGS. 16-17.

FIG. 16 illustrates a control flow diagram according to an example method for controlling navigation of a castable device from a remote marine electronic device according to an example embodiment 900. The operations illustrated in and described with respect to FIG. 16 may, for example, be performed by, with the assistance of, and/or under the control of one or more of the processor 121, memory 122, communication interface 123, location sensor 128, propulsion system 125, and/or other sensor(s)/system(s) 130 of the castable device 20 (e.g., castable device 920 of FIG. 16) and/or one or more of the processor 111, memory 112, communication interface 113, user interface 116, display 114, and/or sensor(s)/system(s) 117 of the marine electronic device 40 (e.g., marine electronic device 905 of FIG. 16).

Operation 950 may comprise retrieving (or determining) location data indicative of a current location of the castable device 920. The processor 121, memory 122, communication interface 123, location sensor 128, and/or other sensor(s)/system(s) 130 of the castable device 920 may, for example, provide means for performing operation 950. Operation 952 may comprise transmitting the location data from the castable device 920 and/or receiving the location data at the marine electronic device 905. The processor 121 and/or communication interface 123 of the castable device 920 and/or the processor 111 and/or communication interface 113 of the marine electronic device 905 may, for example, provide means for performing operation 952.

Operation 954 may comprise determining the current location of the castable device 920 at the marine electronic device 905 and based on the received location data. The processor 111, memory 112, communication interface 113, and/or sensor(s)/system(s) 117 of the marine electronic device 905 may, for example, provide means for performing operation 954. Operation 956 may comprise determining the desired location for the castable device 920 to travel to, wherein the determining is performed at the marine electronic device 905 and based on a planned route or waypoint stored in the memory of the marine electronic device. The processor 111, memory 112, user interface 116, display 114, and/or sensor(s)/system(s) 117 of the marine electronic device 905 may, for example, provide means for performing operation 956. Operation 958 may comprise transmitting a control signal from the marine electronic device 905 and/or receiving the control signal at the castable device 920, wherein the control signal includes instructions for the castable device to travel to the desired location. The processor 111 and/or communication interface 113 of the marine electronic device 905 and/or the processor 121 and/or communication interface 123 of the castable device 920 may, for example, provide means for performing operation 958.

Operation 960 may comprise causing the propulsion system of the castable device to propel the castable device to the desired location. The processor 121, memory 122, communication interface 123, location sensor 128, propulsion system 125, and/or other sensor(s)/system(s) 130 may, for example, provide means for performing operation 960.

FIG. 17 illustrates a control flow diagram according to an example method for controlling operation of a castable device from a remote marine electronic device according to an example embodiment 970. The operations illustrated in and described with respect to FIG. 17 may, for example, be performed by, with the assistance of, and/or under the control of one or more of the processor 121, memory 122, communication interface 123, location sensor 128, propulsion system 125, and/or other sensor(s)/system(s) 130 of the castable device 20 (e.g., castable device 920 of FIG. 17) and/or one or more of the processor 111, memory 112, communication interface 113, user interface 116, display 114, and/or sensor(s)/system(s) 117 of the marine electronic device 40 (e.g., marine electronic device 905 of FIG. 17).

Operation 972 may comprise determining at the marine electronic device 905 that operational data from the castable device 920 is desired. The processor 111, memory 112, communication interface 113, user interface 116, display 114, and/or sensor(s)/system(s) 117 of the marine electronic device 905 may, for example, provide means for performing operation 972. Operation 974 may comprise transmitting a control signal from the marine electronic device 905 and/or receiving the control signal at the castable device 920, wherein the control signal includes instructions for the castable device to operate accordingly (such as gathering operation data). The processor 111 and/or communication interface 113 of the marine electronic device 905 and/or the processor 121 and/or communication interface 123 of the castable device 920 may, for example, provide means for performing operation 974.

Operation 976 may comprise causing the operational data to be acquired by one or more components of the castable device. The processor 121, memory 122, communication interface 123, location sensor 128, propulsion system 125, and/or other sensor(s)/system(s) 130 may, for example, provide means for performing operation 976. Operation 978 may comprise retrieving (or determining) location data indicative of a current location of the castable device 920. The processor 121, memory 122, communication interface 123, location sensor 128, and/or other sensor(s)/system(s) 130 of the castable device 920 may, for example, provide means for performing operation 950. Operation 980 may comprise transmitting the operational data and the location data from the castable device 920 and/or receiving the operational data and the location data at the marine electronic device 905. The processor 121 and/or communication interface 123 of the castable device 920 and/or the processor 111 and/or communication interface 113 of the marine electronic device 905 may, for example, provide means for performing operation 980.

Operation 982 may comprise causing display of one or more images associated with the received operational data and/or location data on a screen of the marine electronic device 905. The processor 111, memory 112, communication interface 113, user interface 116, display 114, and/or sensor(s)/system(s) 117 of the marine electronic device 905 may, for example, provide means for performing operation 982.

FIGS. 16-17 illustrate flow control diagrams of a system, method, and computer program product according to an example embodiment. It will be understood that each block of the flow control diagrams, and combinations of blocks in the flow control diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 112/122 and executed by, for example, the processor 111/121. As will be appreciated, any such computer program product may be loaded onto a computer or other programmable apparatus (for example, a marine electronic device 40 and/or a castable device 20), such that the computer program product including the instructions which execute on the computer or other programmable apparatus creates means for implementing the functions specified in the flow control diagrams block(s). Further, the computer program product may comprise one or more non-transitory computer-readable mediums on which the computer program instructions may be stored such that the one or more computer-readable memories can direct a computer or other programmable device (for example, a marine electronic device 40 and/or a castable device 20) to cause a series of operations to be performed on the computer or other programmable apparatus to produce a computer-implemented process such that the instructions which execute on the computer or other programmable apparatus implement the functions specified in the flow control diagrams block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for controlling castable sonar devices, the system comprising:
 a plurality of castable sonar devices, wherein the plurality of castable sonar devices comprises a first castable sonar device and a second castable sonar device, and wherein each castable sonar device within the plurality of castable sonar devices comprises:
  a housing configured to float on a body of water above an underwater environment, wherein the housing comprises a tether connection feature configured to connect to a tether or fishing line;
  a power source positioned within the housing;
  a transducer assembly positioned within the housing, wherein the transducer assembly comprises at least one transducer element positioned within the housing and aimed downwardly therefrom;
  a location sensor configured to determine a position of the castable sonar device;
  a propulsion system configured to propel the castable sonar device along a surface of the body of water;
  a wireless communication element configured to transmit one or more signals to and receive one or more signals from a remote computing device; and
  processing circuitry provided within the housing, wherein the processing circuitry is configured to:
   determine a current position of the castable sonar device;
   transmit the current position of the castable sonar device to the remote computing device;
   receive instructions from the remote computing device to move to a location;
   cause the propulsion system to operate to cause the castable sonar device to move to the location;
   receive one or more sonar returns from the at least one transducer element; and
   transmit, via the wireless communication element, sonar data or sonar image data corresponding to the one or more sonar returns to the remote computing device for presentation on a display of the remote computing device; and
 the remote computing device comprising:
  a wireless communication element configured for wireless communication with each of the plurality of castable sonar devices;
  a user interface comprising a display; and
  processing circuitry configured to:
   determine a first position of the first castable sonar device and a second position of the second castable sonar device such that the first castable sonar device and the second castable sonar device form a relative position with respect to each other;

send a first signal to the first castable sonar device to cause the propulsion system of the first castable sonar device to propel the first castable sonar device to the first position;

send a second signal to the second castable sonar device to cause the propulsion system of the second castable sonar device to propel the second castable sonar device to the second position;

receive the one or more sonar images from the plurality of castable sonar devices; and cause presentation of the one or more sonar images on the display of the remote computing device.

2. The system of claim 1, wherein the processing circuitry is further configured to maintain the first castable sonar device within a predetermined distance threshold from the second castable sonar device such that the first castable sonar device and the second castable sonar device form a desired shape to provide increased sonar coverage of the underwater environment.

3. The system of claim 2, wherein the desired shape is a square grid or an array.

4. The system of claim 1, wherein the processing circuitry is further configured to:
receive a third signal from the first castable sonar device containing a first detected position from the location sensor of the first castable sonar device;
receive a fourth signal from the second castable sonar device containing a second detected position from the location sensor of the second castable sonar device; and
determine if the first detected position and the second detected position correspond to the relative position for the first castable sonar device and the second castable sonar device; and
in an instance in which the first detected position and the second detected position correspond to the relative position for the first castable sonar device and the second castable sonar device, causing the first castable sonar device to maintain the first detected position and the second castable sonar device to maintain the second detected position; or
in an instance in which the first detected position and the second detected position do not correspond to the relative position for the first castable sonar device and the second castable sonar device, determining an updated first position of the first castable sonar device and an updated second position of the second castable sonar device such that the updated first position and the updated second position correspond to the relative position of the first castable sonar device and the second castable sonar device, causing the first castable sonar device to propel the first castable sonar device to the updated first position, and causing the second castable sonar device to propel the second castable sonar device to the updated second position.

5. The system of claim 1, wherein the first position and the second position are continuously determined and additional signals are sent to the first castable sonar device and the second castable sonar device such that the first castable sonar device and the second castable sonar device move in formation, while maintaining the relative position, to patrol an area of the body of water.

6. The system of claim 1, wherein the processing circuitry is further configured to combine the one or more sonar images into a combined sonar image and cause presentation of the combined sonar image on the display of the remote computing device.

7. The system of claim 1, wherein the processing circuitry is further configured to automatically determine the first position and the second position such that the plurality of castable sonar devices provides an optimal sonar coverage of the underwater environment.

8. The system of claim 1, wherein the processing circuitry is further configured to determine the first position and the second position based on user input.

9. The system of claim 1, wherein the remote computing device comprises one of a mobile computing device or a marine electronic device associated with a vessel.

10. The system of claim 1, wherein each transducer assembly comprises a plurality of transducer elements that are affixed to a printed circuit board (PCB), and wherein each of the plurality of transducer elements is electrically connected to traces on the PCB.

11. A marine electronic device for controlling a plurality of castable sonar devices, the marine electronic device comprising:
a wireless communication element configured to receive one or more sonar images from a plurality of castable sonar devices, wherein the plurality of castable sonar devices comprises a first castable sonar device and a second castable sonar device, and wherein each castable sonar device within the plurality of castable sonar devices comprises:
a housing configured to float on a body of water above an underwater environment, wherein the housing comprises a tether connection feature configured to connect to a tether or fishing line;
a power source positioned within the housing;
a transducer assembly positioned within the housing, wherein the transducer assembly comprises at least one transducer element positioned within the housing and aimed downwardly therefrom;
a location sensor configured to determine a position of the castable sonar device;
a propulsion system configured to propel the castable sonar device along a surface of the body of water;
a wireless communication element configured to transmit one or more signals to and receive one or more signals from the marine electronic device; and
processing circuitry provided within the housing, wherein the processing circuitry is configured to:
determine a current position of the castable sonar device;
transmit the current position of the castable sonar device to the marine electronic device;
receive instructions from the marine electronic device to move to a location;
cause the propulsion system to operate to cause the castable sonar device to move to the location;
receive one or more sonar returns from the at least one transducer element; and
transmit, via the wireless communication element, sonar data or sonar image data corresponding to the one or more sonar returns to the marine electronic device for presentation on a display of the marine electronic device;
a user interface comprising a display; and
processing circuitry configured to:
determine a first position of the first castable sonar device and a second position of the second castable sonar device such that the first castable sonar device and the second castable sonar device form a relative position with respect to each other;

send a first signal to the first castable sonar device to cause the propulsion system of the first castable sonar device to propel the first castable sonar device to the first position;

send a second signal to the second castable sonar device to cause the propulsion system of the second castable sonar device to propel the second castable sonar device to the second position;

receive the one or more sonar images from the plurality of castable sonar devices; and cause presentation of the one or more sonar images on the display of the marine electronic device.

12. The marine electronic device of claim 11, wherein the processing circuitry is further configured to maintain the first castable sonar device within a predetermined distance threshold from the second castable sonar device such that the first castable sonar device and the second castable sonar device form a desired shape to provide increased sonar coverage of the underwater environment.

13. The marine electronic device of claim 12, wherein the desired shape is a square grid or an array.

14. The marine electronic device of claim 11, wherein the processing circuitry is further configured to:

receive a third signal from the first castable sonar device containing a first detected position from the location sensor of the first castable sonar device;

receive a fourth signal from the second castable sonar device containing a second detected position from the location sensor of the second castable sonar device; and determine if the first detected position and the second detected position correspond to the relative position for the first castable sonar device and the second castable sonar device; and in an instance in which the first detected position and the second detected position correspond to the relative position for the first castable sonar device and the second castable sonar device, causing the first castable sonar device to maintain the first detected position and the second castable sonar device to maintain the second detected position; or in an instance in which the first detected position and the second detected position do not correspond to the relative position for the first castable sonar device and the second castable sonar device, determining an updated first position of the first castable sonar device and an updated second position of the second castable sonar device such that the updated first position and the updated second position correspond to the relative position of the first castable sonar device and the second castable sonar device, causing the first castable sonar device to propel the first castable sonar device to the updated first position, and causing the second castable sonar device to propel the second castable sonar device to the updated second position.

15. The marine electronic device of claim 11, wherein the first position and the second position are continuously determined and additional signals are sent to the first castable sonar device and the second castable sonar device such that the first castable sonar device and the second castable sonar device move in formation, while maintaining the relative position, to patrol an area of the body of water.

16. The marine electronic device of claim 11, wherein the processing circuitry is further configured to combine the one or more sonar images into a combined sonar image and cause presentation of the combined sonar image on the display of the remote computing device.

17. The marine electronic device of claim 11, wherein the processing circuitry is further configured to automatically determine the first position and the second position such that the plurality of castable sonar devices provides an optimal sonar coverage of the underwater environment.

18. The marine electronic device of claim 11, wherein the processing circuitry is further configured to determine the first position and the second position based on user input.

19. A method for controlling castable sonar devices, the method comprising:

providing a plurality of castable sonar devices, wherein the plurality of castable sonar devices comprises a first castable sonar device and a second castable sonar device, and wherein each castable sonar device within the plurality of castable sonar devices comprises:

a housing configured to float on a body of water above an underwater environment, wherein the housing comprises a tether connection feature configured to connect to a tether or fishing line;

a power source positioned within the housing;

a transducer assembly positioned within the housing, wherein the transducer assembly comprises at least one transducer element positioned within the housing and aimed downwardly therefrom;

a location sensor configured to determine a position of the castable sonar device;

a propulsion system configured to propel the castable sonar device along a surface of the body of water;

a wireless communication element configured to transmit one or more signals to and receive one or more signals from a remote computing device; and processing circuitry provided within the housing, wherein the processing circuitry is configured to:

determine a current position of the castable sonar device;

transmit the current position of the castable sonar device to the remote computing device;

receive instructions from the remote computing device to move to a location;

cause the propulsion system to operate to cause the castable sonar device to move to the location;

receive one or more sonar returns from the at least one transducer element; and transmit, via the wireless communication element, sonar data or sonar image data corresponding to the one or more sonar returns to the remote computing device for presentation on a display of the remote computing device;

determining a first position of the first castable sonar device and a second position of the second castable sonar device such that the first castable sonar device and the second castable sonar device form a relative position with respect to each other;

sending a first signal to the first castable sonar device to cause the propulsion system of the first castable sonar device to propel the first castable sonar device to the first position;

sending a second signal to the second castable sonar device to cause the propulsion system of the second castable sonar device to propel the second castable sonar device to the second position;

receiving one or more sonar images from the plurality of castable sonar devices; and causing presentation of the one or more sonar images on a display of the remote computing device.

20. The method of claim 19, the method further comprising maintaining the first castable sonar device within a predetermined distance threshold from the second castable sonar device such that the first castable sonar device and the second castable sonar device form a desired shape to provide increased sonar coverage of the underwater environment.

* * * * *